US009913196B2

(12) United States Patent
Chou et al.

(10) Patent No.: US 9,913,196 B2
(45) Date of Patent: Mar. 6, 2018

(54) FACILITATING ENERGY EFFICIENCY EMPLOYING RELAY TRANSMISSION MODE OF MULTIPLE DEVICE COORDINATION IN WIRELESS COMMUNICATION SYSTEMS

(71) Applicant: Taiwan Semiconductor Manufacturing Company, Ltd., Hsinchu (TW)

(72) Inventors: Chie-Ming Chou, Taiwan (CN); Ching-Yao Huang, Taiwan (CN)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 19 days.

(21) Appl. No.: 14/741,640

(22) Filed: Jun. 17, 2015

(65) Prior Publication Data
US 2016/0014668 A1 Jan. 14, 2016

Related U.S. Application Data

(63) Continuation-in-part of application No. 14/299,502, filed on Jun. 9, 2014, now Pat. No. 9,706,337.
(Continued)

(51) Int. Cl.
*H04W 40/22* (2009.01)
*H04W 72/04* (2009.01)
(Continued)

(52) U.S. Cl.
CPC .......... *H04W 40/22* (2013.01); *H04W 4/006* (2013.01); *H04W 72/04* (2013.01);
(Continued)

(58) Field of Classification Search
CPC .......... H04W 72/042; H04W 72/0413; H04W 52/00; H04B 1/00
See application file for complete search history.

(56) References Cited

U.S. PATENT DOCUMENTS 9,025,550 B2 * 5/2015 Zhu ..................... H04W 72/085
370/252
9,706,337 B2 * 7/2017 Chou .................... H04W 4/006
(Continued)

OTHER PUBLICATIONS

Purnachand S. et al, "Performance Analysis of Open Loop and Closed Loop Power Control Schemes for LTE Uplink," International Journal of Computer Science and Information Technologies, 2012, pp. 3683-3688, vol. 3, Department of Electronics and Communication Engineering, K L University, India, 6 Pages.
(Continued)

*Primary Examiner* — Bobbak Safaipour
(74) *Attorney, Agent, or Firm* — Haynes and Boone, LLP

(57) ABSTRACT

Techniques for energy efficiency utilizing the relay transmission mode of multiple device coordination (MDC) in a wireless communication system are described. For example, a method includes identifying, by a coordinating device including a processor, one or more devices associated with a same entity as the coordinating device, wherein the coordinating device and the one or more devices are part of a set of devices. The method also includes coordinating, by the coordinating device, with the one or more devices to enable a single radio resource connection (RRC) between the set of devices and a base station. The coordinating can include selecting a relay node device, from among the set of devices, to relay data transmitted from the set of devices during a relay transmission mode. The data is relayed to the base station using the single RRC, which is established through the relay node device.

16 Claims, 37 Drawing Sheets

Related U.S. Application Data

(60) Provisional application No. 61/891,863, filed on Oct. 16, 2013.

(51) Int. Cl.
| | |
|---|---|
| *H04W 76/02* | (2009.01) |
| *H04W 4/00* | (2018.01) |
| *H04W 8/00* | (2009.01) |
| *H04W 88/06* | (2009.01) |
| *H04W 24/02* | (2009.01) |
| *H04W 48/16* | (2009.01) |

(52) U.S. Cl.
CPC .......... *H04W 76/023* (2013.01); *H04W 8/005* (2013.01); *H04W 24/02* (2013.01); *H04W 48/16* (2013.01); *H04W 88/06* (2013.01); *Y02B 60/50* (2013.01)

(56) References Cited

U.S. PATENT DOCUMENTS

| | | | |
|---|---|---|---|
| 2003/0137970 A1* | 7/2003 | Odman | H04L 29/06 370/350 |
| 2007/0196099 A1* | 8/2007 | Ishiyama | G03B 7/26 396/301 |
| 2011/0228719 A1* | 9/2011 | Liu | H04B 7/15542 370/315 |
| 2013/0142056 A1 | 6/2013 | Abplanalp et al. | |
| 2013/0170414 A1 | 7/2013 | Kwon | |
| 2013/0223344 A1* | 8/2013 | Sun | H04L 1/08 370/328 |
| 2013/0260762 A1* | 10/2013 | Tomita | H04W 36/30 455/436 |
| 2013/0315217 A1* | 11/2013 | Chen | H04W 72/085 370/336 |
| 2013/0337739 A1* | 12/2013 | Bernsen | H04L 63/0884 455/7 |
| 2014/0036859 A1* | 2/2014 | Ekpenyong | H04W 72/042 370/330 |
| 2015/0029910 A1* | 1/2015 | He | H04W 76/02 370/280 |
| 2015/0111608 A1* | 4/2015 | Kazmi | H04W 52/281 455/522 |
| 2015/0195032 A1* | 7/2015 | Sharma | H04B 7/15557 370/315 |
| 2016/0157283 A1* | 6/2016 | Yu | H04W 36/0055 455/437 |

OTHER PUBLICATIONS

Dusza, et al., "An Accurate Measurement-Based Power Consumption Model for LTE Uplink Transmissions," 2013, pp. 49-50, IEEE, 2 Pages.

* cited by examiner

FACILITATING ENERGY EFFICIENCY EMPLOYING RELAY TRANSMISSION MODE OF MULTIPLE DEVICE COORDINATION IN WIRELESS COMMUNICATION SYSTEMS

CROSS REFERENCE TO RELATED APPLICATION AND CLAIM OF PRIORITY

This application is a continuation-in-part of, and claims priority to, U.S. Non-Provisional patent application Ser. No. 14/299,502, filed Jun. 9, 2014, and titled "Systems, Apparatus, Methods and Computer-Readable Storage Media Facilitating Multiple Device Coordination in Wireless Communication Systems," which is a non-provisional of, and claims priority to, U.S. Provisional Patent Application No. 61/891,863, filed Oct. 16, 2013, and titled "Method and Apparatus for Multiple Device Coordination." Each of the above applications is hereby incorporated herein by reference in their entireties.

TECHNICAL FIELD

The disclosed subject matter relates generally to wireless communications, and, for example, to systems, apparatus, methods and computer-readable storage media facilitating energy efficiency employing relay transmission mode of multiple device coordination (MDC) in wireless communication systems.

BACKGROUND

As wireless technologies become ubiquitous and the pace of development of wireless applications quickens, the likelihood that users will desire the ability to efficiently utilize different wireless devices in a vast array of environments increases. In some cases, users carry multiple devices that execute different applications. However, operating each of the different devices is likely to result in transmission and/or energy inefficiency. The problem is exacerbated by limited radio resources that can result in restricted system capacity.

SUMMARY

The following presents a simplified summary of the disclosed subject matter in order to provide a basic understanding of some embodiments of the disclosed subject matter. This summary is not an extensive overview of the disclosed subject matter. It is intended to neither identify key or critical elements of the disclosed subject matter nor delineate the scope of the disclosed subject matter. Its sole purpose is to present some concepts of the disclosed subject matter in a simplified form as a prelude to the more detailed description that is presented later.

In some embodiments, a method includes: identifying, by a coordinating device including a processor, one or more devices associated with a same entity as the coordinating device, wherein the coordinating device and the one or more devices are part of a set of devices. The method also includes coordinating, by the coordinating device, with the one or more devices to enable a single radio resource connection (RRC) between the set of devices and a base station (BS), wherein the coordinating includes selecting a relay node device, from among the set of devices, to relay data transmitted from the set of devices during a relay transmission mode, and wherein the data is relayed to the BS using the single RRC.

In some embodiments, an apparatus includes: a coordinating device including a processing device configured to at least: identify one or more devices associated with a same entity as the coordinating device, wherein the coordinating device and the one or more devices are part of a set of devices; and coordinate with the one or more devices to enable a single RRC between the set of devices and a BS. The coordination includes selection of a relay node device, from among the set of devices, to relay data transmitted from the set of devices during a relay transmission mode, and wherein the data is relayed to the BS using the single RRC.

In some embodiments, a computer-readable storage device is described. The computer-readable storage device can have computer-executable instructions that, in response to execution, cause a coordinating device to perform operations. The operations can include identifying, by a coordinating device including a processor, one or more devices associated with a same entity as the coordinating device, wherein the coordinating device and the one or more devices are part of a set of devices. The operations also include coordinating, by the coordinating device, with the one or more devices to enable a single RRC between the set of devices and a BS, wherein the coordinating includes selecting a relay node device, from among the set of devices, to relay data transmitted from the set of devices during a relay transmission mode, and wherein the data is relayed to the BS using the single RRC.

To the accomplishment of the foregoing and related ends, the disclosed subject matter, then, comprises the features hereinafter fully described. The following description and the annexed drawings set forth in detail certain illustrative embodiments of the disclosed subject matter. However, these embodiments are indicative of but a few of the various ways in which the principles of the disclosed subject matter may be employed. Other embodiments, advantages and novel features of the disclosed subject matter will become apparent from the following detailed description of the disclosed subject matter when considered in conjunction with the drawings.

DETAILED DESCRIPTION

Figure 1:
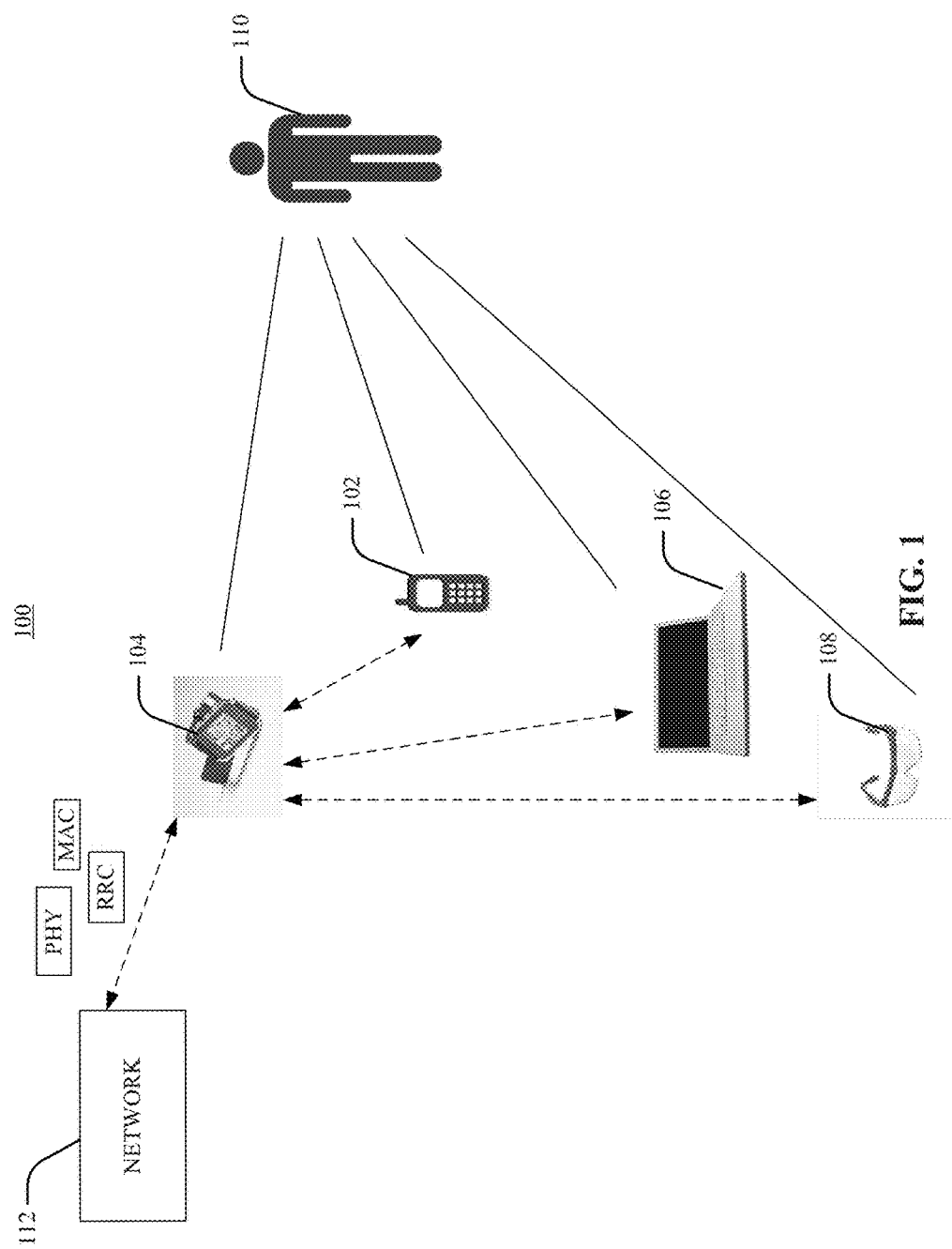
FIG. 1 is a diagram of an exemplary system in which MDC can be facilitated in accordance with one or more embodiments of the disclosed subject matter.

The disclosed subject matter is now described with reference to the drawings, wherein like reference numerals are used to refer to like elements throughout. In the following description, for purposes of explanation, numerous specific details are set forth in order to provide a thorough understanding of the disclosed subject matter. It may be evident, however, that the disclosed subject matter can be practiced without these specific details. In other instances, various well-known structures and devices may be shown in block diagram form in order to facilitate describing the disclosed subject matter.

As used in this application, the terms "component," "system," "platform," and the like can refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the specification and annexed drawings should generally be construed to mean "one or more" unless specified otherwise or clear from context to be directed to a singular form.

Moreover, terms like "user equipment," "mobile station," "mobile," "subscriber station," "communication device," "access terminal," "terminal," "handset," and similar terminology, refer to a wireless device (e.g., cellular phone, smart phone, computer, personal digital assistant (PDA), set-top box, Internet Protocol Television (IPTV), electronic gaming device, multi-media recorder/player, video recorder/player, audio recorder/player, printer, etc.) utilized by a subscriber or user of a wireless communication service to receive or convey data, control, voice, video, sound, gaming, or substantially any data-stream or signaling-stream. The foregoing terms are utilized interchangeably in the specification and related drawings. Likewise, the terms "access point," "base station," "Node B," "evolved Node B," "home Node B (HNB)," and the like, are utilized interchangeably in the application, and refer to a wireless network component or appliance that serves and receives data, control, voice, video, sound, gaming, or substantially any data-stream or signaling-stream from a set of subscriber stations. Data and signaling streams can be packetized or frame-based flows.

Wireless cellular technology has evolved over time to satisfy user demand. The evolution can be categorized into different generations with respective features. For example, third generation (3G) systems tend to employ code division multiple access (CDMA) technology while fourth generation (4G) systems tend to employ orthogonal frequency division multiple access (OFDMA) to provide mobile internet on the cellular network.

The focus has typically been increasing system capacity to provide for greater transmission efficiency. For example, capacity has increased exponentially and data rate has increased from 384 kilobits per second (kpbs) to 1 gigabits per second (Gbps) in attempts to support the surge in users with massive data transmission. In 4G systems, solutions being considered include bandwidth extension by carrier aggregation, aggressive frequency reuse via small cell deployment and/or spectral efficiency increase by deployment of multiple input multiple output (MIMO) systems.

However, since mobile internet has increased in popularity, the traffic model for cellular networks has changed. For example, the traffic types within a cellular network can cause diverse transmission issues and significantly reduce battery life of a device. 4G systems tend to focus on cell infrastructure and access behavior enhancement to support various requirements individually. With the deployment of wireless cellular technology, more and more portable devices are equipped with 4G (e.g., LTE) modules. For example, GOOGLE® Glass, APPLE® iWatch are portable wireless devices that can operate within 4G systems. In systems in which numerous devices are associated with a single user, or entity (e.g., human entity, business entity or otherwise), and each device has individual, direct access to the network, congestion and/or corresponding throughput degradation can result.

In recent years, consumers have heavily relied on mobile devices to access the internet and therefore, extending device battery life, is useful. With such demand, user relaying between devices has become attractive because the cooperation between devices can reduce transmission distance and consequently improve power conservation. Unfortunately, while a user is moving, it can be difficult to quickly and/or efficiently identify a relay node device at a desirable location. Moreover, some users may not be willing to allow their user devices to relay other users' packets since performance degradation could occur for the service provided.

However, recent studies forecast that the wearable mobile device market will be a $12 million dollar market in the year 2015, and the ubiquity of consumers carrying multiple wireless devices simultaneously is an inevitable circumstance. In the instant disclosure, multiple devices associated with a single user can form a personal area network via one or more MDC operations. Several different transmission modes can be applied within MDC and are also described. One embodiment includes relay transmission mode MDC in which energy efficiency can result based on a determination of when to trigger relay transmission mode and a determination regarding which node device of the devices in the personal area network to perform the function of relay node device. The relay node device can communicate with the BS and consequently forward and/or receive data for other devices (e.g., forward data received from source nodes in the personal area network).

Systems, apparatus, methods and/or computer-readable storage media described herein facilitate energy efficiency employing a relay transmission mode of MDC in wireless communication systems. MDC can enable cooperative communication among devices associated with the same entity. As used herein, the terms "multi-device coordination" and "MDC" mean a system in which a coordinating device is selected from a set of candidate devices (which are associated with the same entity) to establish an RRC connection with a network for one or more of the candidate devices that are not coordinating devices (e.g., non-coordinating devices) to enable the non-coordinating devices to make transmissions with the network without establishing individual radio resource control (RRC) connections with the network. The non-coordinating devices are then transparent to the network.

In the disclosure, the energy efficiency of relay transmission mode of MDC is analyzed for cases in which power control and a discontinuous reception sleep approach are jointly considered. The simulation results demonstrate that relay transmission mode of MDC under sparse packet transmission can conserve power, and selecting a proper relay node device based on traffic characteristics can result in power saving and energy efficiency. As a result, one or more embodiments provide systems, methods and/or apparatus to facilitate determination of the trigger event of relay transmission mode of MDC and/or selection of the relay node device to optimize and/or obtain desirable energy efficiency.

In the embodiments described, by applying described functionalities for MDC, the large number of associations between the network and devices, and the radio signaling, can be reduced. From the BS point of view, MDC can enable grouping two or more devices associated with the same entity and viewing the set of devices as a single device. Corresponding resources and/or identifiers can be assigned. From the device point of view, due to coordination among the devices associated with the entity, multiple antennas can be efficiently used to obtain transmission efficiencies.

From the network perspective, MDC can reduce mobility management loading (e.g., single handover preparation, X2 network interface negotiation can be used for MDC). MDC can also reduce simultaneous random access and consequently prevent, or reduce the likelihood of, radio resource control (RRC) connection request message collision since devices can have substantially identical moving speed and TAT might time out at approximately the same time. In some embodiments, MDC can also increase physical downlink control channel (PDCCH) efficiency since multiple devices can share a unique Cell Radio Network Temporary Identifier (C-RNTI) and control channel element (CCE). In some embodiments, MDC an also increase Physical Uplink Control Channel (PUCCH) efficiency since redundant channel quality indicator (CQI) reporting can be avoided since devices in MDC can have same modulation and control scheme (MCS).

The adaption of a coordinating device may be transparent to the network whereby the C-RNTI and RRC configuration could be continuously applied after adaption. From the device perspective, MDC can lead to throughput gain. For example, a coordinating device can be adaptive among multiple devices based on the best fading situation and then better signal-to-interference-plus-noise ratio (SINR) choice can be selected between the BS and MDC. Throughput gain can also be achieved because MDC can support smart cooperative retransmission and/or support interference cancellation whereby one device can be designated to receive a signal from an interfering node and perform interference cancellation for another device that is communicating with the serving node.

From the device perspective, MDC can also lead to power saving gain. For example, in some embodiments, only one device needs to acquire/update the system information block (SIB) and receive RRC configurations. Therefore, MDC can enable other devices to stay in the sleep state as long as possible. Further, the non-coordinating device (NCD) can save baseband power consumption due to reduced control channel monitoring since only the coordinating device needs to monitor the PDCCH at the discontinuous reception (DRX) active period. In some embodiments, according to the power control mechanism, more allocated physical resource block (PRB) results and more transmission power may be needed; however, better power consumption efficiency can result due to the power amplifier characteristics. Hence, when MDC is enabled, data can be aggregated at the coordinating device and consequently transmitted to the BS employing PRBs. As a result, better energy efficiency can result.

FIG. 1 is a diagram of an exemplary system in which MDC can be facilitated in accordance with one or more embodiments of the disclosed subject matter. System 100 can include one or more of candidate devices 102, 104, 106, 108 associated with entity 110. Candidate devices 102, 104, 106, 108 can be associated with entity 110 by being owned, used or controlled by entity 110. In various embodiments, candidate devices 102, 104, 106, 108 can be any number of different mobile or stationary wireless devices including, but not limited to, a laptop, a smart phone, a display device (e.g., a head- or body-mounted display device) having wireless communication capability, a watch having wireless communication capability, a personal computer (PC), personal digital assistant (PDA) or the like. In some embodiments, one or more of candidate devices 102, 104, 106, 108 can include structure and/or functionality (e.g., hardware, software or a combination of hardware and software) to communicate with a wireless network, and/or to detect the presence of one or more of other candidate devices 102, 104, 106, 108. For example, in some embodiments, one or more of candidate devices 102, 104, 106, 108 can be configured to establish an RRC connection between a network (e.g., network 112) and/or other candidate devices 102, 104, 106, 108.

In various embodiments, entity 110 can be a natural person or a business entity or a household electric entity. For example, in one embodiment, entity 110 is a human user of candidate devices 102, 104, 106, 108. In another embodiment, entity 110 is a corporate entity that owns candidate devices 102, 104, 106, 108.

In the embodiment shown, candidate device 104 is selected as the coordinating device for candidate devices 102, 106, 108, which are each associated with entity 110. MDC can be facilitated in system 100 via an RRC connection between candidate device 104 and network 112. As such, resources (e.g., bandwidth, signaling resources) can be shared and/or efficiently utilized. As shown, candidate device 104 can establish an RRC connection with network 112 and exchange media access control (MAC) and physical layer (PHY) information over the established channel established. The channel can be the RRC connection between any one of candidate devices 102, 104, 106, 108 associated with entity 110 and network 112.

In some embodiments, subsets of candidate devices 102, 104, 106, 108 associated with entity 110 can have different coordinating devices that can perform the MDC for only candidate devices in the subset with the particular coordinating device. Turning back to FIG. 1, however, candidate device 104 can facilitate MDC between network 112 and candidate devices 102, 106, 108 (as well as candidate device 104) via initialization, management and/or transmission stages described in greater detail herein.

In some embodiments, any of candidate devices 102, 104, 106, 108 can include structure and/or functionality to be a coordinating device. In other embodiments, a subset of candidate devices 102, 104, 106, 108 can include structure and/or functionality to become the coordinating devices while remaining candidate devices 102, 104, 106, 108 can include limited structure and/or functionality for acting as only non-coordinating devices. In some embodiments, functionality of one or more of candidate devices 102, 104, 106, 108 can be updated from time to time such that a candidate device that included structure and/or functionality for acting as only a non-coordinating device can be configured to be able to serve as a coordinating device.

Figure 2:
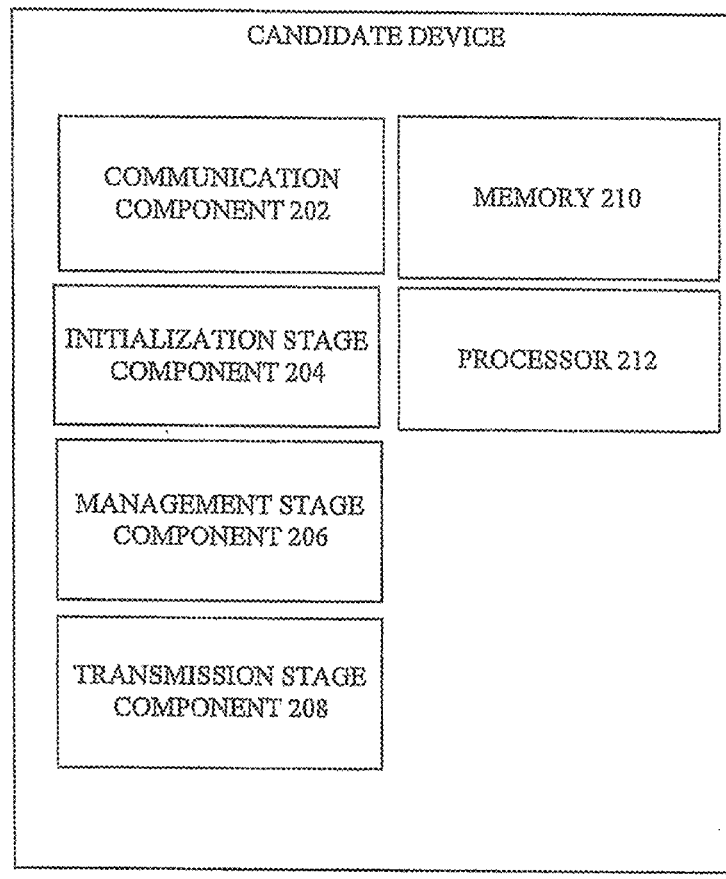
FIG. 2 is an illustration of a block diagram of an exemplary candidate device for which MDC can be facilitated in a wireless communication system in accordance with one or more embodiments of the disclosed subject matter.

Turning now to FIG. 2, shown is an illustration of a block diagram of an exemplary candidate device for which MDC can be facilitated in a wireless communication system in accordance with one or more embodiments of the disclosed subject matter. Candidate device 200 can include communication component 202, initialization stage component 204, management stage component 206, transmission stage component 208, memory 210 and/or processor 212. In various embodiments, one or more of communication component 202, initialization stage component 204, management stage component 206, transmission stage component 208, memory 210 and/or processor 212 can be electrically and/or communicatively coupled to one another to perform one or more functions of candidate device 200.

In some embodiments, candidate device 200 can include structure and/or functionality of any one of candidate devices 102, 104, 106, 108. Accordingly, in some embodiments, each of communication component 202, initialization stage component 204, management stage component 206, transmission stage component 208, memory 210 and/or processor 212 can be included in candidate devices 102, 104, 106, 108. However, in some embodiments, for example, for candidate devices configured to act as only non-coordinating devices, one or more of initialization stage component 204, management stage component 206, transmission stage component 208 may not be included.

In the embodiment described, candidate device 200 can include structure and/or functionality for optionally being able to be a coordinating device or a non-coordinating device. Accordingly, in the embodiments described, candidate device 200 can be or include the structure or functionality of candidate device 104 of FIG. 1. Further, in some embodiments, candidate devices 104, 200 can include structure and/or functionality of coordinating device 500 (and vice versa).

In other embodiments, candidate device 200 can be or include the structure and/or functionality of candidate devices 102, 106, 108. In these embodiments, candidate device 200 can include one or more components and/or have the capability to perform one or more functions associated with non-coordinating devices 502, 504 (and vice versa).

With reference to FIGS. 1 and 2, communication component 202 can transmit and/or receive information to and/or from a network (e.g., network 112) and one or more candidate devices (e.g., candidate devices 102, 106, 108) associated with the same entity with which candidate device 200 is associated. For example, in various embodiments, communication component 200 can transmit and/or receive RRC signaling information for establishing a connection with the network and/or information (e.g., text, voice, video, data) to be communicated to and/or from the network. In some embodiments, communication component 200 can transmit and/or receive information such as the distance between one or more of other candidate devices associated with the same entity and a BS, power of transceivers of the candidate devices, resources of the candidate devices, whether the candidate devices are configured/pre-selected to be a coordinating device or a non-coordinating device, security information, mobility information, channel access information, information facilitating initialization, management and/or transmission stages of MDC or the like.

Memory 210 can be a computer-readable storage medium storing computer-executable instructions and/or information for performing the functions described herein with reference to candidate device 200 (or any component of candidate device 200). For example, memory 210 can store computer-executable instructions that can be executed by processor 212 to select a candidate device for the position of coordinating device, to evaluate transceiver power or other resource of one or more candidate devices and/or for performing initialization, management and/or transmission stages of MDC. Processor 212 can perform one or more of the functions described herein with reference to candidate device 200 (or any component thereof). For example, processor 212 can perform operations for selection and/or maintenance of security, mobility management, capability negotiation, inner-networking, transmission mode operations or the like. Initialization stage component 204, management stage component 206 and transmission stage component 208 will be described in greater detail with reference to FIGS. 3-18.

Figure 3:
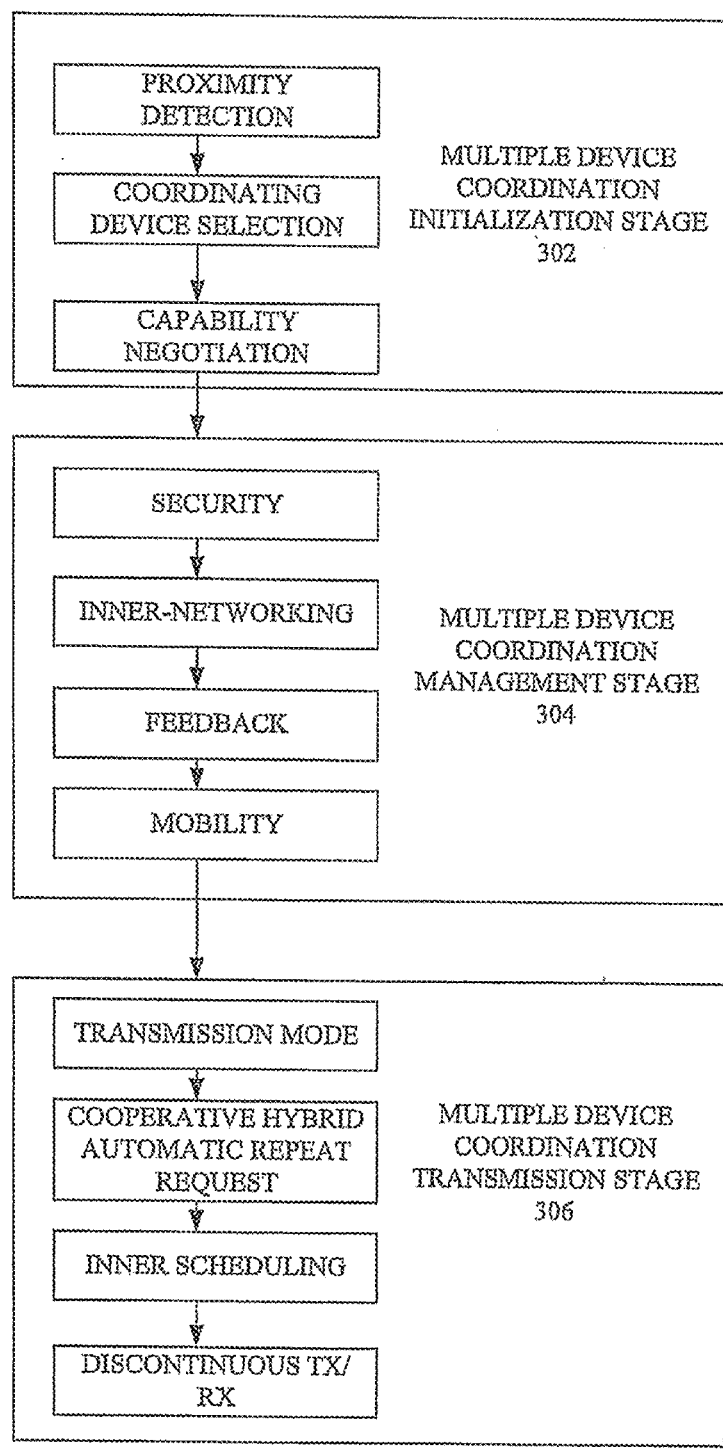
FIG. 3 is a diagram of an exemplary set of functional blocks describing stages of MDC in a wireless communication system in accordance with one or more embodiments of the disclosed subject matter.

Turning first to FIG. 3, shown is a diagram of an exemplary set of functional blocks describing stages of MDC in a wireless communication system in accordance with one or more embodiments of the disclosed subject matter. As shown, initialization stage 302, management stage 304 and/or transmission stage 306 can be employed in MDC for a wireless communication system. In the embodiment shown, the initialization stage 302 is completed, then the management stage 304 is commenced and completed, then the transmission stage is commenced and completed. In some embodiments, candidate device 200 can forego performing one or more of the stages (or substages within the stages). For example, one or more operations may be previously performed and/or information or data may be previously-stored (e.g. like a default configuration or value) and need not be re-performed.

Initialization stage 302 can include one or more operations to facilitate communication coordination between one or more candidate devices. As shown, initialization stage 302 can include proximity detection of one or more candidate devices associated with the same entity, coordinating device selection and/or capability negotiation between the selected coordinating device and one or more non-coordinating devices. The initialization stage 302 will be described in greater detail with reference to initialization stage component 204 of FIG. 4.

Figure 4:
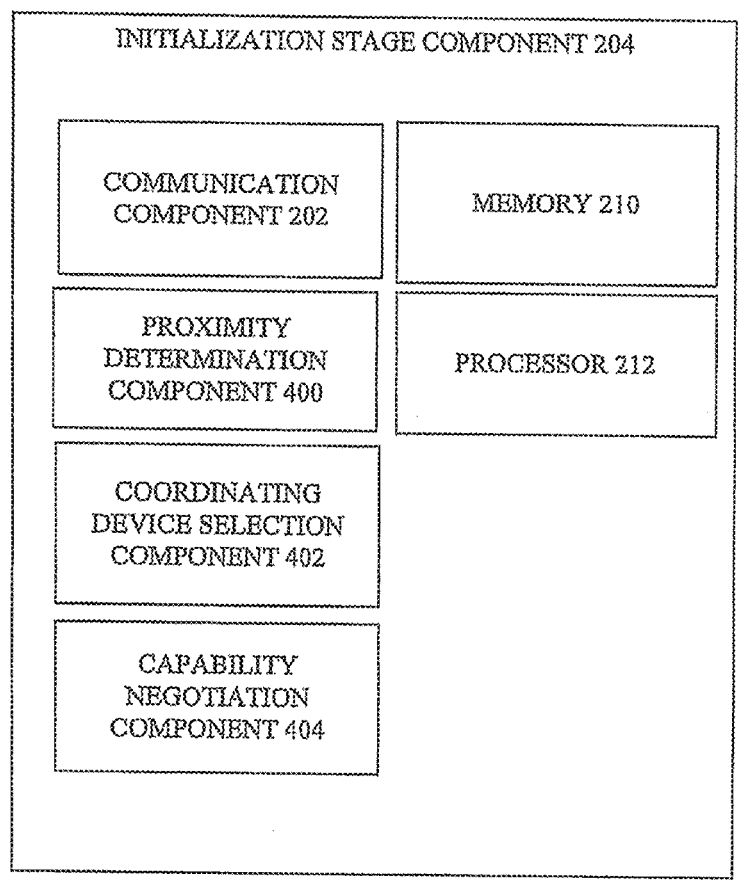
FIG. 4 is an illustration of a block diagram of an exemplary initialization stage component that can facilitate MDC in a wireless communication system in accordance with one or more embodiments of the disclosed subject matter.

FIG. 4 is an illustration of a block diagram of an exemplary initialization stage component that can facilitate MDC in a wireless communication system in accordance with one or more embodiments of the disclosed subject matter. As shown in FIG. 4, initialization stage component 204 can include communication component 202, proximity determination component 400, coordinating device selection component 402, capability negotiation component 404, memory 210 and/or processor 212. In various embodiments, one or more of communication component 202, proximity determination component 400, coordinating device selection component 402, capability negotiation component 404, memory 210 and/or processor 212 can be electrically and/or communicatively coupled to one another to perform one or more functions of initialization stage component 204. Repetitive description of like elements employed in respective embodiments of systems and/or apparatus described herein are omitted for sake of brevity.

With reference to FIGS. 3 and 4, proximity detection of initialization stage 302 can be performed by proximity determination component 400. Proximity determination component 400 can identify whether there are any candidate devices associated with the same entity that are geographically located within a defined distance or a defined signaling coverage relative to candidate device 200. By way of example, but not limitation, proximity determination component 400 can detect proximity of other candidate devices using the BLUETOOTH® protocol and/or radio fingerprinting.

In various embodiments, proximity detection can be performed by one or more of the candidate devices associated with the entity. As such, the candidate device that performs proximity detection can be the same as or different than the candidate device eventually selected as the coordinating device. In this regard, a candidate device can determine proximity to other candidate devices and another other candidate devices can be selected as the coordinating device, in some embodiments. In other embodiments, one or more of the candidate devices performed proximity detection can be the eventual coordinating device for the other candidate devices associated with the entity.

In some embodiments, proximity detection component 400 determines the candidate devices within a defined geographical distance of candidate device 200. In other embodiments, proximity detection component 400 determines the candidate devices within a defined geographical distance of a location determined by candidate device 200 and/or pre-programmed into one or more of the candidate devices 200 or the like.

Coordinating device selection component 402 can select the coordinating device from the set of identified candidate devices associated with the same entity. For example, in some embodiments, coordinating device selection component 402 can select a coordinating device from amongst the candidate devices identified by proximity detection component 400 as being with a defined geographical distance. Coordinating device selection component 402 can select the coordinating device based on one or more of the following criteria: longest battery life among one or more of the candidate devices, most powerful transceiver among one or more of the candidate devices, shortest sum distance between all candidate devices, shortest distance between connecting BS and the one or more candidate devices and/or the candidate device pre-configured to be the coordinating device (e.g., pre-configured by the entity with which the candidate devices are associated).

After coordinating device selection component 402 selects the coordinating device, and during or after initialization stage 302 is completed, the remaining candidate devices (e.g., the non-coordinating devices), can release RRC connections between the non-coordinating devices and the serving BSs for the non-coordinating devices after completion of or during initialization stage 302. In some embodiments, the serving BSs for the non-coordinating devices can remove information (e.g., resource identifier, user equipment (UE) context, public land mobile network (PLMN) setting) for the non-coordinating device. Accordingly, the non-coordinating devices (NCD) will be transparent to the network but will be involved in MDC transmission via the coordinating device. The coordinating device can maintain the RRC connection with the network such that the RRC connection for the non-coordinating devices (and the coordinating device) associated with the same entity is a single connection between the coordinating device for the candidate devices and the network.

Figure 5:
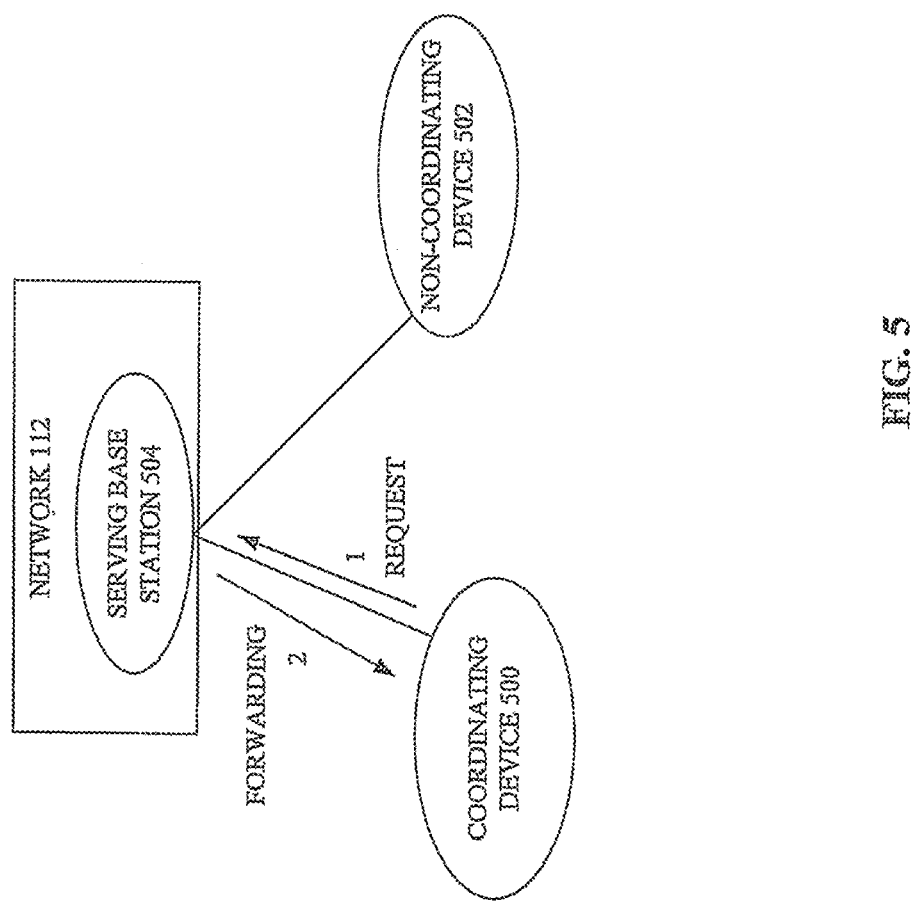
FIGS. 5, 6 and 7 are illustrations of block diagrams of exemplary embodiments of capability negotiation to facilitate the MDC initialization stage performed by initialization stage component of FIG. 4 in accordance with one or more embodiments of the disclosed subject matter.
Figure 6:
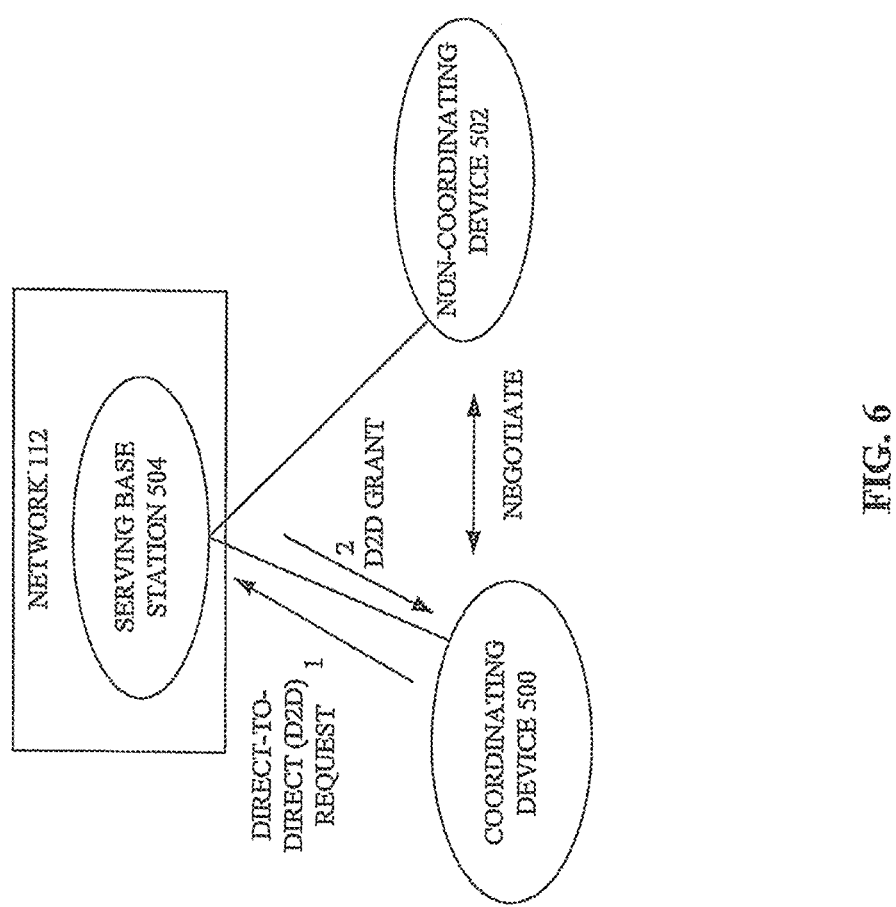
Figure 7:
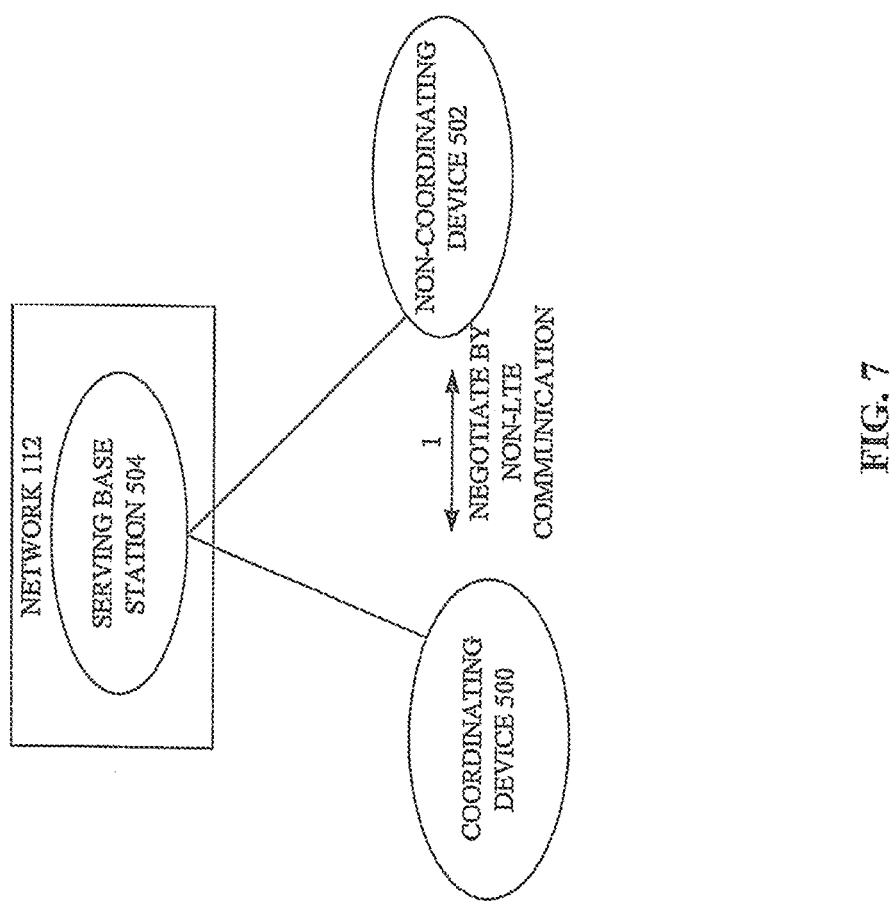

Capability negotiation component 404 can receive capability information forwarded from respective non-coordinating devices. Capability negotiation component 404 can then perform capability negotiation with the non-coordinating devices. FIGS. 5, 6 and 7 are illustrations of block diagrams of exemplary embodiments of capability negotiation to facilitate the MDC initialization stage performed by initialization stage component of FIG. 4 in accordance with one or more embodiments of the disclosed subject matter. Repetitive description of like elements employed in respective embodiments of systems and/or apparatus described herein are omitted for sake of brevity.

Turning first to FIG. 5, in one embodiment, a request for capability information can be transmitted from the coordinating device 500 to serving BS 504. For example, prior to determination that non-coordinating 502 will be a non-coordinating device and a separate RRC connection is no longer needed, non-coordinating device 502 can connect to (or be connected to) the network (e.g., network 112). Serving BS 504 can determine and/or record the capability of non-coordinating device 502 based on the previous RRC setup between non-coordinating device 502 and the network 112 with which serving BS 504 is associated. Upon receiving the request for the capability information, serving BS 504 can forward capability information about the capability and/or resources of non-coordinating device 502 to coordinating device 500.

Turning now to FIG. 6, another embodiment of capability negotiation is shown. In this embodiment, capability information can be forwarded by direct communication between non-coordinating device 502 and coordinating device 500. For example, coordinating device 500 can transmit a request to serving BS 504 to acquire direct-to-direct (D2D) communication with non-coordinating device 502. After the D2D resource is granted by serving BS 504, coordinating device 500 can negotiate capability of non-coordinating device 502 directly with non-coordinating device 502.

Turning now to FIG. 7, another embodiment of capability negotiation is shown. In this embodiment, capability information can be forwarded from non-coordinating device 502 to coordinating device 500 via communication types other than 4G and/or non-long-term evolution (LTE) communication types. By way of example, but not limitation, coordinating device 500 can negotiate with non-coordinating device 502 over a Wi-Fi channel (or other type of non-LTE radio access technology).

After capability is negotiated (or, in some embodiments, during capability negotiation), non-coordinating device 502 can release the RRC connection between non-coordinating device 502 and network 112. As noted above, in some embodiments, if coordinating device 502 has information about capability of non-coordinating device 502 from previous MDC operation, capability negotiation (or one or more aspects of capability negotiation) need not be performed. In some embodiments, the release can be initiated by non-coordinating device 502 sending a release request to network 112 and/or by non-coordinating device 502 prohibiting reception/transmission with network 112 (and thereby being automatically released by serving BS 504 when serving BS 504 determines that a lack of data transmission exists).

Figure 8:
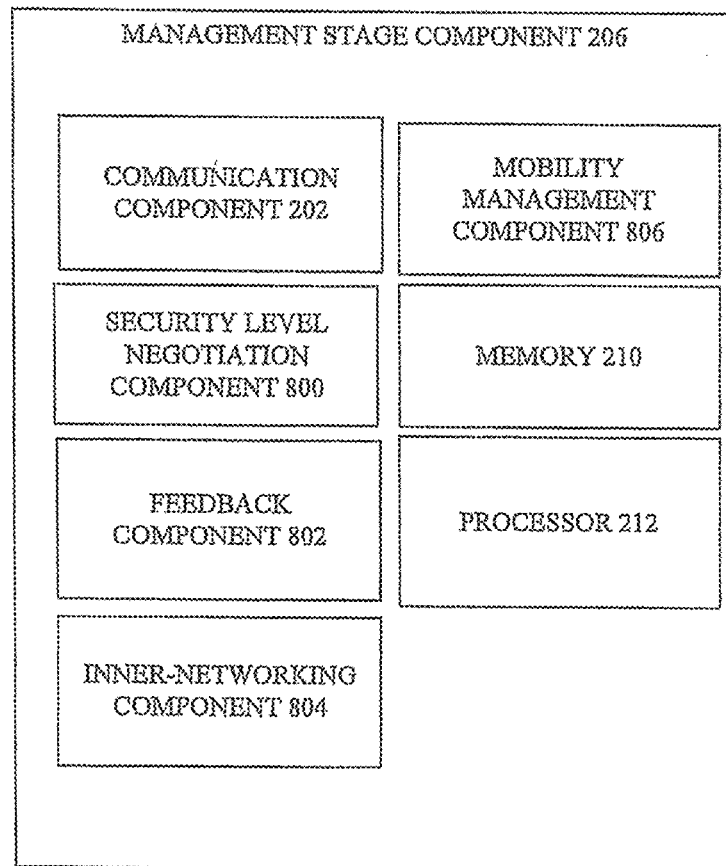
FIG. 8 is an illustration of a block diagram of an exemplary management stage component that can facilitate MDC in a wireless communication system in accordance with one or more embodiments of the disclosed subject matter.

Turning back to FIG. 3, as shown, management stage 304 can follow completion of one or more steps of initialization stage 302 (and/or can be performed stage 304 by management stage component 206 of FIG. 8). In various embodiments, only the coordinating device will perform the functions of management stage 206.

FIG. 8 is an illustration of a block diagram of an exemplary management stage component that can facilitate MDC in a wireless communication system in accordance with one or more embodiments of the disclosed subject matter. As shown in FIG. 8, management stage component 206 can include communication component 202, security level negotiation component 800, feedback component 802, inner-networking component 804, mobility management component 806, memory 210 and/or processor 212. In various embodiments, one or more of communication component 202, security level negotiation component 800, feedback component 802, inner-networking component 804, mobility management component 806, memory 210 and/or processor 212 can be electrically and/or communicatively coupled to one another to perform one or more functions of management stage component 206. Repetitive description of like elements employed in respective embodiments of systems and/or apparatus described herein are omitted for sake of brevity.

Inner-networking component 804 can perform one or more operations before actual data transmission between non-coordinating devices and the network via the coordinating device. Inner-networking component 804 can determine a type of network connection to employ between a non-coordinating device and the coordinating device based on the capability information determined and/or negotiated during initialization stage 302.

Any number of different types of connections can be established. By way of example, but not limitation, a 4G network connection (e.g., LTE network connection) can be established or an LTE D2D network connection can be established.

In some embodiments, if LTE D2D connection is established between a non-coordinating device and the network (via MDC coordinating device operation), inner-networking component 804 need not establish individual D2D connections between the coordinating device and the non-coordinating device. Instead, inner-networking component 804 can determine an amount (or minimum amount) of bandwidth and/or the frequency of communication period to be employed for inner-networking. Inner-networking component 804 can then request the corresponding bandwidth and/or transmission resources from the serving BS for the coordinating device. After the LTE D2D connection is granted, or during grant of the LTE D2D connection, the coordinating device can determine which non-coordinating device can perform direct communication with the coordinating device based on one or more defined rules. The rules can be as described with reference to FIGS. 9, 10 and 11.

Figure 9:
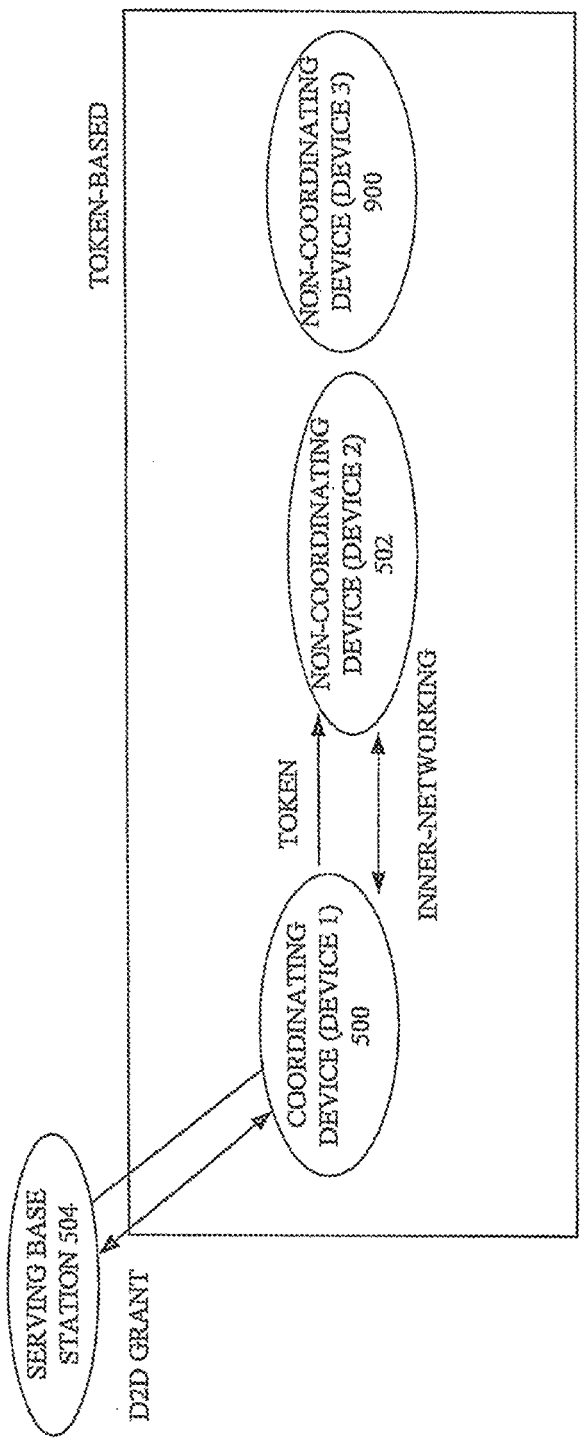
FIGS. 9, 10 and 11 are illustrations of block diagrams of exemplary embodiments of inner-networking approaches to facilitate the MDC management stage performed by management stage component of FIG. 8 in accordance with one or more embodiments of the disclosed subject matter.
Figure 10:
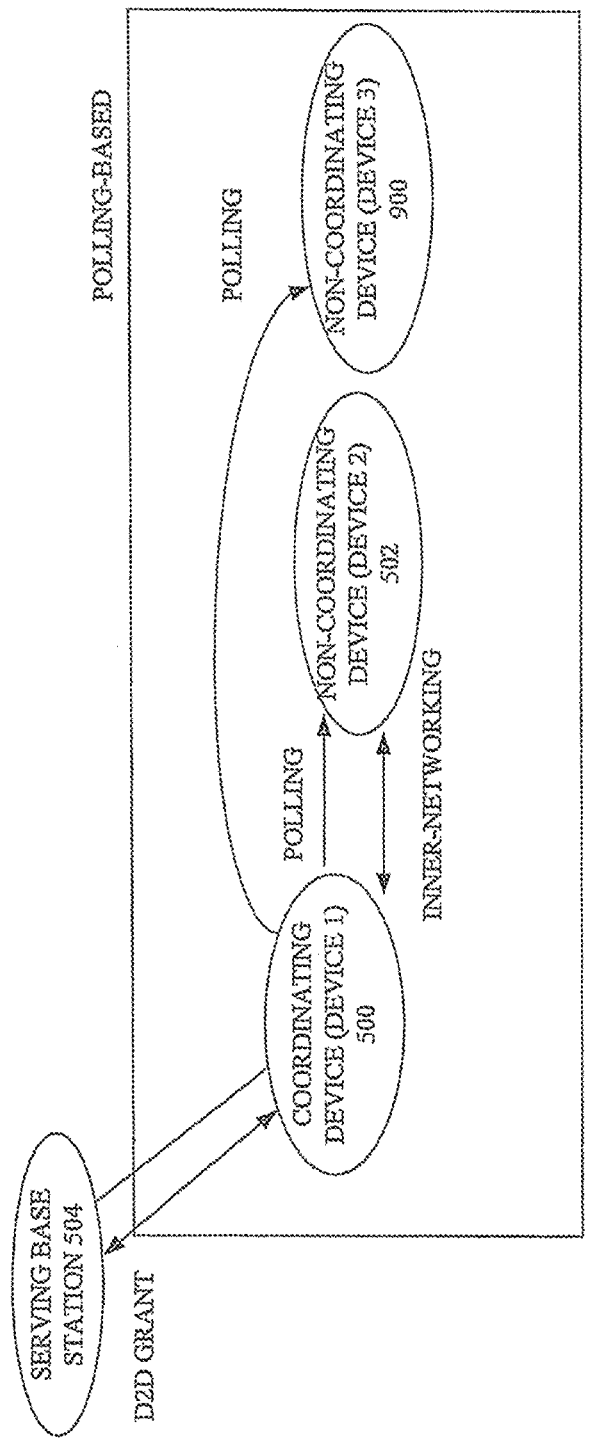
Figure 11:
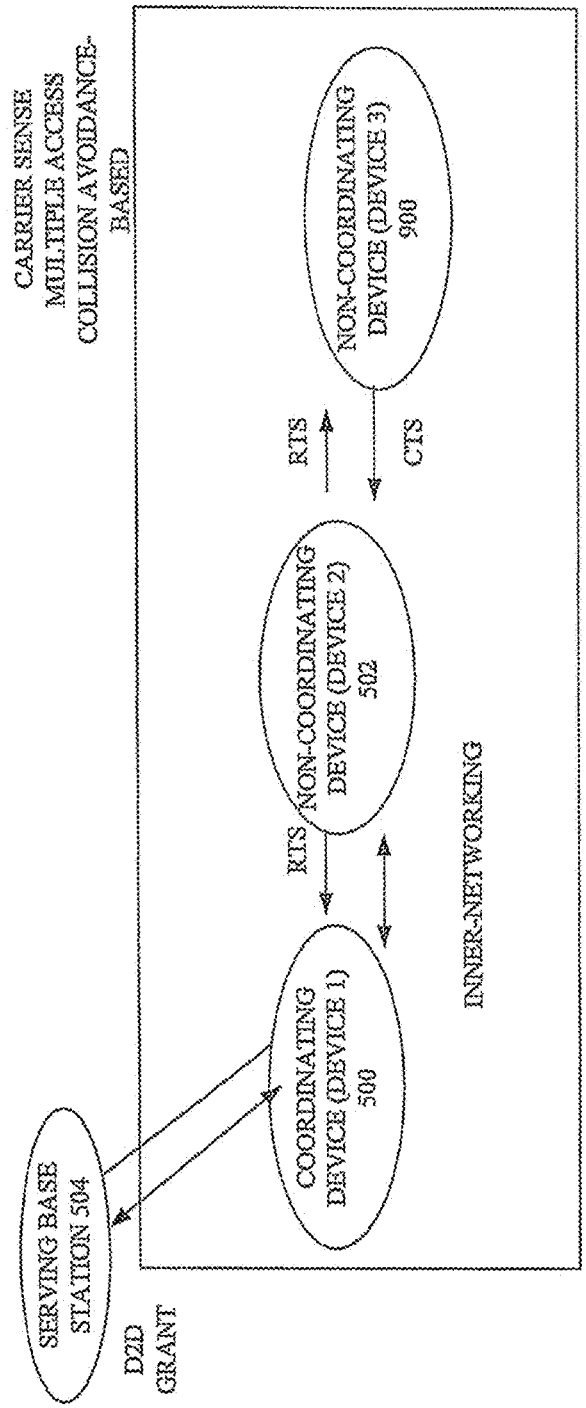

FIGS. 9, 10 and 11 are illustrations of block diagrams of exemplary embodiments of inner-networking approaches to facilitate the MDC management stage performed by management stage component of FIG. 8 in accordance with one or more embodiments of the disclosed subject matter. Repetitive description of like elements employed in respective embodiments of systems and/or apparatus described herein are omitted for sake of brevity.

Turning first to FIG. 9, in some embodiments, as shown, inner-networking component 804 can select a token-based inner-networking approach. In this embodiment, inner-networking component 804 of coordinating device 500 can assign a token to a non-coordinating device (e.g., non-coordinating device 502). The token can be employed (or, in some embodiments, required) to perform inner-networking. One or more (or all) non-coordinating devices associated with the same entity as coordinating device 00 can monitor the D2D connection to see whether a token will be granted and/or initiate inner-networking with coordinating device 500 employing the token. When inner-networking is finished, the token can be recycled back to coordinating device 500. In this embodiment, inner-networking is initiated by and/or oriented from coordinating device 500.

Turning now to FIG. 10, inner-networking component 804 can employ a polling-based inner-networking approach. In this embodiment, inner-networking component 804 can periodically reserve at least one inner-networking opportunity for one or more (or all) non-coordinating devices (e.g., non-coordinating devices 502, 900). In some embodiments, a non-coordinating device only monitors the slot associated with the scheduled opportunity, and can thereby reduce power consumption relative to embodiments in which the non-coordinating device monitors all slots (or slots other than that associated with the scheduled opportunity).

Turning now to FIG. 10, inner-networking component 804 can employ a carrier sense multiple access with collision avoidance (CSMA-CA)-based approach to inner-networking. In this embodiment, if non-coordinating device 900, 502 wants to use inner-networking, non-coordinating device 900, 502 can send a request to send (RTS) message and non-coordinating device 900, 502 will be allowed to use a D2D connection when receiving clear to send (CTS) messages. Unlike the previous two approaches described with reference to FIGS. 9 and 10, this approach supports a non-coordinating device automatically initiating the inner-networking.

In embodiments in which a non-LTE connection is employed for inner-networking, the coordinating device can request a transmission gap with the serving BS. The transmission gap can be the time interval that inner-networking is performed and the coordinating device is unable to receive/transmit any packet with the serving BS. In this embodiment, the serving BS will not schedule any associated packet during the transmission gap.

Turning back to FIG. 8, management stage component 206 can include security level negotiation component 800. Security level negotiation component 800 can facilitate and/or determine security for communication between the network and one or more of the non-coordinating devices (via coordinating device operating according to MDC embodiments described herein). In various embodiments, for example, security level negotiation component 800 can exchange a traffic encryption key (TEK) and/or algorithmic encryption key (AEK) with the network. When a new key is updated, security level negotiation component 800 can transmit one or more of the keys to one or more of the non-coordinating devices to facilitate decoding of packets from the network by the non-coordinating devices.

In some embodiments, the security algorithm employed during inner-networking can differ from the adopted security algorithm in the network. Also, in some embodiments, an update of a security key used during inner-networking can be performed and/or, in some embodiments, required.

Management stage component 206 can also include mobility management component 806. Mobility management component 806 can perform one or more functions to facilitate a non-coordinating device moving from one network to another network. In various embodiments, mobility management component 806 can perform mobility management for the devices in the MDC system since the devices will typically have similar channel quality and/or identical moving trajectory.

Figure 12:
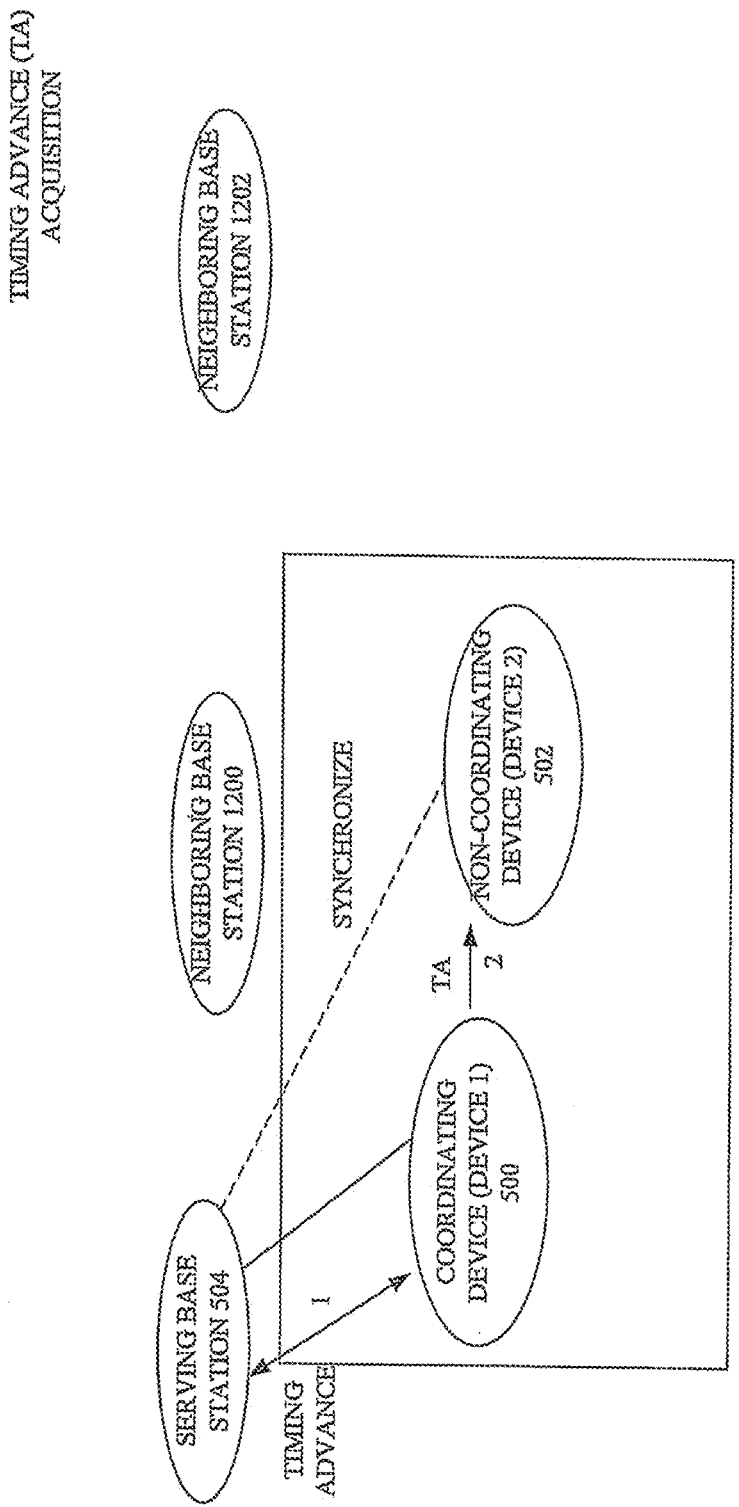
FIGS. 12, 13 and 14 are illustrations of block diagrams of exemplary embodiments of mobility management steps to facilitate the MDC management stage performed by management stage component of FIG. 8 in accordance with one or more embodiments of the disclosed subject matter.
Figure 13:
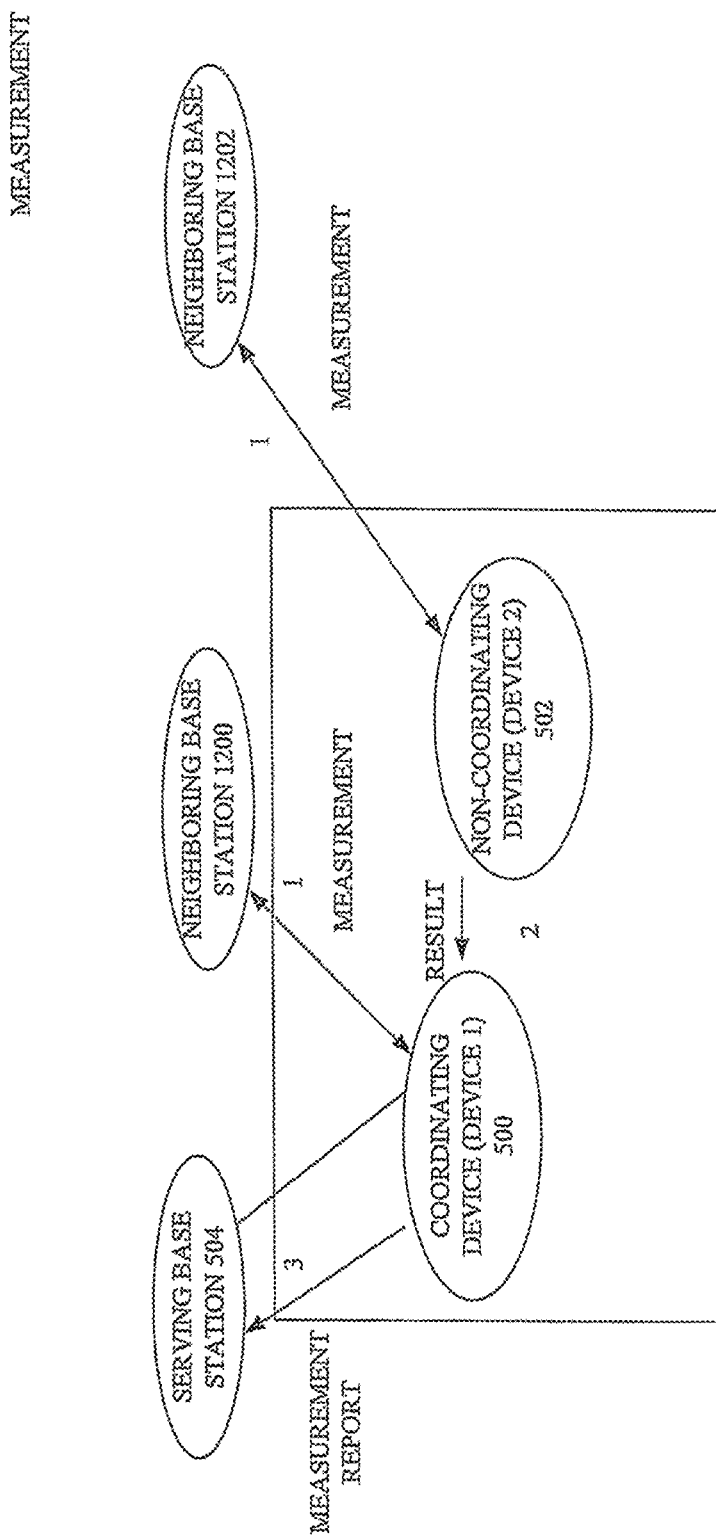
Figure 14:
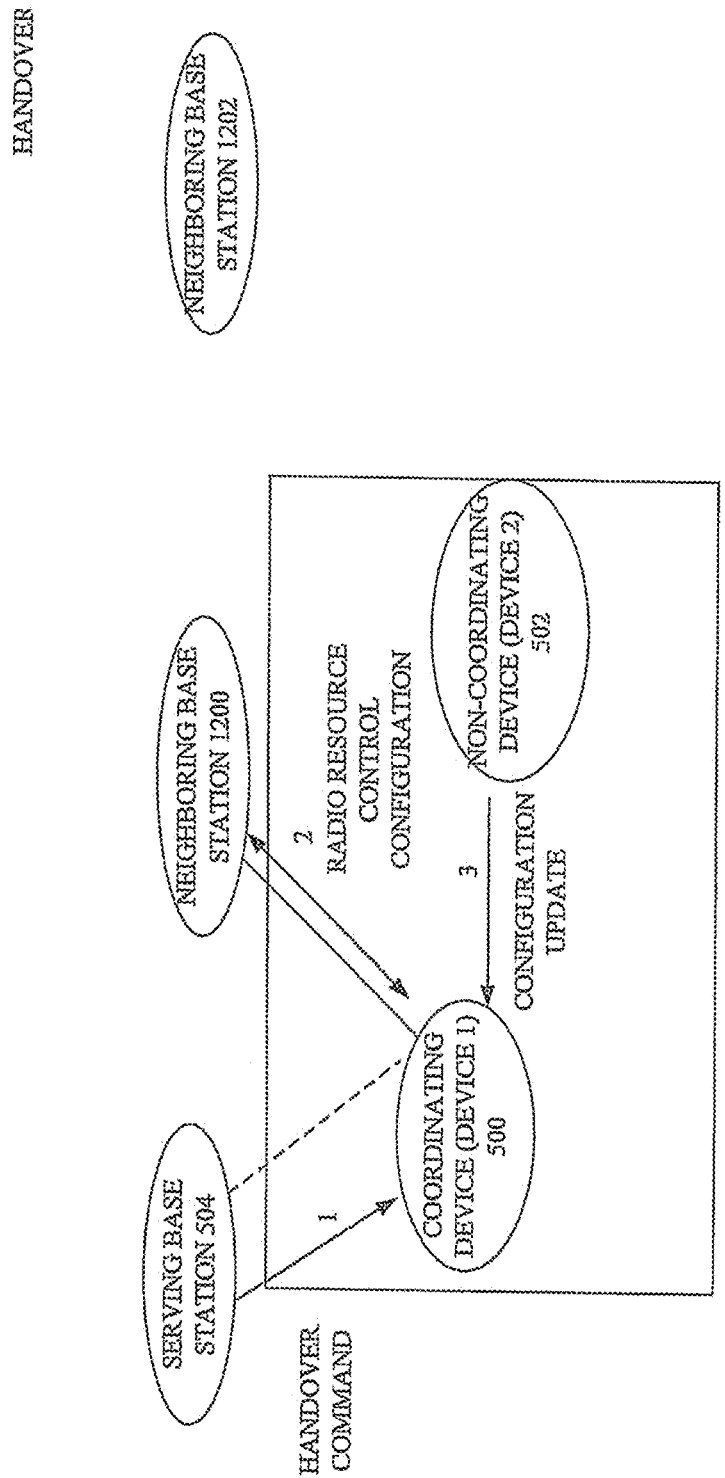

FIGS. 12, 13 and 14 are illustrations of block diagrams of exemplary embodiments of mobility management steps to facilitate the MDC management stage performed by management stage component of FIG. 8 in accordance with one or more embodiments of the disclosed subject matter. Repetitive description of like elements employed in respective embodiments of systems and/or apparatus described herein are omitted for sake of brevity.

Turning first to FIG. 12, in the embodiment shown, mobility management component 806 can first perform timing advance (TA) acquisition to maintain the uplink by synchronization with a serving BS. For example, mobility management component 806 can perform a random access procedure whereby coordinating device 500 sends a preamble to serving BS 504 and waits for a response to the TA value. When the TA value is acquired, coordinating device 500 can forward the TA value for non-coordinating device 502 to non-coordinating device 502. Accordingly, in this embodiment, coordinating device 500 can reuse the TA value to maintain the uplink synchronization with serving BS 504 as well. When the entity to which coordinating device 500 and non-coordinating device 502 are associated moves, coordinating device 500 can perform measurement and/or employ handover processes as described with reference to FIGS. 13 and 14 to change the serving BS for coordinating device 500 (and, by extension, for non-coordinating devices for which coordinating device 500 provides MDC).

Turning to FIG. 13, mobility management component 806 can perform measurement-based action to collect information from neighboring BSs (e.g., neighboring BS 1200) to make a target BS selection (or provide information that can be employed to make a target BS selection). During measurement, mobility management component 806 can measure the reference signal received power (RSRP)/reference signal received quality (RSRQ) of a neighboring cell. In one embodiment, the measurement can be made by coordinating device 500 or, in another embodiment, coordinating device 500 can request that non-coordinating device 502 measures the indicated cell. If coordinating device 500 requests that non-coordinating device 502 measure the indicated cell, the measurement process can be performed more quickly than the measurement process if coordinating device 500 performs the measurement directly since a parallel measurement (e.g., inter-frequency measurement) can be achieved by multiple devices with multiple antennas. The result measured from non-coordinating device 502 can be reported to coordinating device 500. When measurement results are collected, coordinating device 500 can report the information to serving BS 504 and await a handover decision.

Turning to FIG. 14, mobility management component 806 can also perform handover-based action to break the connection with original serving BS (e.g., serving BS 504) and switch to a target BS (e.g., neighboring BS 1200). If handover is initiated, mobility management component 806 can attempt synchronization with the target BS (e.g., neighboring BS 1200) and obtain an RRC configuration for the target BS. When configuration is completed, coordinating device 500 can transmit the system information to non-coordinating device 502. For example, when a new Cell Radio Network Temporary Identifier (C-RNTI) is assigned, coordinating device 500 can transmit the C-RNTI to non-coordinating device 502 for facilitating transmission with the target BS.

Turning back to FIG. 8, feedback component 802 can facilitate the management stage of MDC as well. For example, in a legacy LTE network, the coordinating device can provide device transmission information as feedback to facilitate the decision of the BS. Transmission information can include, but is not limited to, channel quality identifier (CQI) information, acknowledge information, non-acknowledge (A/N) information and/or scheduling request (SR) information. To provide the feedback information, the BS can configure corresponding radio resources in Physical Uplink Control Channel (PUCCH) or Physical Uplink Shared Channel (PrelayH) and consequently, the device can feedback the information based on the specified timing or event.

Feedback component 802 can provide CQI feedback with the value measured by the coordinating device (e.g., via legacy operations, in some embodiments) due to channel quality of coordinating devices and non-coordinating devices for the same entity typically being similar to one another. Non-coordinating devices can forego the feedback even if the non-coordinating devices have transmissions.

Feedback component 802 can provide A/N feedback. However, the coordinating device can provide the following acknowledgement responses based on determinations regarding whether the transmission is correctly decoded. In one embodiment, a Reply Acknowledge message can be sent by the coordinating device when the coordinating device decodes a correct packet through its baseband. In another embodiment, a Reply Acknowledge message can be sent when one of the devices (one or more of the coordinating device or the non-coordinating device) decodes a correct packet (the non-coordinating devices can forward the correct packet to coordinating device).

In another embodiment, a Reply Acknowledge message can be sent when the coordinating device employs cooperative hybrid automatic repeat request (HARQ) and obtains a correct packet after cooperation. The cooperative HARQ means a soft combining is used by the coordinating device and/or non-coordinating device (the non-coordinating device can selectively forward the receiving packet to the coordinating device and the coordinating device can decode the packets in a combining approach). In various embodiments, the combining approach can be a chase combining approach or an incremental redundancy approach.

In another embodiment, a Reply Acknowledge message can be sent when every device decodes a correct packet on its baseband. The coordinating device can have the capability to decide which kind of the deciding algorithm is applied. The selection of the algorithm can depend on the transmission mode adopted by the MDC and/or the robustness desired for the running applications. While the coordinating device can determine which deciding algorithm is appropriate, the coordinating device can request the non-coordinating device provide one or more corresponding operations (e.g., forward A/N based on the receiving or forward received packet for further cooperation).

In some embodiments, feedback component 802 can feed back an SR. For example, in some embodiments, feedback component 802 can aggregate one or more (or the entire set of) scheduling requests from one or more non-coordinating devices and/or send the aggregated requests to the serving BS. In some embodiments, feedback component 802 can set a timer and aggregate the requests received before timer expiration. The timer can re-set when the coordinating device makes a SR to the BS. During aggregation, feedback component 802 can calculate the total required bandwidth and/or determine or categorize the quality of service (QoS) of aggregated data. Alternatively, feedback component 802 can send a SR immediately without aggregation if the packet from any device is non-delay tolerant.

Figure 15:
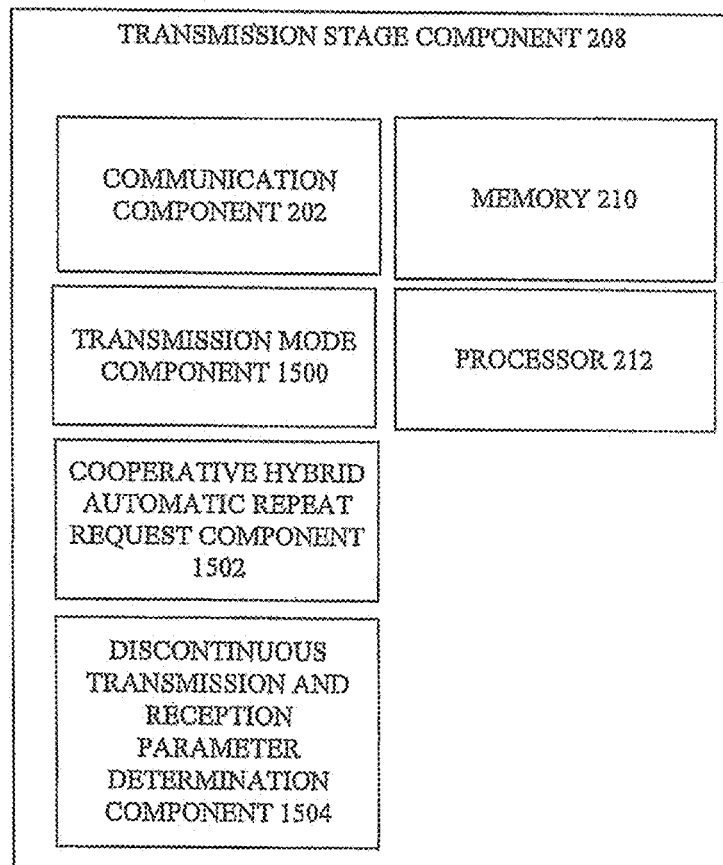
FIG. 15 is an illustration of a block diagram of an exemplary transmission stage component that can facilitate MDC in a wireless communication system in accordance with one or more embodiments of the disclosed subject matter.

Turning back to FIG. 3, as shown, transmission stage component 306 can be performed after management stage 304, and can be performed by transmission stage component 208. FIG. 15 is an illustration of a block diagram of an exemplary transmission stage component that can facilitate MDC in a wireless communication system in accordance with one or more embodiments of the disclosed subject matter.

Transmission stage component 208 can include communication component 202, transmission mode component 1500, cooperative HARQ component 1502, discontinuous transmission and reception parameter determination component 1504, memory 210 and/or processor 212. In various embodiments, one or more of communication component 202, transmission mode component 1500, cooperative HARQ component 1502, discontinuous transmission and reception parameter determination component 1504, memory 210 and/or processor 212 can be electrically and/or communicatively coupled to one or more of communication component 202, transmission mode component 1500, cooperative HARQ component 1502, discontinuous transmission and reception parameter determination component 1504, memory 210 and/or processor 212 to perform the functions of transmission stage component 208. Repetitive description of like elements employed in respective embodiments of systems and/or apparatus described herein are omitted for sake of brevity.

During (or as a result of) transmission stage 306, traffic flow (e.g., routing) can be distributed among one or more devices served by the MDC and/or decisions can be made regarding how to process downlink and/or uplink transmission. In various embodiments, transmission stage 306 can provide satisfactory or desirable traffic offloading for avoiding or reducing the likelihood of traffic congestion and/or bottleneck in any device in MDC and/or support fast adaption on the transmission to take advantage of available resources. In some embodiments, transmission stage 306 can include scheduling discontinuous transmission to allow a device to turn off the device transceiver at specific times (or timing) for power savings.

As shown, transmission stage component 208 can include transmission mode component 1500. In some embodiments, when MDC is enabled, transmission mode component 1500 can enable activation of one or more antennas. Transmission mode component 1500 can select one or more of the activated antennas to handle corresponding transmissions separately or jointly. With the flexible usage of one or more different antennas, the MDC system can provide desirable transmission efficiency or robustness. Depending on the use of the one or more antennas, transmission mode component 1500 can provide at least four different transmission modes for data transmission.

Figure 16:
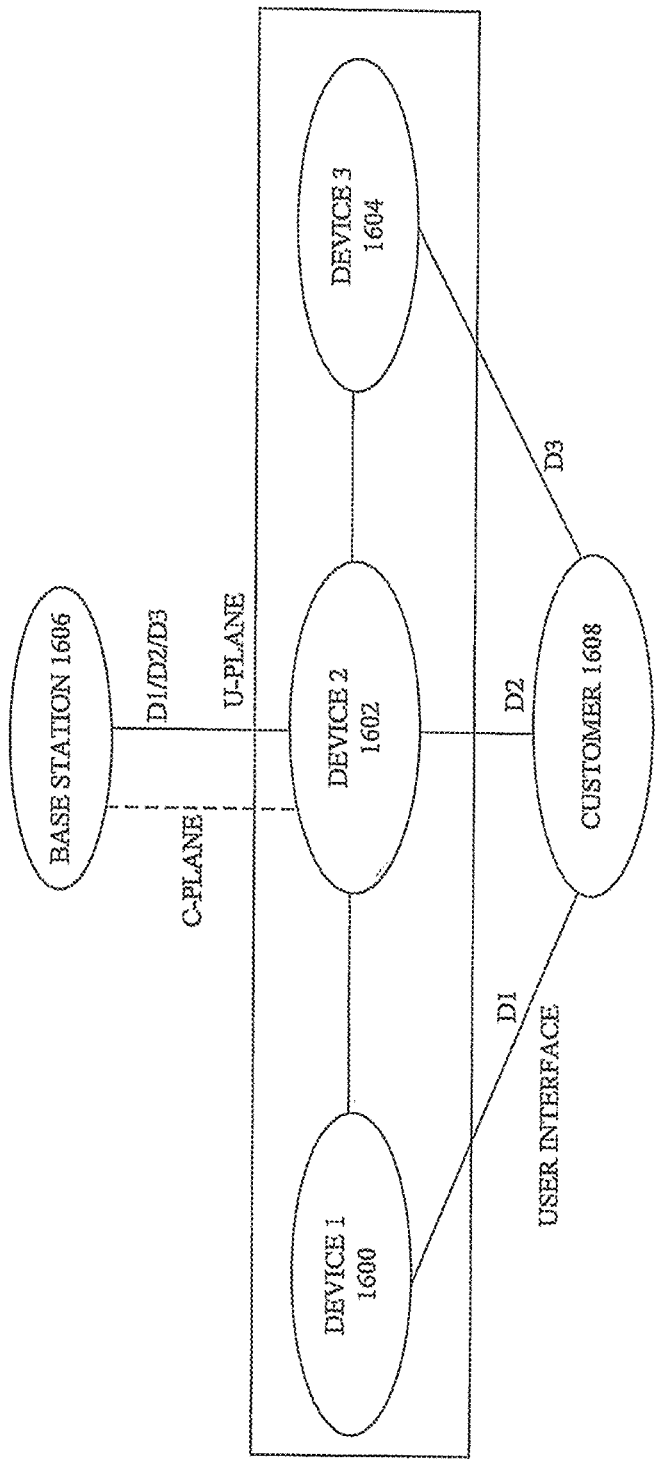
FIGS. 16, 17 and 18 are illustrations of block diagrams of exemplary embodiments of transmission modes to facilitate the MDC transmission stage performed by transmission stage component of FIG. 15 in accordance with one or more embodiments of the disclosed subject matter.
Figure 17:
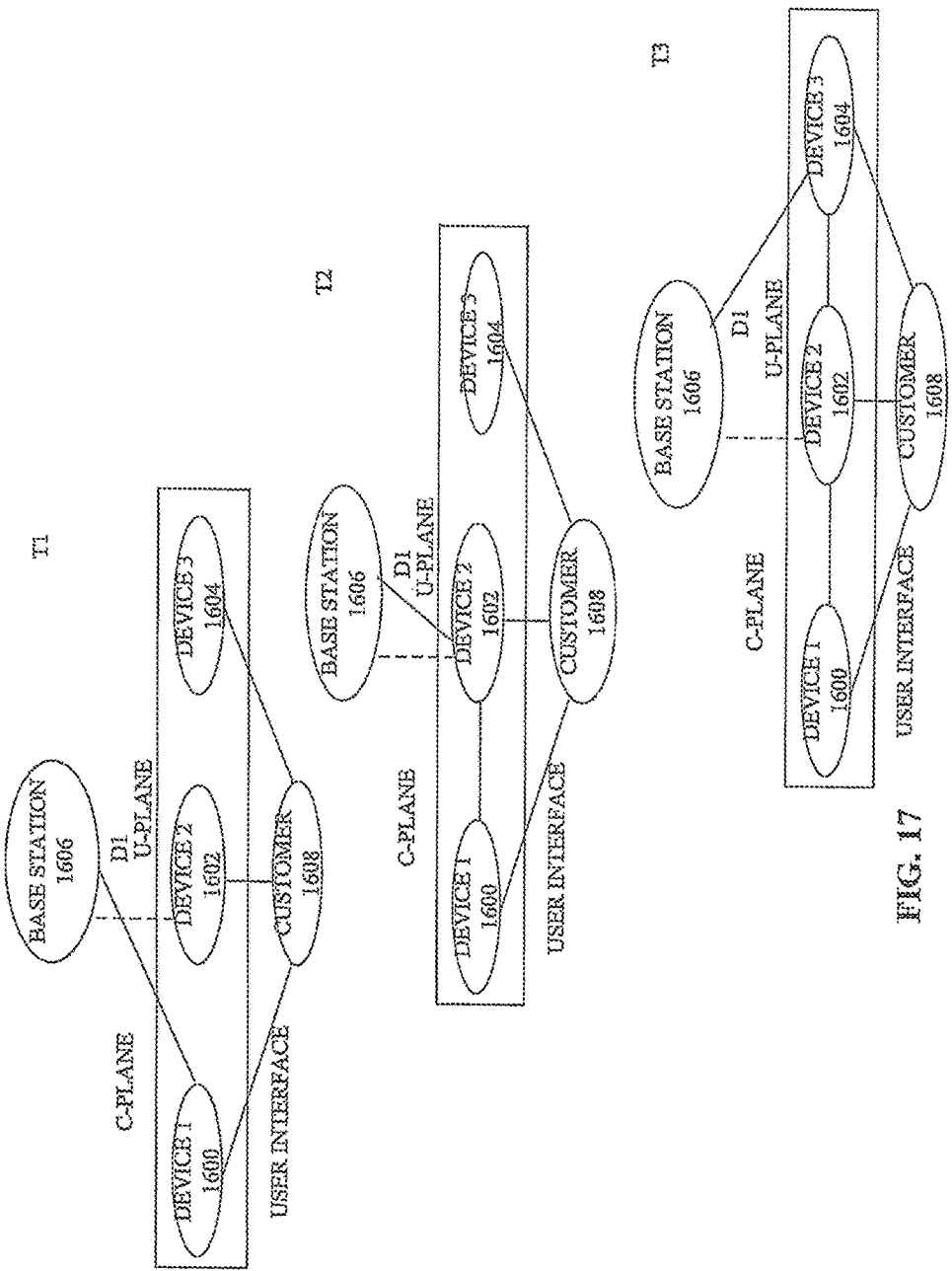
Figure 18:
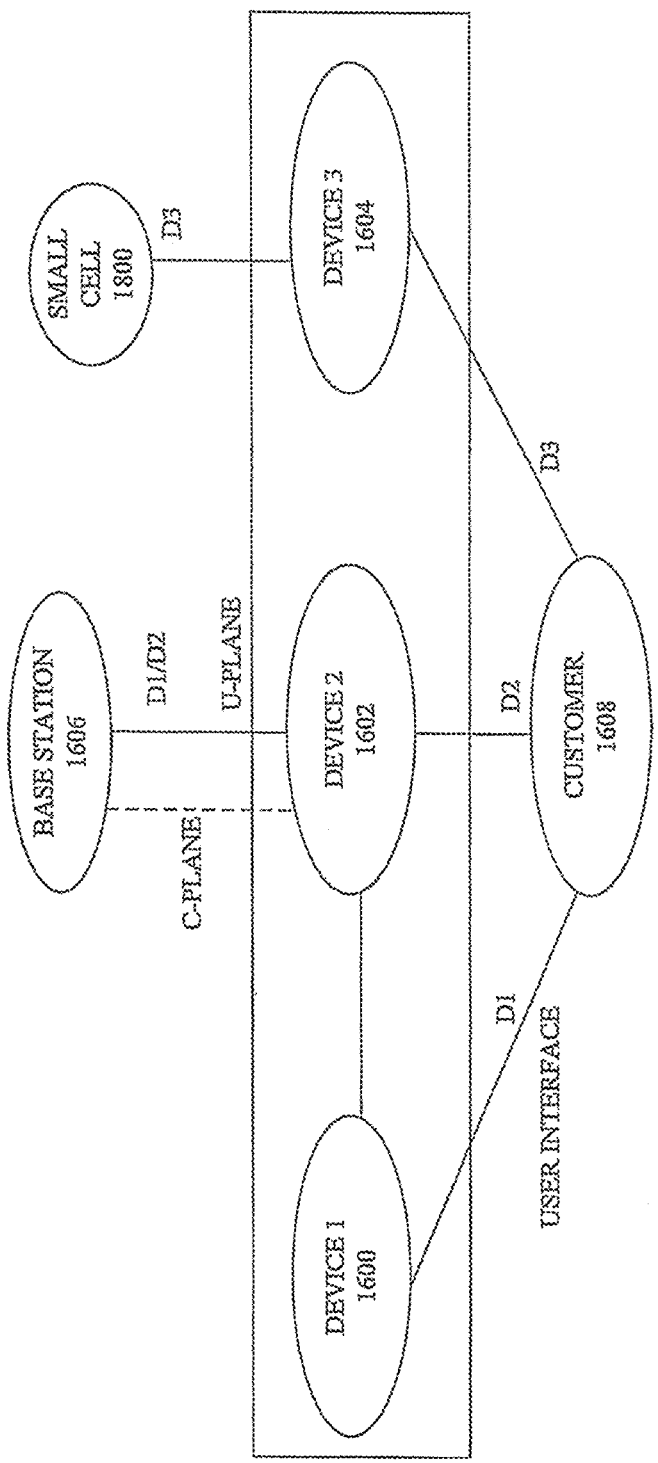

FIGS. 16, 17 and 18 are illustrations of block diagrams of exemplary embodiments of transmission modes to facilitate the MDC transmission stage performed by transmission stage component of FIG. 15 in accordance with one or more embodiments of the disclosed subject matter. For example, FIG. 16 is an illustration of a block diagram of an exemplary embodiment of the first transmission mode. In the first transmission mode, one or more (or all) devices (e.g., device 1 1600, device 2 1602, device 3 1604) and coordinating device associated with an entity are connected to a BS and the devices can transmit/receive packets sequentially. Accordingly, one or more of the non-coordinating devices, for example, can transmit/receive identical packets simultaneously, or concurrently, through identical radio resources (e.g., time and/or frequency resources). Space diversity can be acquired in this transmission mode and robust transmission can result. The coordinating device can determine which traffic flow (associated with what particular non-coordinating device) is suitable by using this transmission mode and scheduling the transmission sequences.

As shown in FIG. 16, serving BS can schedule the transmission of data (e.g., D1/D2/D3) to device 1 1600, device 2 1602 and device 3 1604 at corresponding resources to the coordinating device. The coordinating device can make an SR for the data for which the destination for data D1 is device 1, for which the destination for data D2 is device 2 and/or for which the destination for data D3 is device 3 or the coordinating device could piggyback the scheduling request at its PDU for data D2 and D3.

One or more (or all) devices 1600, 1602, 1604 can attempt to monitor the PDCCH and receive data D1/D2/D3 at the same resource simultaneously, or concurrently. In some embodiments, the device receiving the data can relay the data to the intended destination device.

Turning back to FIG. 15, cooperative HARQ component 1502 can perform a relaying. For example, when the destination device correctly decodes a packet, the destination device can send the packet into the buffer for the destination device and/or show the content on the user interface for the destination device. As compared with non-MDC systems, there can be transmission latency in this transmission mode (e.g., D3 may be delayed after D1 and/or D2). The coordinating device can decide the transmitted packet order in this mode to prevent, or reduce the likelihood of, a quality of service (QoS) violation.

In another embodiment, transmission mode component 1500 can implement transmission mode 2. In transmission mode 2, one or more (or all) non-coordinating devices in the MDC system can be connected to a BS and the devices can transmit/receive packets sequentially. The transmission content can be identical or different dependent on the application. In some embodiments, time diversity can be achieved in this mode if the packet content is identical (e.g., a similar packet being repeatedly transmitted but received by different devices).

For example, FIG. 17 is an illustration of a block diagram of an exemplary embodiment of the second transmission mode. As shown, packet D1 is repeated three times at T1, T2 and T3 and different non-coordinating devices receive the packet. Cooperative HARQ component 502 can be applied in this transmission mode and/or device 1 1600 can finish overall decoding after T3 and output the D1 packet if the packet was successful decoded. The coordinating device is configured to notify the serving BS to send the identical content at three respective TTI.

Devices that do not need to transmit/receive at a specific time lot (e.g. device 2 1602 and device 3 1604 in T1) can turn off transceiver power and/or they can perform inner-networking if the coordinating device does not transmit data to/from the BS. Transmission stage component 208 can make the determination regarding inner-networking as described below.

Turning now to FIG. 18, shown is an illustration of a block diagram of an exemplary embodiment of the third transmission mode. As shown, the coordinating device can establish dual-connectivity in which one connection is with BS 1606 and the other connection is with small cell 1800. Afterwards, the coordinating device can categorize the devices to communicate with BS 1606 and small cell 1800 independently. In transmission mode 3, parallel transmission with different or identical content can be enabled.

Transmission mode component 1500 can also enable a fourth transmission mode (not shown). The fourth transmission mode can be a combination of the second and third transmission modes in which dual connectivity is established but the transmission is not parallel.

Cooperative HARQ component 1502 can be activated when more than one non-coordinating device is attempting to receive identical packets from the BS. For example, the devices that are not destination devices can behave as a relay to forward the corresponding packet. In various embodiments, cooperative HARQ component 1502 can provide cooperative relaying by amplify-and-forward relaying and/or by decode-and-forward relaying. In addition, the relaying can be selective whereby the destination device can try to decode the packet by itself and, if decoding fails, further request the relaying for the retransmission. Employing cooperative HARQ component 1502, retransmission can be performed by the BS or the relay (other devices). Hence, more choices of retransmission source and/or opportunity can be created and thereby improve the transmission quality.

Inner-scheduling can be performed by transmission mode component 1500. For example, when different transmission modes are used in MDC, different performance can result. For example, transmission mode 1 can result in transmission latency but provide robust transmission while transmission mode 3 will create high capacity with high power consumption. The coordinating device can consider the QoS requirements of running applications and decide which mode is ideal or suitable.

With inner-scheduling, when transmission mode is determined, the coordinating device can determine packet transmission order associated with different devices/applications and send corresponding scheduling requests. If cooperative HARQ is supported, the coordinating device can also schedule the opportunity for using inner-networking to relay the packets between the destination device and a device that is not the destination device (e.g., providing retransmission).

Discontinuous transmission and reception parameter determination component 1504 can determine a parameter to associate with one of the one or more non-coordinating devices for discontinuous transmission and reception operation. In some embodiments, the parameter being associated with the one of the one or more non-coordinating devices for discontinuous transmission and reception operation includes a discontinuous reception parameter configured by a serving BS.

In conventional LTE networks, a device can turn off power even when the RRC connection is maintained. This is because the BS can configure a DRX cycle with related parameters to let the device know when there is an active period for the device to receive its belonged packet and the device can discontinue monitoring after the active period. Since only the coordinating device maintains the RRC connection with the serving BS in these embodiments, discontinuous transmission and reception parameter determination component 1504 would typically configure one DRX parameter set for the entire set of non-coordinating devices and coordinating device associated with the entity. However, it is not necessary to apply the parameter setting for all devices. Instead, discontinuous transmission and reception parameter determination component 1504 can further decide the corresponding DRX parameter for one or more (or each) of the non-coordinating devices.

Figure 19:
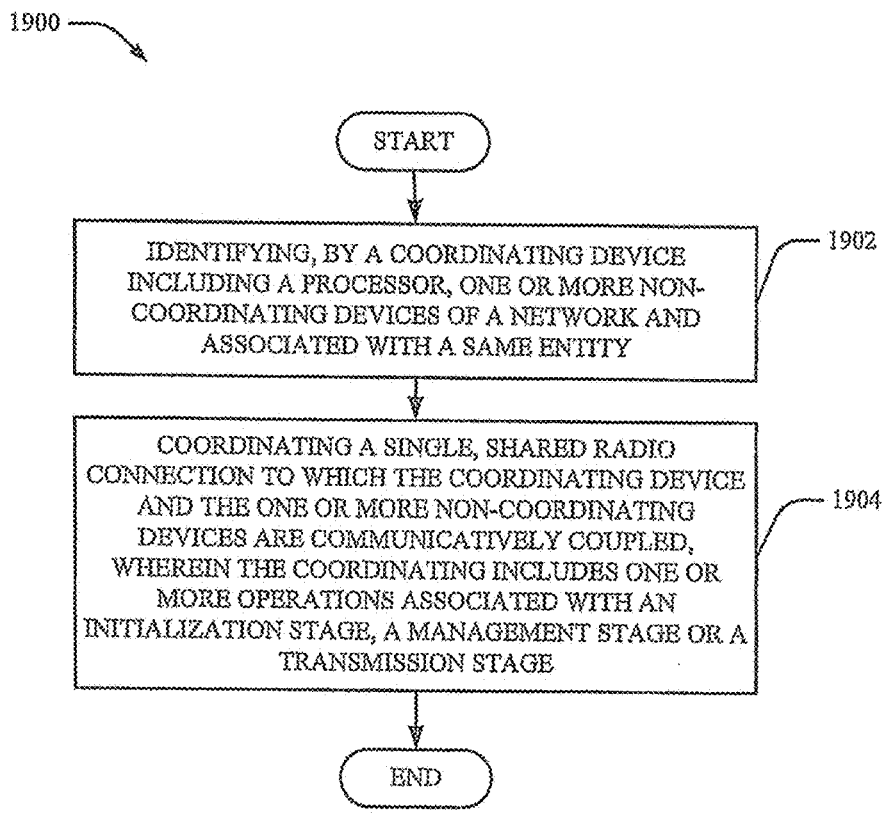
FIGS. 19, 20, 21, 22, 23 and 24 are flowcharts of exemplary methods to facilitate MDC in a wireless communication system in accordance with one or more embodiments of the disclosed subject matter.

FIGS. 19, 20, 21, 22, 23 and 24 are flowcharts of exemplary methods to facilitate MDC in a wireless communication system in accordance with one or more embodiments of the disclosed subject matter. Turning first to FIG. 19, at 1902, method 1900 can include identifying, by a coordinating device including a processor, one or more non-coordinating devices of a network and associated with the same entity. In one or more embodiments, coordinating includes one or more operations associated with: an initialization stage, a management stage or a transmission stage.

At 1904, method 1900 can include coordinating a single, shared radio connection to which the coordinating device and the one or more non-coordinating devices are communicatively coupled, wherein the coordinating includes one or more operations associated with an initialization stage, a management stage or a transmission stage.

Figure 20:
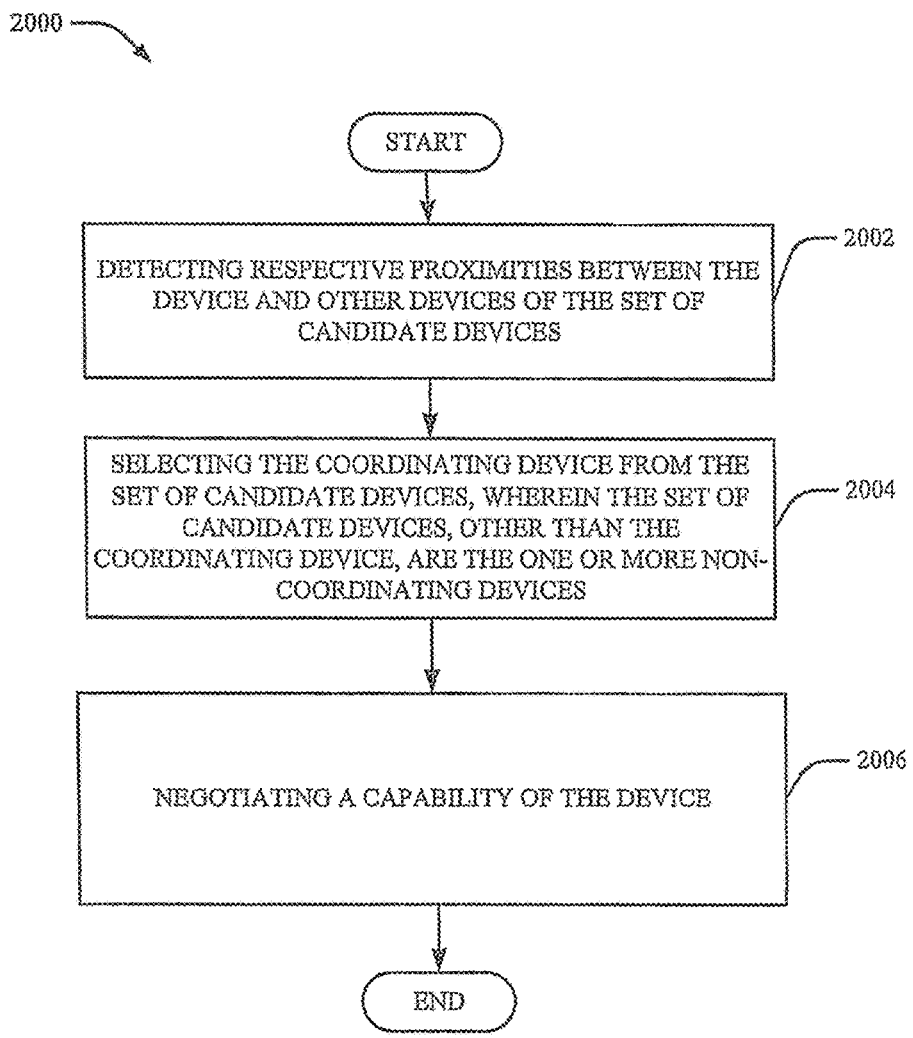

Turning now to FIG. 20, method 2000 includes a number of steps associated with an initialization stage for a device of a set of candidate devices. At 2002, method 2000 can include detecting respective proximities between the device and other devices of the set of candidate devices. The coordinating device and the one or more non-coordinating devices can make up a set of candidate devices.

At 2004, method 2000 can include selecting the coordinating device from the set of candidate devices, wherein the set of candidate devices, other than the coordinating device, are the one or more non-coordinating devices. In some embodiments, selecting is based on at least one of respective battery lives of the set of candidate devices, respective powers of transceivers of the set of candidate devices, a shortest distance between the set of candidate devices, a shortest distance between a BS to which the set of candidate devices is communicatively coupled, respective screen sizes associated with the set of candidate devices or respective entity configurations of the set of candidate devices.

At 2006, method 2000 can include negotiating a capability of the device. In some embodiments, negotiating the capability of the device includes transmitting a request message to a BS device associated with the device. The device can be one of the one or more non-coordinating devices. Negotiating can also include receiving, by the coordinating device, information indicative of the capability of the device based on the transmitting the request message. For example, the coordinating device can negotiate respective capabilities of one or more non-coordinating devices.

In some embodiments, the coordinating device can transmit a request message to a BS device to acquire direct-to-direct communication, and determine that a resource associated with the direct-to-direct communication has been granted. The negotiation can be performed after determining that the resource associated with the direct-to-direct communication has been granted.

Figure 21:
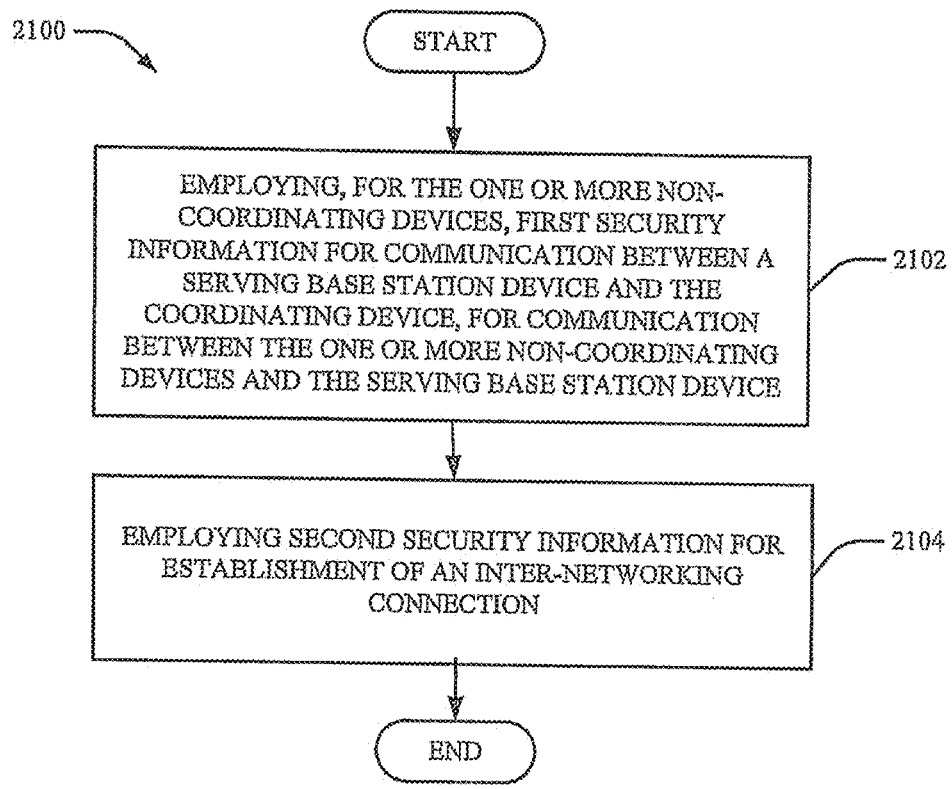

Turning now to FIG. 21, a method of negotiating the security level for the one or more non-coordinating devices is provided. At 2102, method 2100 can include employing, for the one or more non-coordinating devices, first security information for communication between a serving BS device and the coordinating device, for communication between the one or more non-coordinating devices and the serving BS device. At 2104, method 2100 can include employing second security information for establishment of an inner-networking connection.

Figure 22:
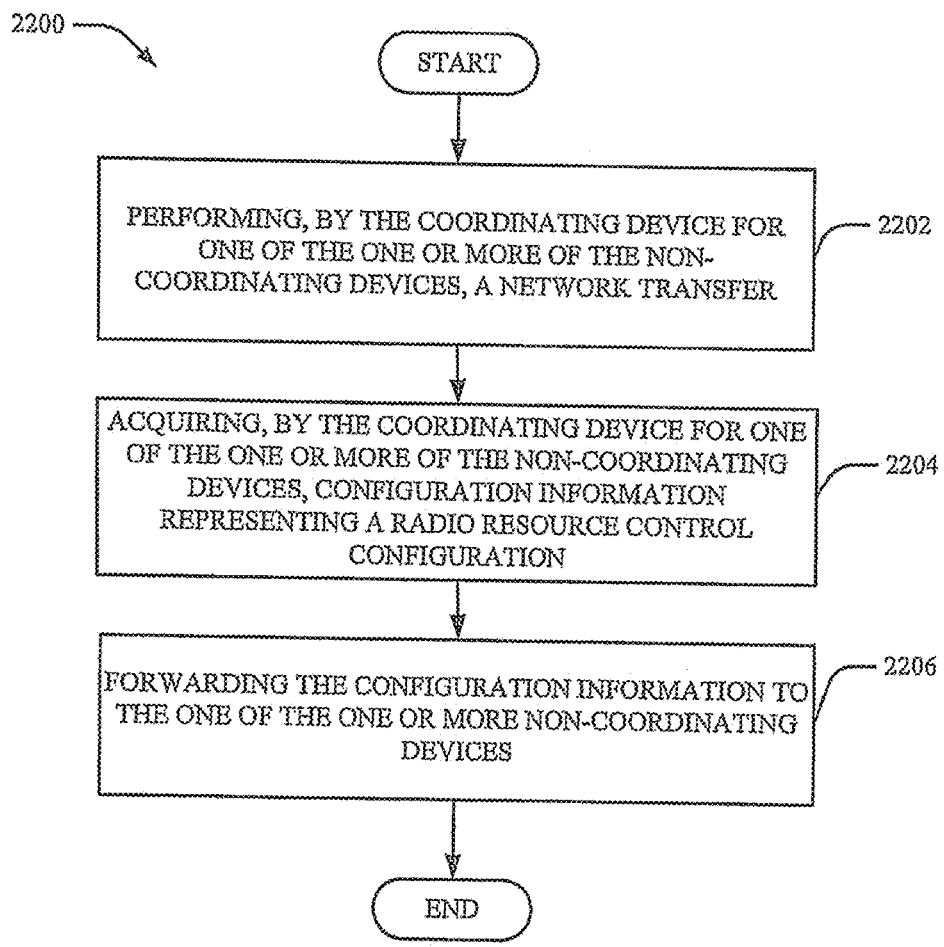

Turning now to FIG. 22, another method of performing mobility management is provided. At 2202, method 2200 can include performing, by the coordinating device for one of the one or more of the non-coordinating devices, a network transfer. At 2204, method 2200 can include acquiring, by the coordinating device for one of the one or more of the non-coordinating devices, configuration information representing a radio resource control configuration. At 2206, method 2200 can include forwarding the configuration information to the one of the one or more non-coordinating devices.

Figure 23:
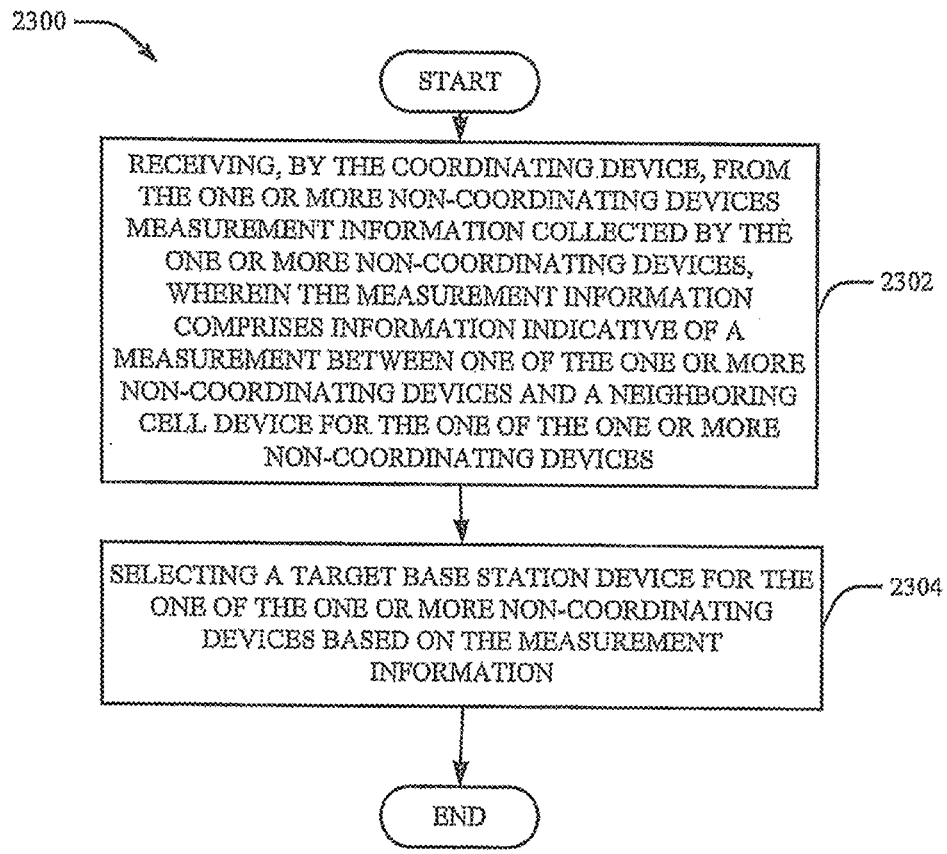

Turning now to FIG. 23, a method of performing mobility management for one or more non-coordinating devices is provided. At 2302, method 2300 can include receiving, by the coordinating device, from the one or more non-coordinating devices measurement information collected by the one or more non-coordinating devices. The measurement information can include information indicative of a measurement between one of the one or more non-coordinating devices and a neighboring cell device for the one of the one or more non-coordinating devices. At 2304, method 2300 can include selecting a target BS device for the one of the one or more non-coordinating devices based on the measurement information.

Figure 24:
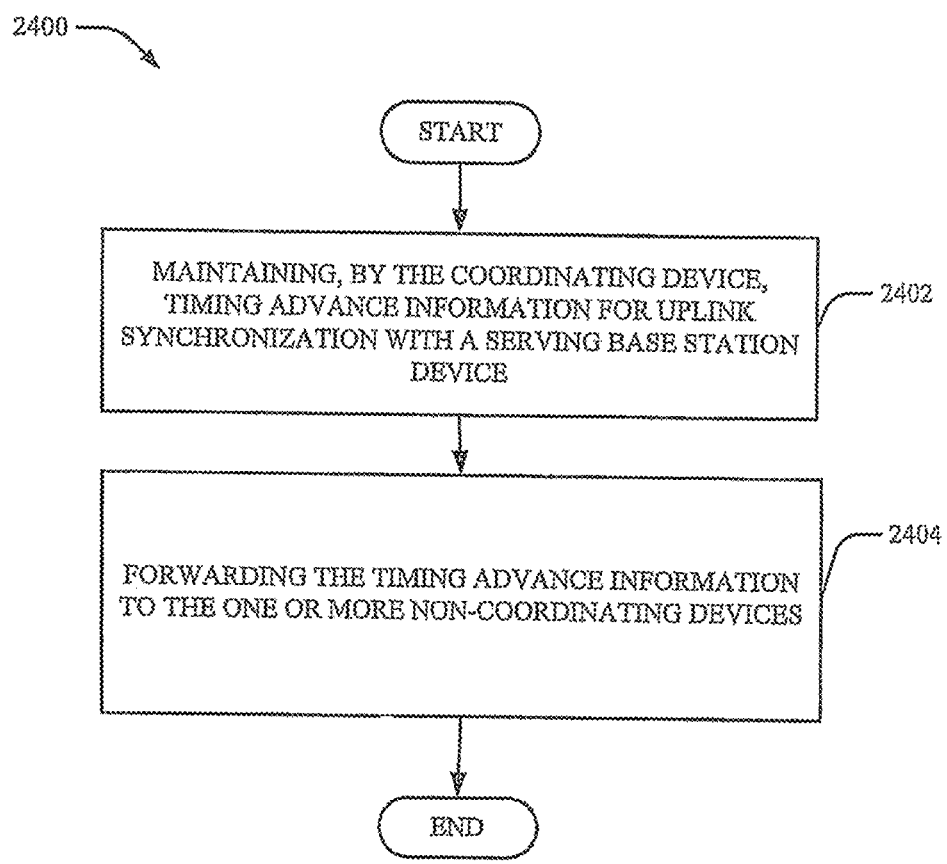

Turning now to FIG. 24, another method of performing mobility management is provided. At 2402, method 2400 can include maintaining, by the coordinating device, timing advance information for uplink synchronization with a serving BS device. At 2404, method 2400 can include forwarding the timing advance information to the one or more non-coordinating devices.

In the embodiments of MDC initialization stage 302 described, the coordinating device selection is performed by the initialization stage component 204 of FIG. 4 based on the longest battery life among one or more of the candidate devices, most powerful transceiver among one or more of the candidate devices, shortest sum distance between all candidate devices, shortest distance between connecting BS and the one or more candidate devices and/or the candidate device pre-configured to be the coordinating device (e.g., pre-configured by the entity with which the candidate devices are associated). Further, with regard to the transmission stage, four different embodiments of transmission were discussed.

In a fifth transmission mode (relay transmission mode embodiment) of MDC, the candidate device 200 selected as the relay node device for the other devices in the personal area network (e.g., devices 102, 104, 106) can be selected based different factors. For example, in one embodiment, the candidate device 200 can be selected as the relay node based on the volume of traffic (instantaneous or average) being transmitted from the devices 102, 104, 106 to facilitate energy efficient transmission of packets through the relay node device via the RRC to the BS on the uplink. In this embodiment, the relay node device can be selected as the coordinating device in lieu of the coordinating device selection process described with reference to FIG. 4. By way of example, but not limitation, the relay node device can be selected amongst devices 102, 104, 106, 108 based on one or more characteristics of the traffic generated by the one or more devices 102, 104, 106, 108 as will be described in greater detail with reference to FIG. 25.

In another embodiment of the fifth transmission mode (relay transmission mode embodiment) of MDC, the coordinating device can be selected as described with reference to FIG. 4. The coordinating device can then select the relay node device during the transmission stage. The relay node device can be the coordinating device or another device of the set of devices 102, 104, 106, 108 in the personal area network. The relay node device can be selected amongst devices 102, 104, 106, 108 based on one or more characteristics of the traffic generated by the one or more devices 102, 104, 106, 108 as will be described in greater detail with reference to FIG. 25.

In either embodiment, the relay node device can establish an RRC with the BS (and the devices that are not the relay node devices can release any established RRCs between the BS and the devices that are not the relay node devices). The relay node device can forward, to the BS, packets received at the relay node device from the non-coordinating devices. One or more (or all) of the structure and/or functionality of the relay node device can be included in or activatable in one or more (or any) of the devices 102, 104, 106, 108 in various embodiments.

Figure 25:
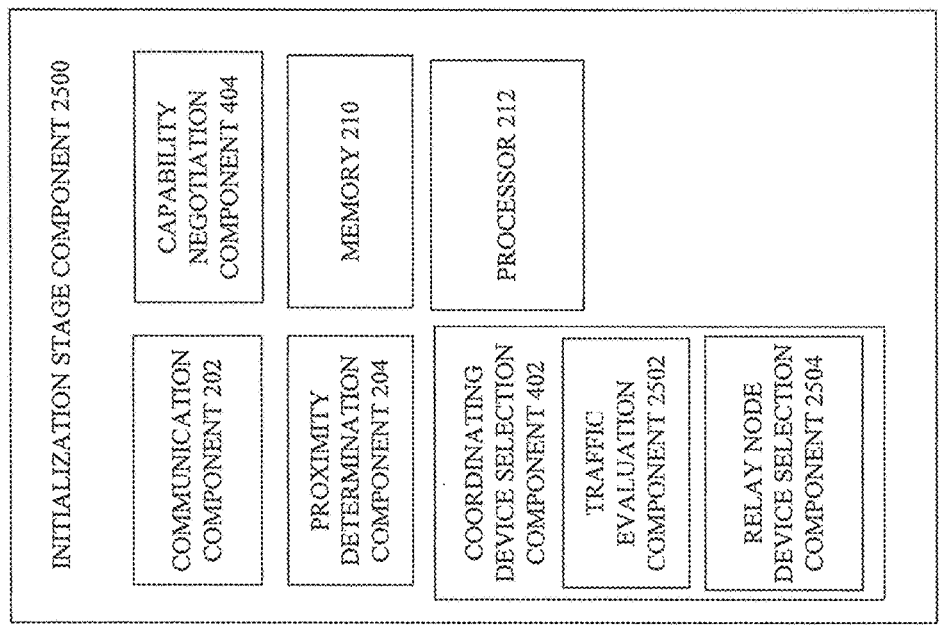
FIG. 25 is an illustration of a block diagram of an exemplary initialization stage component that can facilitate relay transmission mode of MDC in a wireless communication system in accordance with one or more embodiments of the disclosed subject matter.

FIG. 25 is an illustration of a block diagram of an exemplary initialization stage component that can facilitate relay transmission mode of MDC in a wireless communication system in accordance with one or more embodiments of the disclosed subject matter. As shown, initialization stage component 2500 can include communication component 202, coordinating device selection component 402 (which can include traffic evaluation component 2502 and relay node device selection component 2504), capability negotiation component 404, memory 210 and processor 212. In various embodiments, one or more of the communication component 202, coordinating device selection component 402, capability negotiation component 404, memory 210 and/or processor 212 can be electrically and/or communicatively coupled to one another to perform one or more functions of the initialization stage component 2500. Repetitive description of like elements employed in respective embodiments of systems and/or apparatus described herein are omitted for sake of brevity.

With reference to FIGS. 1 and 25, in addition to the structure and/or functionality of communication component 202 described with reference to FIG. 4 (including, but not limited to, that associated with RRC signaling information for establishing a connection with the network 112, transmitting and/or receiving data for one or more non-coordinating devices or the like), in some embodiments, communication component 202 can transmit and/or receive information associated with one or more traffic patterns, conditions or the like for one or more of the devices 102, 104, 106, 108.

Traffic evaluation component 2502 of the coordinating device selection component 402 can determine the traffic generated from one or more of devices 102, 104, 106, 108. For example, in some embodiments, the instantaneous or average traffic can be measured for one or more of the devices 102, 104, 106, 108. In some embodiments, the traffic evaluation component 2502 can evaluate the traffic based on one or more measurements of the instantaneous or average packet size of data transmitted from the one or more devices 102, 104, 106, 108 and/or one or more measurements of the instantaneous or average packet arrival interval of the one or more devices 102, 104, 106, 108. In some embodiments, the packet arrival interval can be the rate of packets generated by equal to or substantially equal to one or more packets from a device of the set of devices 102, 104, 106, 108. In some embodiments, the traffic volume can be the product of the packet size and the packet arrival interval.

In various embodiments, the traffic evaluation component 250 can determine the device of devices 102, 104, 106, 108 having the smallest traffic arrival rate and/or the largest traffic size (e.g., largest packet size) output from the device of devices 102, 104, 106, 108.

In some embodiments, the relay node device selection component 2504 can select, as the relay node device for relay transmission mode of MDC, the device of devices 102, 104, 106, 108 that has the smallest traffic arrival rate among the devices 102, 104, 106, 108, the largest traffic (or packet) size among the devices 102, 104, 106, 108, the largest traffic volume (e.g., the product of the traffic arrival rate and the traffic packet size) among the devices 102, 104, 106, 108, a traffic arrival rate that is less than a defined arrival rate threshold, a traffic (packet) size that is greater than a defined traffic (packet) size threshold and/or a traffic volume that is greater than a defined traffic.

In some embodiments, the communication component 202 of the initialization stage component 204 (or the selected relay node device) can transmit information to one or more of the devices 102, 104, 106, 108 to identify the relay node device and/or provide information instructing the devices to operate in the relay transmission mode.

Memory 210 can be a computer-readable storage medium storing computer-executable instructions and/or information for performing the functions described herein with reference to initialization stage component 2500, 204 (or any component of initialization stage component 2500, 204). For example, memory 210 can store computer-executable instructions that can be executed by processor 212 to select a candidate device for the position of relay node device, to evaluate one or more traffic conditions relative to one or more of devices 102, 104, 106, 108. Processor 212 can perform one or more of the functions described herein with reference to initialization stage component 2500, 204 (or any component of initialization stage component 2500, 204).

Figure 26:
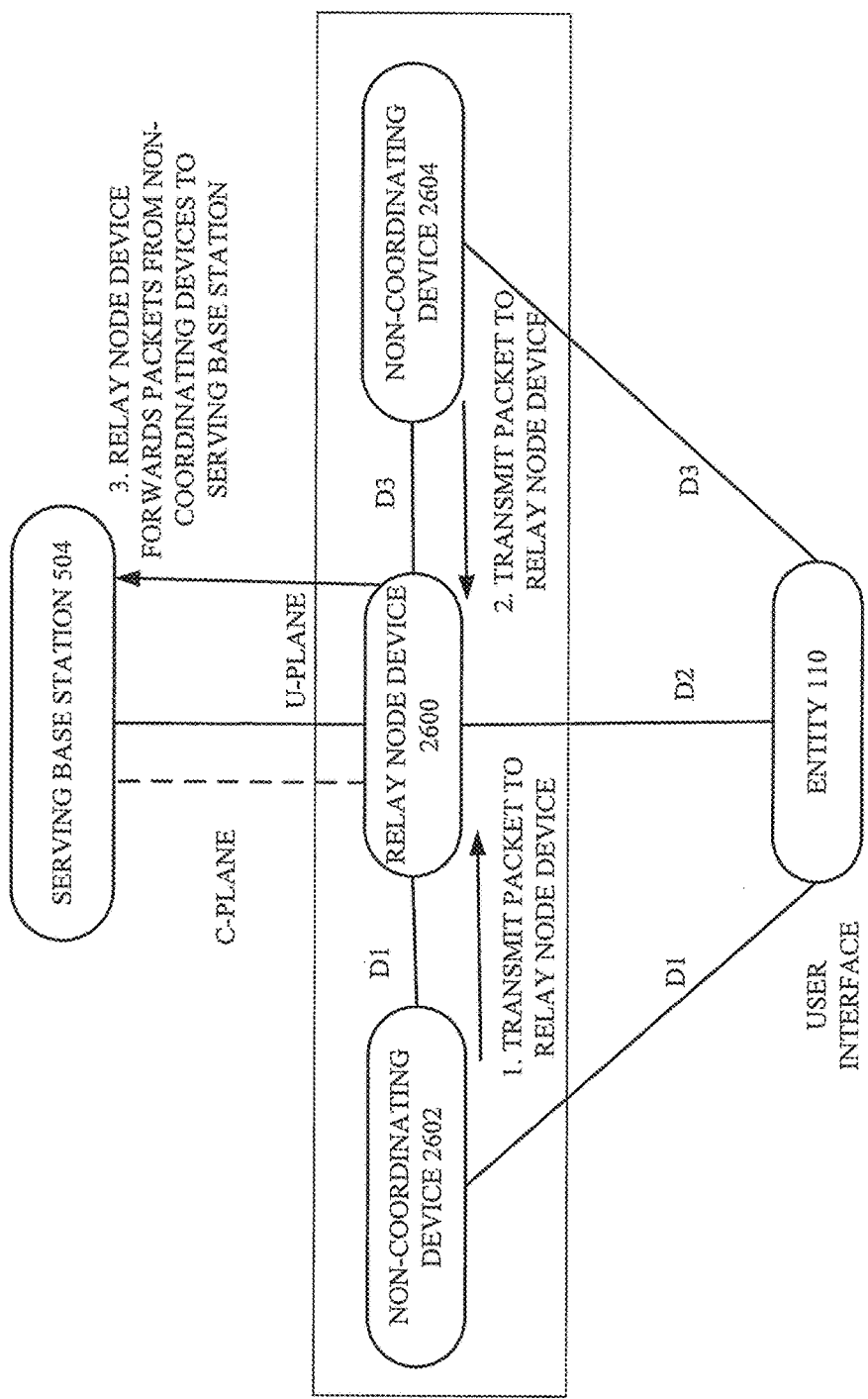
FIG. 26 is an illustration of a flow diagram of operations of the relay transmission mode component of MDC in accordance with one or more embodiments of the disclosed subject matter.

FIG. 26 is an illustration of a flow diagram of operations of the relay transmission mode component of MDC in accordance with one or more embodiments of the disclosed subject matter. As shown in FIG. 26, in the relay transmission mode, the relay node device (e.g., relay node device 2600) of a set of devices (e.g., non-coordinating devices 2602, 2604) is selected as a to communicate traffic to/from the set of non-coordinating devices (e.g., non-coordinating devices 2602, 2604) from/to the BS (serving BS 504). In some embodiments, the non-coordinating devices (e.g., non-coordinating devices 2602, 2604) can employ inner-networking to communicate with the relay node device to transmit and/or receive packets. In some embodiments, the inner-networking can be in accordance with one or more embodiments described and/or shown with one or more of FIGS. 9, 10 and/or 11. In other embodiments, other methods of inner-networking can be employed. After the relay node device 2600 receives a packet from one or more of non-coordinating devices (e.g., non-coordinating devices 2602, 2604), the relay node device 2600 can forward the received packet to the BS (e.g., serving BS 504). As shown in FIG. 26, in some embodiments, only one C-plane and only one U-plane is established between the relay node device 2600 and BS 504.

With reference to FIG. 15, in some embodiments, and further to the embodiments of transmission modes shown and/or described with reference to FIGS. 16, 17 and 18, a fifth embodiment of a transmission mode can be performed. The fifth transmission mode, relay transmission mode, can be a user self-cooperation transmission mode that can provide an energy-efficient transmission for one or more devices in a personal area network.

A relay transmission mode system model and embodiment for access control/initiation of relay transmission mode can be as follows. The system can be or include a network with N devices in which the BS is denoted as index 0 and each of N−1 devices is denoted as MS. In various embodiments, the N−1 devices can be devices 102, 104, 106, 108. In some embodiments, the system is an LTE system. In other embodiments, the embodiments described herein can apply to any number of different types of communication systems.

The channel gain, which can take into account the effect of large scale channel fading and Rayleigh channel fading between two devices i and j is denoted as $G_{i,j}=K \times d_{i,j}^{-\alpha}$, where K is a constant antenna gain, $d_{i,j}$ is transmission distance, and α is a path loss component. The uplink traffic from every MS (from every device such as devices 102, 104, 106, 108) can be assumed to be a Poisson process with packet arrival interval, $\lambda_i$, and packet size, $r_i$.

A power control (PC) component for one or more (or for each) of the MS can be configured to allow for power compensation to combat channel variations, to reduce the likelihood or amount of interference and/or to increase system capacities. In some embodiments, the system can adopt open-loop PC and the PC component for one or more (or for each MS) can determine the MS transmitting power based on the number of allocated physical resource blocks (PRBs) and channel gain as shown in equation 1:

$$P_{TX(i)} = \min(P_{max}, P_0 + 10 \log_{10}(m_i) + \beta \cdot G_{i,0}^{-1}) \quad (1)$$

In equation 1, $P_{max}$ can be the maximum transmission power and $m_i$ can be the number of allocated PRBs for device i. The values for $P_0$ and $\beta$ can be configured by the BS to provide a trade-off between average cell throughput and cell edge throughput (wherein the devices 102, 104, 106, 108 are located within the same personal area network and therefore are located within the same cell). As used herein, $P_0$ can represent the power to be contained in one PRB and is a cell specific parameter measured in decibel milliwatt (dBm)/physical resource block (PRB). As used herein, $\beta$ can represent a path loss compensation factor that is cell specific and in the range [0 1].

In some embodiments, a high value for either Po or β can be associated with a higher received signal strength at the BS and higher data rate can be accomplished. Under this high value scenario, cell edge throughput can be increased significantly; however, such can lead to equal MS data quality irrespective of the MS location. Further, in some embodiments, the BS can fail to have diversity gain during the scheduling, so the average cell throughput may be degraded.

One or more embodiments can employ loop PC schemes for an uplink channel (e.g., a long term evolution (LTE) uplink channel). When applying open-loop PC, the received signal-to-interference noise ratio (SINR) per PRB at the BS can be fixed and the achievable throughput per PRB can be denoted as $R_{TX}$.

With regard to discontinuous reception (DRX) operation at an MS, the BS will not typically allocate an MS with PRB at every time transmission interval (TTI) and the MS can go to sleep at particular TTI. Accordingly, a DRX component of an MS can be specified in the system to control the monitoring of the physical downlink (DL) control channel (PDCCH). Under DRX, the MS operations could be categorized into three periods: a busy period ($T_B$) in which an MS monitors the PDCCH and conducts uplink (UL) transmission; an active period ($T_A$) in which the MS monitors the PDCCH without UL transmission; and the sleeping period ($T_S$) in which the MS turns off the reception and transmission of the MS. The transmission time, $T_{TX(i)}$, and reception time, $T_{RX(i)}$, of device i can be as shown in equation 2 below, where E[ . . . ] is the expectation of the value in the brackets.

$$T_{TX(i)} = \lambda_i \times E[T_B]_{(i)} = \frac{\lambda_i}{1-\lambda_i} \quad (2)$$

$$T_{RX(i)} = E[T_A]_{(i)} = \frac{1-e^{-\lambda_i(C_R-C_I)}}{1-\lambda_i} + \frac{e^{\lambda_i C_I}-1}{\lambda_i(1-\lambda_i)} + \quad (3)$$
$$\lceil E[T_S]_{(i)}/C_L \rceil C_{ON}$$
$$= \frac{1-e^{-\lambda_i(C_R-C_I)}}{1-\lambda_i} + \frac{e^{\lambda_i C_I}-1}{\lambda_i(1-\lambda_i)} +$$
$$\left\lceil \frac{1-e^{-\lambda_i(C_R-C_I)}}{\lambda_i} \Big/ C_L \right\rceil C_{ON}$$
$$\cong \frac{e^{\lambda_i C_I}+\lambda_i-1}{\lambda_i(1-\lambda)} \text{ when } C_R > C_L \frac{1}{\lambda_i} > C_I > C_{ON}$$

In equation 3, $C_R$, $C_I$, $C_L$, $C_{ON}$ are the values of the RRC inactivity timer, the DRX inactivity timer, the DRX cycle and the ON-duration timer, respectively. In some embodiments, long $C_I$, $C_{ON}$ results in longer $T_{RX}$ whereas power is consumed for monitoring the PDCCH but without any transmission. Based on this effect, there can be greater beneficial to use MDC self-relaying due to less performance of unnecessary monitoring (e.g., in some embodiments, only the relay node device performs the monitoring). Long $C_R$ can mean the MS has a higher probability to stay in an RRC connected state and hence there can be significant benefit provided by one or more of the embodiments described herein because the relaying (cooperation) is typically performing when the MS is in the RRC connected state. Alternatively, long $C_L$ can be associated with the MS being a sleep state longer and the potential saving from relaying may be degraded.

The MS power consumption and energy efficiency can be computed as follows. The processing of power amplifier and baseband mainly contributes to MS power consumption and a linear MS power consumption model (computed in millimeter Watts (mmWatt)) can be adopted and is shown at equation 4:

$$P_i = T_{TX(i)} \times P_{PA(i)} + T_{RX(i)} \times P_{BB} \quad (4)$$

where $P_{PA(i)}$ can be the processing power of the power amplifier, and the relationship between $P_{TX(i)}$ and $P_{PA(i)}$ can be further illustrated by a two-slope model as shown in equation 5:

$$P_{PA(i)} = \begin{cases} A_L \times P_{TX(i)} + B_L & \text{for } P_{TX(i)} \leq \gamma \\ A_H \times P_{TX(i)} + B_H & \text{for } P_{TX(i)} > \gamma \end{cases} F \quad (5)$$

where $A_H$, $A_L$, $B_H$, $B_L$, $\gamma$ are device specific parameters (e.g., $A_H$, $A_L$ are parameters that have values of mW/dBm while $B_H$, $B_L$ are parameters that have values of W and γ have values of dBm. In some embodiments, equation 5 is derived from modeling to represent the relationship between an RF power consumption region toward the transmit power. This is a measurement-based result and the parameters, $A_H$, $A_L$, $B_H$, $B_L$, γ, can be employed to numerically represent a curve depicting the power consumption by one or more different MSs.

In some embodiments, it is assumed that every device has the same baseband processing power, $P_{BB}$. The network energy efficiency, $\eta_{EE}$, can be defined as the ratio of total MS power consumption to the received throughput at the BS (which can be characterized as Joule/bit/Hertz) and can be obtained by equation 6:

$$\eta_{EE} = \frac{\sum_{i=1}^{N} P_i \times \sum_{i=1}^{N} m_i}{\sum_{i=1}^{N} \gamma_i} = \frac{\sum_{i=1}^{N}(P_{PA(i)} \times T_{TX(i)}) + P_{BB} \times T_{RX(i)}) \times \sum_{i=1}^{N} \frac{r_i}{R_{TX}}}{\sum_{i=1}^{N} \gamma_i} \oplus \qquad (6)$$

$$= \frac{1}{R_{TX}} \sum_{i=1}^{N} \frac{\lambda_i \cdot P_{PA}(i)}{1 - \lambda_i} + \frac{P_{BB}}{R_{TX}} \sum_{i=1}^{N} \frac{e^{\lambda_i C_l} + \lambda_i - 1}{\lambda_i (1 - \lambda_i)}$$

When applying relay transmission mode, an MS within a personal area network is selected as a relay node device (e.g., relay node device 2600) to establish an RRC connection with the network (e.g., an LTE network) and transmit packets to the BS following one or more access controls. The source node (e.g., one or more of the non-coordinating devices, such as non-coordinating devices 2604, 2606) can transmit a packet from the source node to the relay node device. In some embodiments, the source node can transmit the packet to the relay node device using short range wireless networking.

In some embodiments, the source node can transmit a packet that has arrived at the source node to the relay node device and, after transmission, turn off the source node transceiver after finishing the source node to relay node device transmission. In some embodiments, the source node can use $P_{max}$ as the transmission power to transmit to the relay node device. In some embodiments, the channel gains between relay node device (the index of relay node device is denoted as r) and source nodes can be assumed to be identical.

Figure 27:
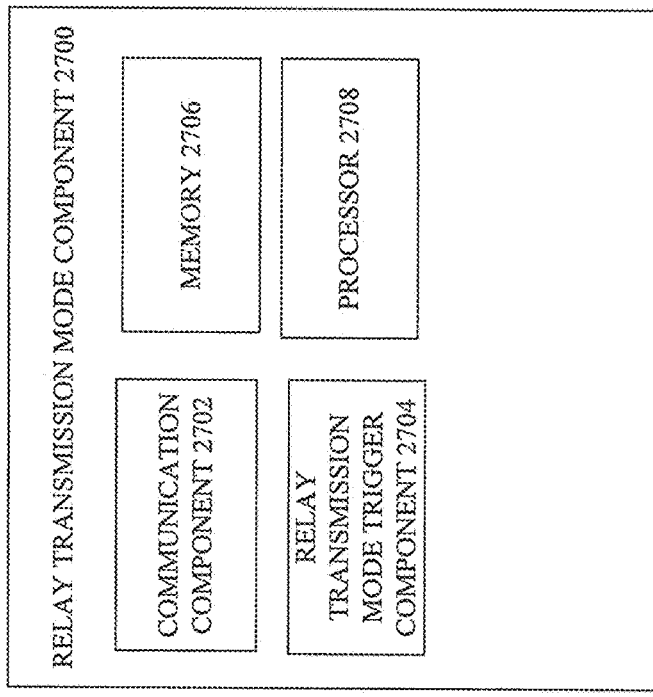
FIG. 27 is an illustration of a relay transmission mode component of the transmission stage component of FIG. 15 that facilitates energy efficient MDC in a wireless communication system in accordance with one or more embodiments of the disclosed subject matter.
Figure 28:
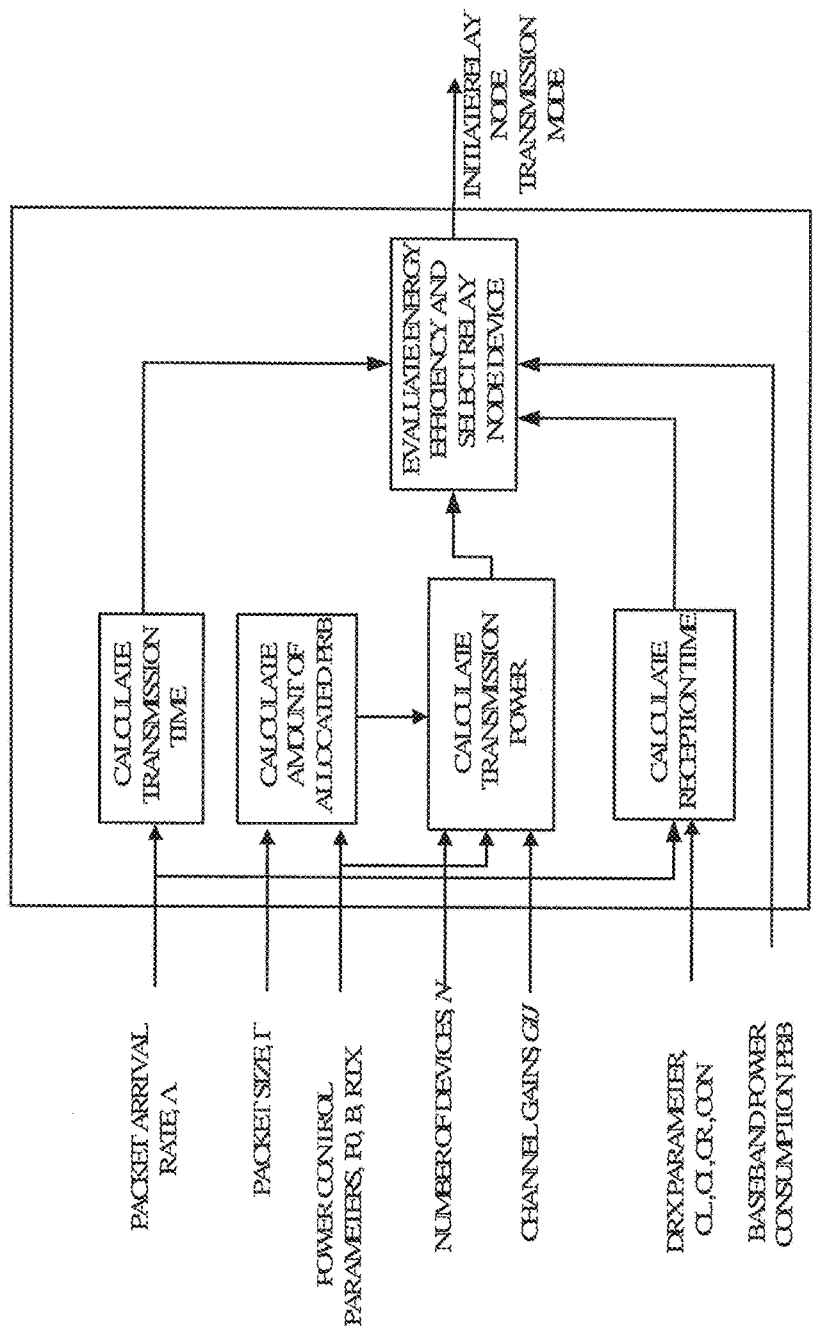
FIG. 28 is an illustration of a flow diagram of operations of a relay transmission mode to facilitate energy efficient MDC in accordance with one or more embodiments of the disclosed subject matter.

FIG. 27 is an illustration of a relay transmission mode component of the transmission stage component of FIG. 15 that facilitates energy efficient MDC in a wireless communication system in accordance with one or more embodiments of the disclosed subject matter. For example, in various embodiments, the relay transmission mode component 2700 can be included in the transmission mode component 1500 of FIG. 15. FIG. 28 is an illustration of a flow diagram of operations of a relay transmission mode to facilitate energy efficient MDC in accordance with one or more embodiments of the disclosed subject matter. Repetitive description of like elements employed in respective embodiments of systems and/or apparatus described herein are omitted for sake of brevity.

The relay transmission mode component 2700 can include communication component 2702, relay transmission mode trigger component 2704, memory 2706 and/or processor 2708. In various embodiments, one or more of communication component 2702, relay transmission mode trigger component 2704, memory 2706 and/or processor 2708 can be electrically and/or communicatively coupled to one another to perform one or more functions of the relay transmission mode component 2700.

With reference to FIGS. 27 and 28, when relay transmission mode is initiated, the transmission time of a source node was obtained by relay transmission mode trigger component 2704 by equation 2. The transmission time of the relay node device can be as shown in equation 7 and can be calculated based on the packet arrival interval as shown:

$$T_{TX(r)} = \frac{\lambda_r}{1 - \lambda_r} = \frac{\sum_{i=1}^{N} \lambda_i}{1 - \sum_{i=1}^{N} \lambda_i} \qquad (7)$$

The relay transmission mode trigger component 2704 can also determine the amount of allocated PRB for the relay transmission mode. The allocated PRB can be denoted as $M^{USC}$ and can include resources for source node to relay node device transmission and/or resources for relay node device to BS transmission. For instance, the BS can configure one specific sub-frame as a relaying zone and the PRBs within the sub-frame can be used for source node to relay node transmission. In another embodiment, a PRB within other sub-frames can be used for normal LTE transmission (e.g., relay node to BS transmission). As such, the type of resources could be a specific time or a specific frequency based on the BS partitioning. The allocated PRB can be as shown in equation 8:

$$M^{USC} = \sum_{i \in N, i \neq 0, r} \frac{r_i}{R_{TX(r)}} + m_r = \sum_{i \in N, i \neq 0, r} \frac{r_i}{\log_2\left(1 + \frac{P_{max} G_{ir}}{N_b}\right)} + \qquad (8)$$

$$\sum_{i=1}^{N} \frac{r_i}{R_{TX}}$$

$$= \sum_{i=1}^{N} r_i \times \left(\frac{R_{TX} + R_{TX(r)}}{R_{TX} R_{TX(r)}}\right) - \frac{r_r}{R_{TX(r)}}$$

where $m_r$ is denoted the resources for relay node device to BS transmission and $$R_{TX(r)} = \log_2\left(1 + \frac{P_{max} G_{ir}}{N_b}\right)$$

can be the achievable transmission rate from device i (which can be a non-coordinating device of the personal area network) to the relay node device.

The transmission power of the source nodes can be $P_{max}$ and the processing power of power amplifier would be $A_H P + B_H$. The transmission power of the relay node device can be denoted as $P_{TX(r)}^{USC}$, and can be the same as the total transmission power under non-relay transmission mode due to same traffic and channel gain (e.g., an example of a non-relay transmission mode is a transmission mode in which every device transmits a packet to the BS directly instead of transmitting to the BS via the relay node device) as shown in equation 9:

$$P_{TX(r)}^{USC} = \sum_{i=1}^{N} P_{TX(i)} = \sum_{i=1}^{N} \min(P_{max}, P_0 + 10\log_{10}(r_i/R_{TX}) + \beta \cdot G_{i0}^{-1}) \qquad (9)$$

The reception time can be determined by the relay transmission mode trigger component 2704 as well. For example, in general, the reception time will monotonically increase as the packet arrival interval increases. When the relay transmission mode is in progress, the reception time of the relay node device can increase since the packet arrival interval becomes the summarization of the packet arrival intervals of all nodes for which the relay node device is employed as the conduit to the BS. Alternatively, in some embodiments, the source nodes can upload the source node packets without DRX. Therefore, the reception time under relay would become as shown in equation 10:

$$T_{RX(i)}^{USC} = \begin{cases} \dfrac{1}{1-\lambda_i} & \text{for } i \neq r \\ \dfrac{e^{\lambda_r C_I} + \lambda_r - 1}{\lambda_r(1-\lambda_r)}, \lambda_r = \sum_{i=1}^{N} \lambda_i & \text{for } i = r \end{cases} \quad (10)$$

By applying equations 7-11, the relay transmission mode trigger component 2704 can determine the energy efficiency of the relay transmission mode for a particular relay node device r, as shown in equation 11 (in some embodiments, the relay transmission mode trigger component 2704 can determine the energy efficiency of the relay transmission mode and identify a particular relay node device r as shown in equation 11:

$$\eta_{EE}^{USC} = \dfrac{\sum_{i=1}^{N} P_i^{USC} \times M^{USC}}{\sum_{i=1}^{N} \gamma_i} = \dfrac{\left(\sum_{i \in N, i \neq 0, r} P_i^{USC} + P_r^{USC}\right) \times \left(\sum_{i=1}^{N} r_i \times \left(\dfrac{R_{TX} + R_{TX(r)}}{R_{TX} R_{TX(r)}}\right) - \dfrac{r_r}{R_{TX(r)}}\right)}{\sum_{i=1}^{N} \gamma_i} \quad (11)$$

$$= \left(\sum_{i \in N, i \neq 0, r} P_i^{USC} + P_r^{USC}\right) \times \left(\dfrac{1}{R_{TX}} + \left(1 - \dfrac{r_r}{\sum_{i=1}^{N} \gamma_i}\right)\dfrac{1}{R_{TX(r)}}\right)$$

$$= \left[\sum_{i \in N, i \neq 0, r} \left(\dfrac{(A_H P_{max} + B_H)\lambda_i + P_{BB}}{1-\lambda_i}\right) + \sum_{i=1}^{N} P_{PA_i} T_{TX(i)} + P_{BB} T_{RX(r)} USC\right] \times$$

$$\left(\dfrac{1}{R_{TX}} + \left(1 - \dfrac{r_r}{\sum_{i=1}^{N} \gamma_i}\right)\dfrac{1}{R_{TX(r)}}\right)$$

When traffic, channel gain, and access control parameters are determined. Access control parameters can refer to the power control parameters (e.g. Po and β to determine the relative $R_{TX}$, $P_{PA}$) and/or the DRX parameters (e.g. $C_R$, $C_I$, $C_L$, $C_{ON}$ to determine the relative $T_{RX}$ as explained herein. The relay transmission mode trigger component 2704 can determine that the energy efficiency would be determined by the selection of relay node device and the relay transmission mode should be triggered when the inequality shown in equation 12 $\eta_{EE}^{USC} \leq \eta_{EE}$ is true:

$$\eta_{EE}^{USC} - \eta_{EE} \leq 0 \Rightarrow \sum_{i \in N, i \neq 0, r} \left(\dfrac{(A_H P_{max} + B_H)\lambda_i + P_{BB}}{1-\lambda_i}\right) \times \quad (11)$$

$$\left(\dfrac{1}{R_{TX}} + \left(1 - \dfrac{r_r}{\sum_{i=1}^{N} \gamma_i}\right)\dfrac{1}{R_{TX(r)}}\right) +$$

-continued $$\sum_{i=1}^{N} P_{PA_i} T_{TX(i)} \times \left(1 - \dfrac{r_r}{\sum_{i=1}^{N} \gamma_i}\right)\dfrac{1}{R_{TX(r)}} +$$

$$\dfrac{P_{BB}}{R_{TX}}\left(T_{RX(r)}^{USC} - \sum_{i=1}^{N} T_{RX(i)}\right) + P_{BB} T_{RX(r)}^{USC} \times \left(1 - \dfrac{r_r}{\sum_{i=1}^{N} \gamma_i}\right)\dfrac{1}{R_{TX(r)}} \leq$$

$$0 \Rightarrow \sum_{i \in N, i \neq 0, r} \left(\dfrac{(A_H P_{max} + B_H)\lambda_i + P_{BB}}{1-\lambda_i}\right) +$$

$$\sum_{i=1}^{N} P_{(i)} \times \left(1 - \dfrac{r_r}{\sum_{i=1}^{N} \gamma_i}\right)\dfrac{R_{TX}}{R_{TX(r)}} \leq P_{BB}\left(\sum_{i=1}^{N} T_{RX(i)} - T_{RX(r)}^{USC}\right)$$

Thus, in this embodiment, in lieu of the relay node device being determined by the coordinating device selection component 402 as described with reference to FIG. 25, the relay node device can be determined by the relay transmission mode trigger component 2704. The communication component 2702 can transmit and/or receive information for determination of when to initiate the relay transmission mode of MDC and/or for the selection of relay node device, the memory 2706 can be a computer-readable storage medium storing computer-executable instructions and/or information for performing the functions described herein with reference to relay transmission mode component 2700 (or any component of relay transmission mode component 2700). Processor 2708 can perform one or more of the functions described herein with reference to relay transmission mode component 2700 (or any component of relay transmission mode component 2700).

Referring back to equation 12, the left term in equation 12 can be the extra power consumption and resource caused by applying the relay transmission mode (mainly from source node to relay node device transmission). The right term can be the power consumption saved by replacing individual reception with relay node device reception and source nodes can reduce their reception time accordingly. Equation 12 also shows the relay transmission mode trigger should be irrespective of the location of the source or relay node devices but rather should depend on traffic. Equation 11 depicts the energy efficiency will be strictly reduced when the node having the heaviest traffic (largest packet size and most frequent packet arrival), or as described as heaviest volume, is selected as the relay node device. Therefore, in some embodiments, the relay node device selection can be based on and/or take traffic into account and the optimal relay node device can be the node with heaviest traffic among involved devices in some embodiments.

Accordingly, one or more embodiments can enable a source node to forward its packet to relay node device without following LTE access control. It refers the source node could enjoy the LTE network benefit by tethering a relay node device for the LTE transmission.

Also, in some embodiments, the relay transmission mode can be initiated by the relay transmission mode trigger component 2704 when overall traffic loading within MDC is light or below a defined threshold (e.g. infrequent arrival rate (the arrival rate is smaller than a threshold)). When the relay transmission mode is initiated, the MDC can select a node with heaviest traffic to serve as the relay node device and consequently the energy efficiency can be improved and/or optimized relative to one or more non-relay transmission modes.

Accordingly, one or more embodiments described herein can determine under what traffic loading conditions a device can provide data relaying for other devices to reduce the power consumption while the devices are coordinated, and how to select the relay node device to optimize and/or improve energy efficiency and/or to achieve a desirable energy efficiency result.

Figure 29:
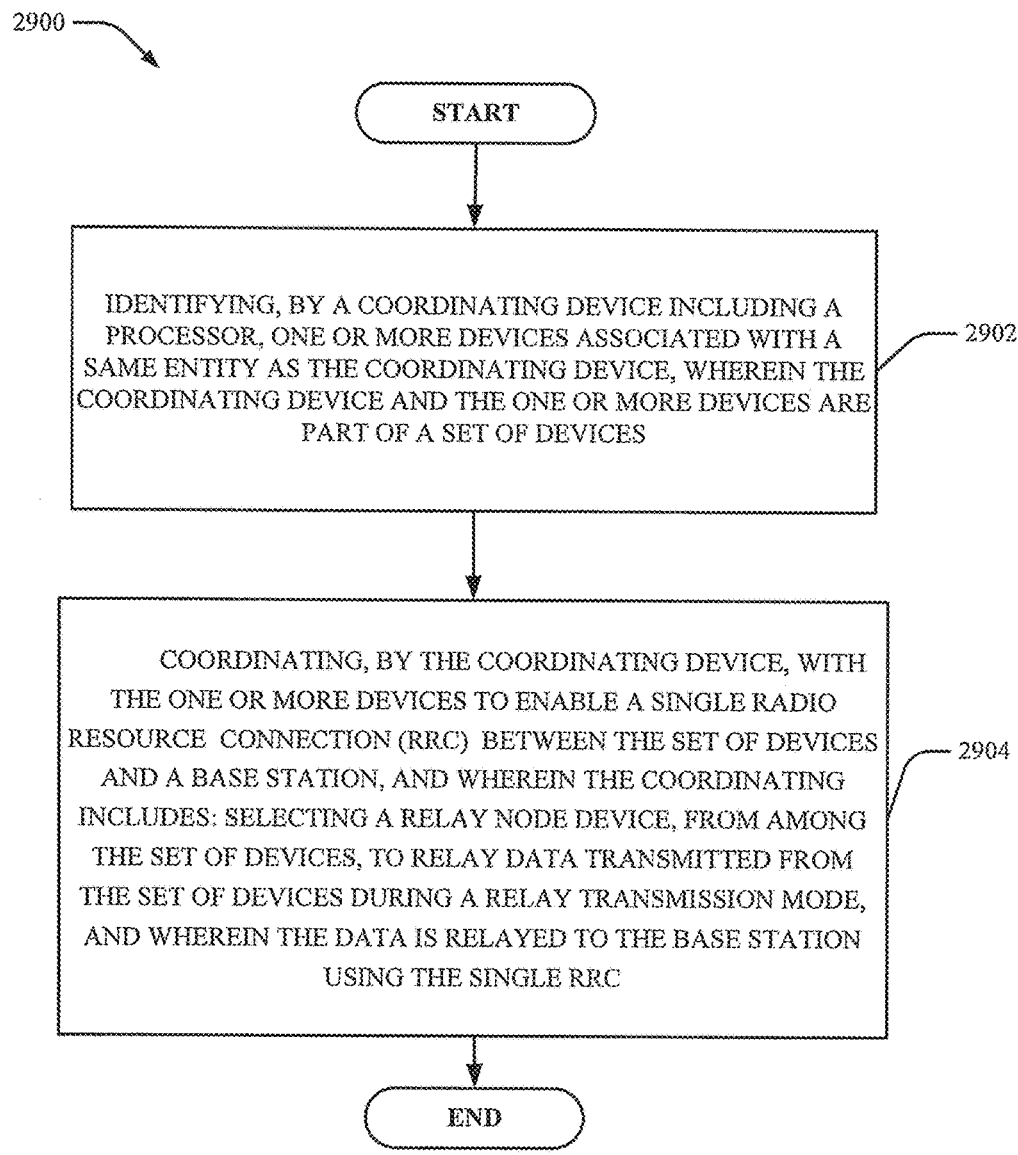
FIGS. 29, 30, 31, 32 and 33 are flowcharts of exemplary methods to facilitate relay transmission mode MDC in accordance with one or more embodiments of the disclosed subject matter.

FIGS. 29, 30, 31, 32 and 33 are flowcharts of exemplary methods to facilitate power saving employing the MDC transmission mode component of FIG. 25 in accordance with one or more embodiments of the disclosed subject matter. Turning first to FIG. 29, at 2902, method 2900 can include identifying, by a coordinating device including a processor, one or more devices associated with a same entity as the coordinating device, wherein the coordinating device and the one or more devices are part of a set of devices. At 2904, method 2900 can include coordinating, by the coordinating device, with the one or more devices to enable a single RRC between the set of devices and a BS, wherein the coordinating includes selecting a relay node device, from among the set of devices, to relay data transmitted from the set of devices during a relay transmission mode, and wherein the data is relayed to the BS using the single RRC.

Figure 30:
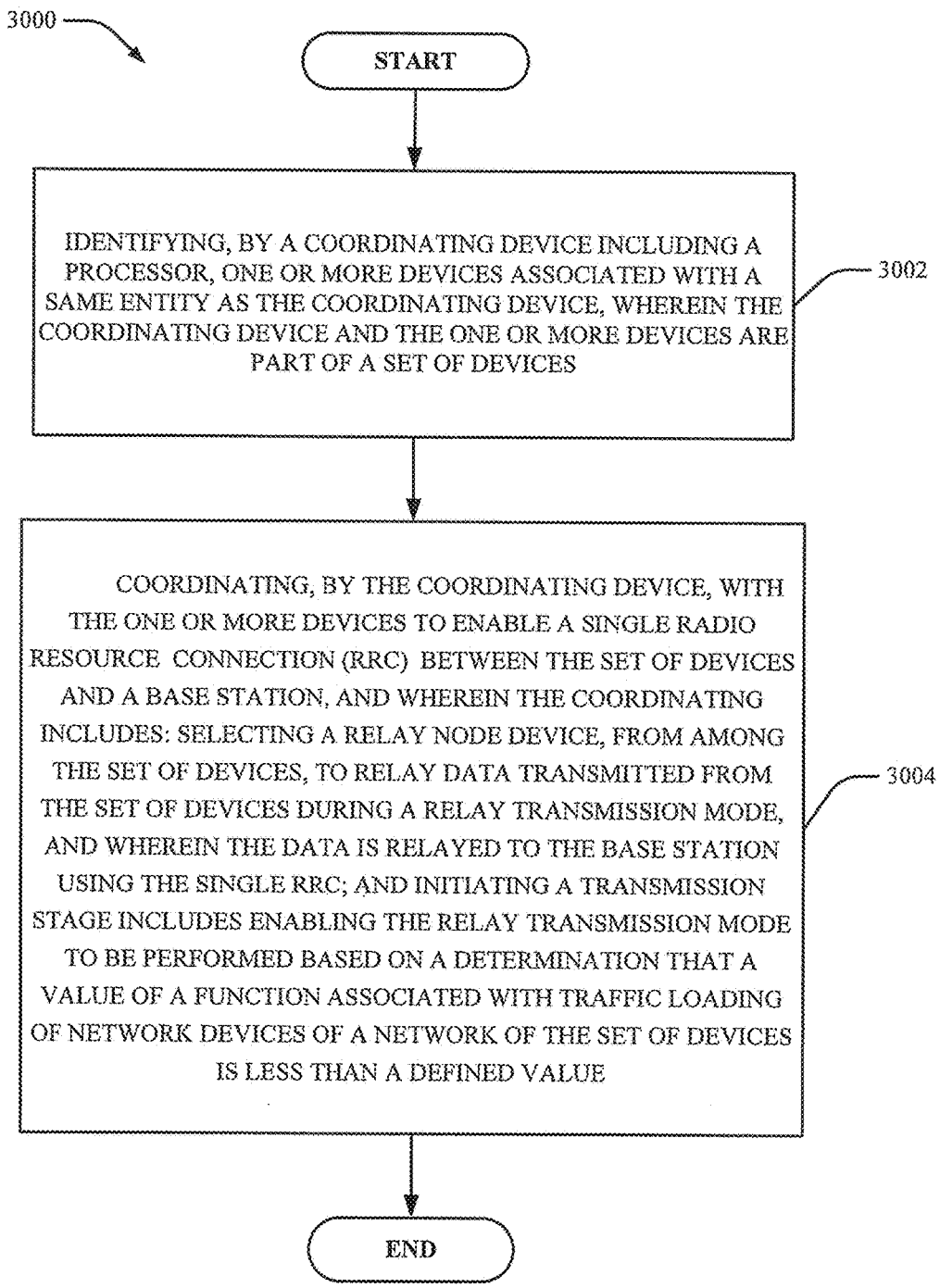

Turning now to FIG. 30, at 3002, method 3000 can include identifying, by a coordinating device including a processor, one or more devices associated with a same entity as the coordinating device, wherein the coordinating device and the one or more devices are part of a set of devices. At 3004, method 3000 can include coordinating, by the coordinating device, with the one or more devices to enable a single RRC between the set of devices and a BS, and wherein the coordinating comprises: selecting a relay node device, from among the set of devices, to relay data transmitted from the set of devices during a relay transmission mode, and wherein the data is relayed to the BS using the single RRC; and initiating a transmission stage includes enabling the relay transmission mode to be performed based on a determination that a value of a function associated with traffic loading of network devices of a network of the set of devices is less than a defined value.

Figure 31:
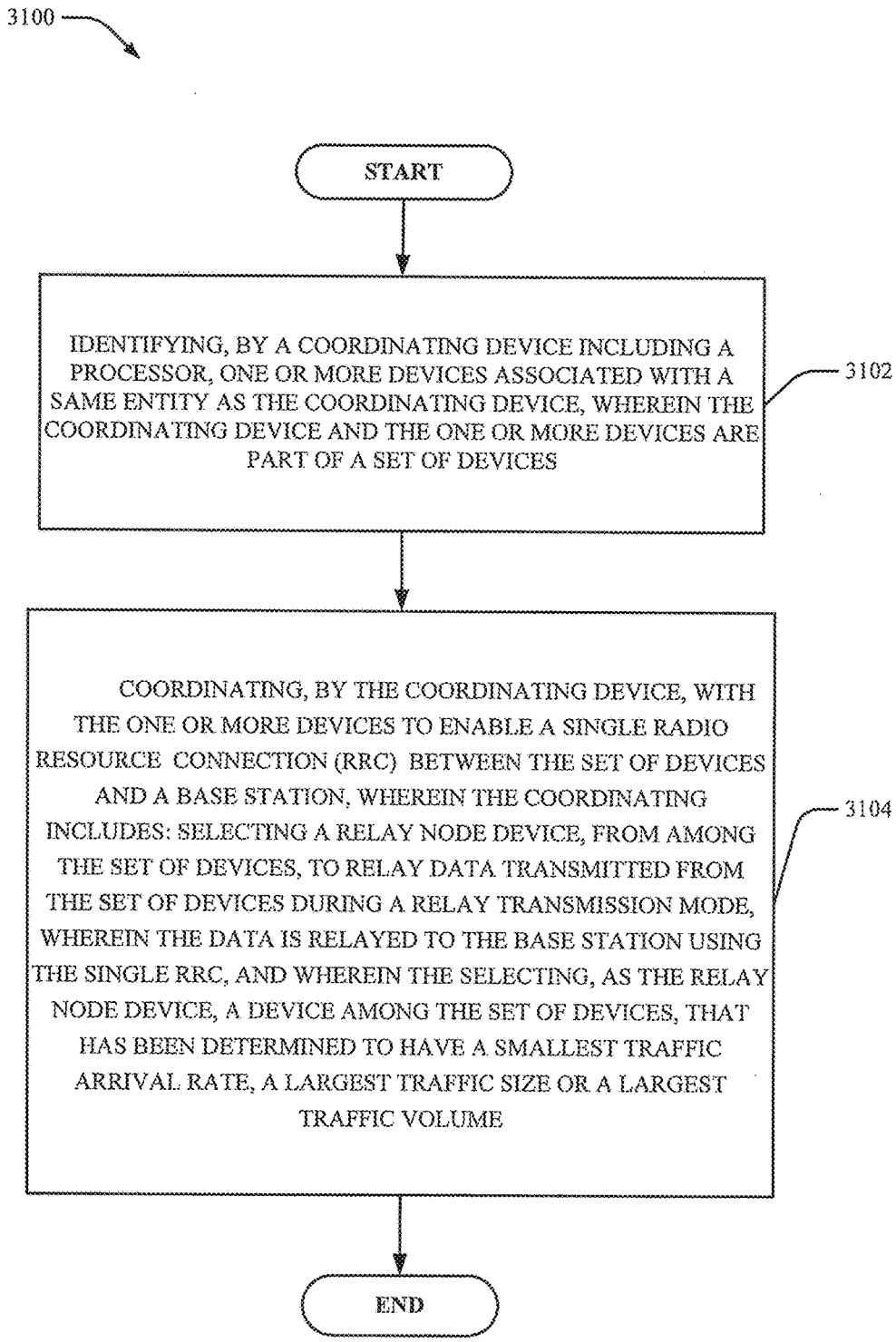

Now turning to FIG. 31, at 3102, method 3100 can include identifying, by a coordinating device including a processor, one or more devices associated with a same entity as the coordinating device, wherein the coordinating device and the one or more devices are part of a set of devices. At 3104, method 3100 can include coordinating, by the coordinating device, with the one or more devices to enable a single RRC between the set of devices and a BS, wherein the coordinating includes: selecting a relay node device, from among the set of devices, to relay data transmitted from the set of devices during a relay transmission mode, wherein the data is relayed to the BS using the single RRC, and wherein the selecting, as the relay node device, a device among the set of devices, that has been determined to have a smallest traffic arrival rate, a largest traffic size or a largest traffic volume.

Figure 32:
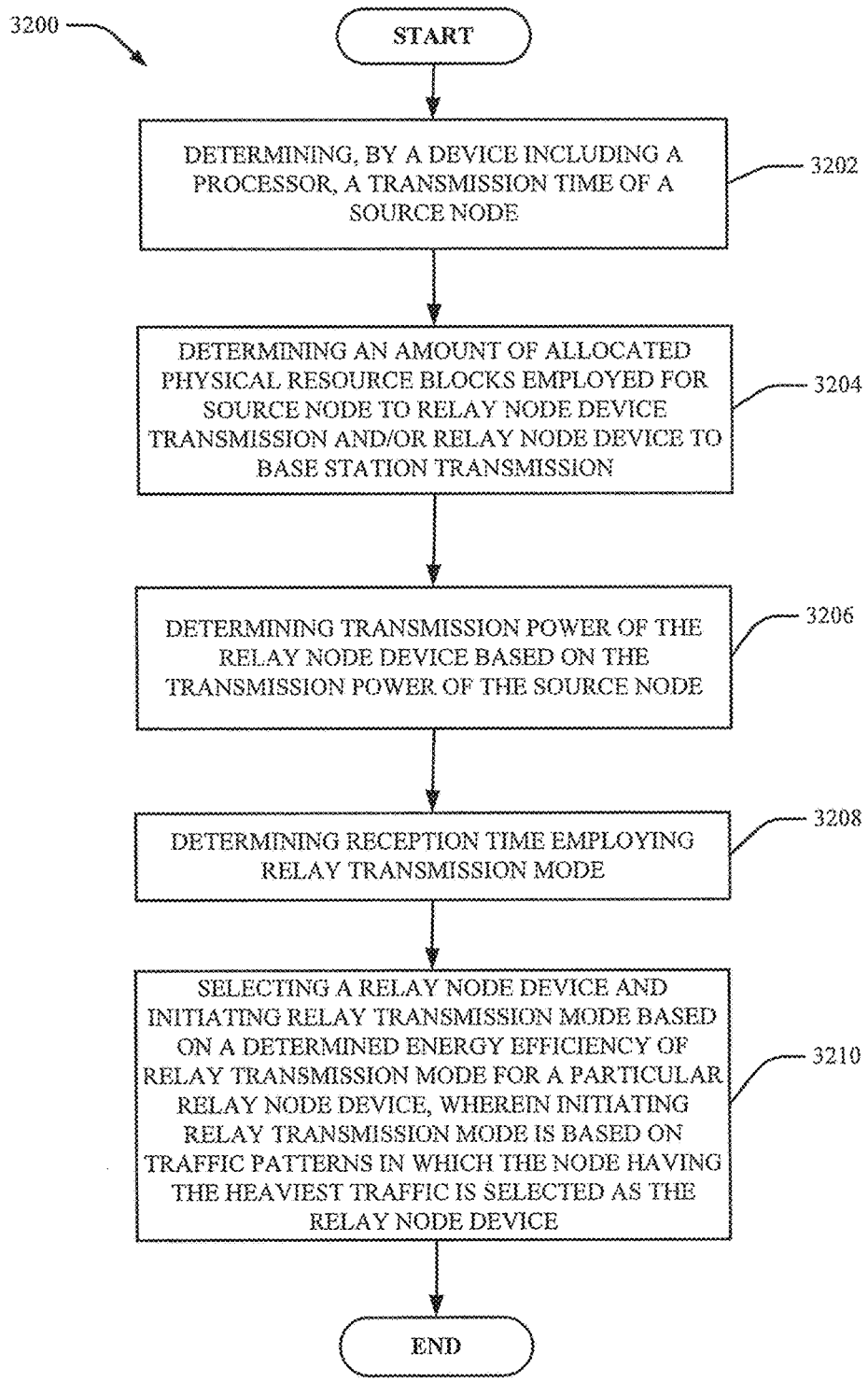

Now turning to FIG. 32, at 3202, method 3200 can include determining, by a device including a processor, a transmission time of a source node. At 3204, method 3200 can include determining an amount of allocated physical resource blocks employed for source node to relay node device transmission and/or relay node device to BS transmission.

At 3206, method 3200 can include determining transmission power of the relay node device based on the transmission power of the source node. At 3208, method 3200 can include determining reception time employing relay transmission mode. At 3210, method 3200 can include selecting a relay node device and initiating relay transmission mode based on a determined energy efficiency of relay transmission mode for a particular relay node device, wherein initiating relay transmission mode is based on traffic patterns in which the node having the heaviest traffic is selected as the relay node device.

Figure 33:
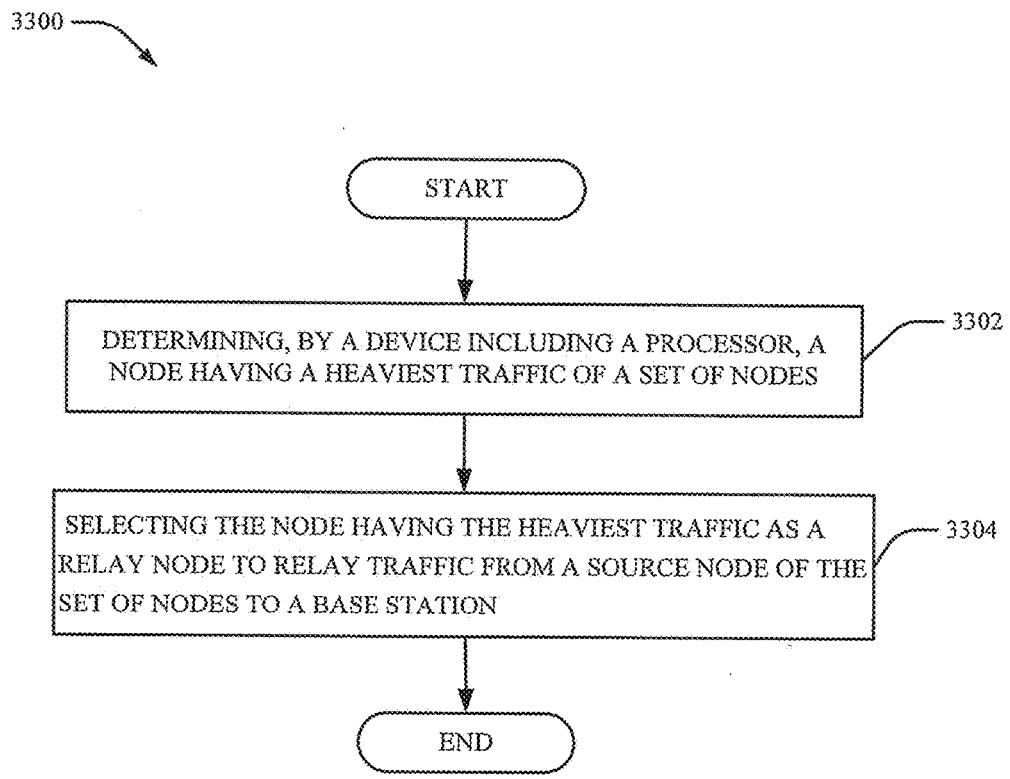

Now turning to FIG. 33, at 3302, method 3300 can include determining, by a device including a processor, a node having a heaviest traffic of a set of nodes. At 3304, method 3300 can include selecting the node having the heaviest traffic as a relay node device to relay traffic from a source node of the set of nodes to a BS.

Figure 34:
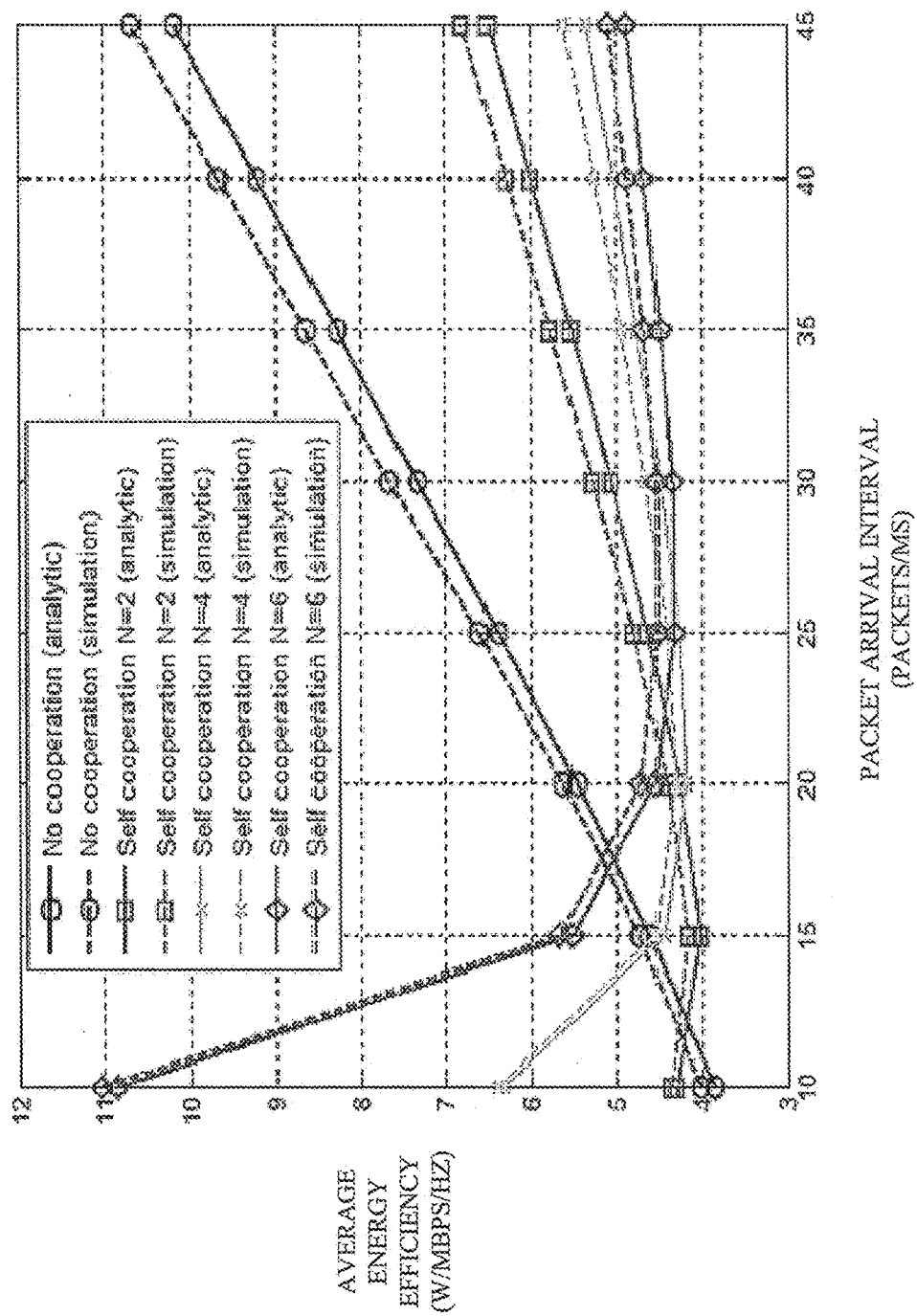
FIG. 34 is an illustration of a graph of average energy efficiency employing relay transmission mode of MDC versus packet arrival interval in accordance with one or more embodiments of the disclosed subject matter.
Figure 35:
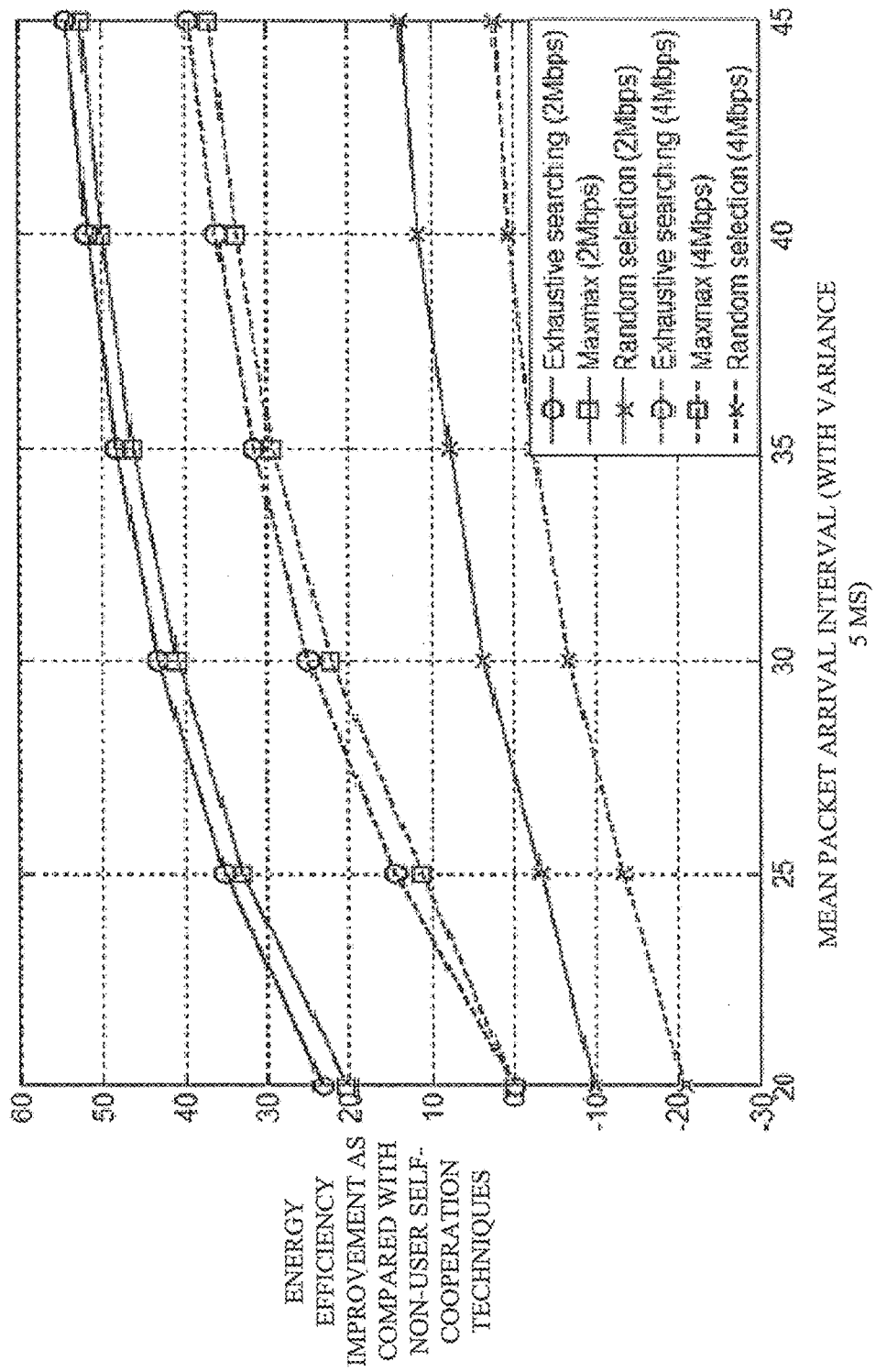
FIG. 35 is an illustration of a graph of energy efficiency improvement employing relay transmission mode of MDC compared to systems that do not employ the relay transmission mode of MDC versus mean packet arrival interval in accordance with one or more embodiments of the disclosed subject matter.

FIG. 34 is an illustration of a graph of average energy efficiency versus packet arrival interval employing the MDC relay transmission mode component of FIG. 25 in accordance with one or more embodiments of the disclosed subject matter. FIG. 35 is an illustration of a graph of energy efficiency improvement compared to systems that do not employ the MDC transmission mode techniques described herein versus mean packet arrival interval in accordance with one or more embodiments of the disclosed subject matter.

FIGS. 34 and/or 35 illustrate the results of evaluation of energy efficiency of the relay transmission mode wherein power control and sleep mechanisms (e.g., DRX) are jointly considered. The graphs of FIGS. 34 and 35 show the results of evaluating relay transmission mode employing two evaluations. FIG. 34 shows the results using aforementioned equalities to provide analytic evaluation. In FIG. 34, relay transmission mode MDC is indicated as "self cooperation" and non-relay transmission mode MDC is indicated as "no cooperation." The value for N is the number of devices (for example, in FIG. 1, the number of devices, N, would be four since the devices include devices 102, 104, 106, 108). The average energy efficiency is quantified in terms of watts per Mbps per hertz. FIG. 35 shows the result of using empirical measurement in which a long term evolution (LTE) smart phone (e.g., HTC Velocity 4G) is connecting with LTE BS emulator CMW500, and the device power consumption is measured.

To measure power consumption within transmission of information from a source node to a relay node device, the relay node device is treated as a BS without configuring any access controls and the distance between the source node and the relay node device is assumed to be approximately one meter. First, each device is assumed to have the same arrival rate and fixed 2 megabits per second (Mbps) packet size (no effects on relay selection aspects). The performance of relay transmission mode is evaluated with regard to the number of devices in the personal area network. The simulation results are provided in the graph of FIG. 34.

As shown in FIG. 34, the empirical measurements (shown as dotted lines) are slightly larger (in terms of average energy efficiency) than the numerical analysis by approximately 6.3%. The difference of 6.3% results from particular energy consumption from the application processor (which is not considered in this evaluation). As also shown in FIG. 34, when the packet arrival interval is decreased (and therefore the packet arrival interval becomes more infrequent) due to more opportunities of wasting power consumption without real transmission, the energy efficiency of non-relay transmission mode would be degraded.

Finally, as also shown in FIG. 34, two devices applying relay transmission mode will experience an improvement in energy efficiency relative to two devices that are not applying the relay transmission mode since the packet arrival interval is above 15 ms and the energy efficiency improvement could reach 42% when the packet arrival interval is 45 ms. Fourth, the improvement can further increase from 42% to 66% when more devices are involved. Finally, when the number of involved devices is increasing, the optimal packet arrival interval for minimizing energy efficiency would be variable (from 15 ms to 25 ms). Accordingly, relay transmission mode of MDC can support power conservation for personal area networks of devices and the performance of the relay transmission mode is a function of traffic and/or the number of involved devices.

Turning now to FIG. 35, a graph comparing different relay node device selection techniques is shown. To verify the impact of traffic and relay node device selection, the results of three algorithms were compared for a simulated environment with six devices with different packet traffic arrival rates and packet traffic size (the variance was fixed). The three algorithms were: random selection (random relay node device selection in which a device is selected as relay node device randomly and always applies relay); exhaustive searching (in which equation 11 is applied to identify the node with the best efficiency and relay is initiated only when the condition of equation 12 is true); and max-max relay node device selection (in which the arrival rate is multiplied by the packet size to obtain traffic volume, and the node with maximum traffic volume (heaviest traffic) is selected as relay node device, and the relay transmission mode is initiated only when the condition of equation 12 is true).

The results in FIG. 35 have been averaged over 1000 simulations and the Y-axis is the energy efficiency savings normalized by the performance of non-relay transmission mode. As shown, the gain will be degraded when 4 Mbps packet size is transmitted and randomly relay selection would have worse performance. Alternatively, the other two approaches (e.g., exhaustive searching and max-max selection) outperform non-relay transmission mode and the max-max approach has a similar performance (e.g., only 4 percent difference) with the exhaustive searching approach. As shown, the relay transmission mode can improve energy efficiency due to saving unnecessary power consumption caused by access controls; however, relay node device selection based on traffic can be employed for favorable results. A simple relay node device selection algorithm (e.g., max-max selection) can be employed in one embodiment in which the node with the heaviest traffic is selected as the relay node device for great performance.

Figure 36:
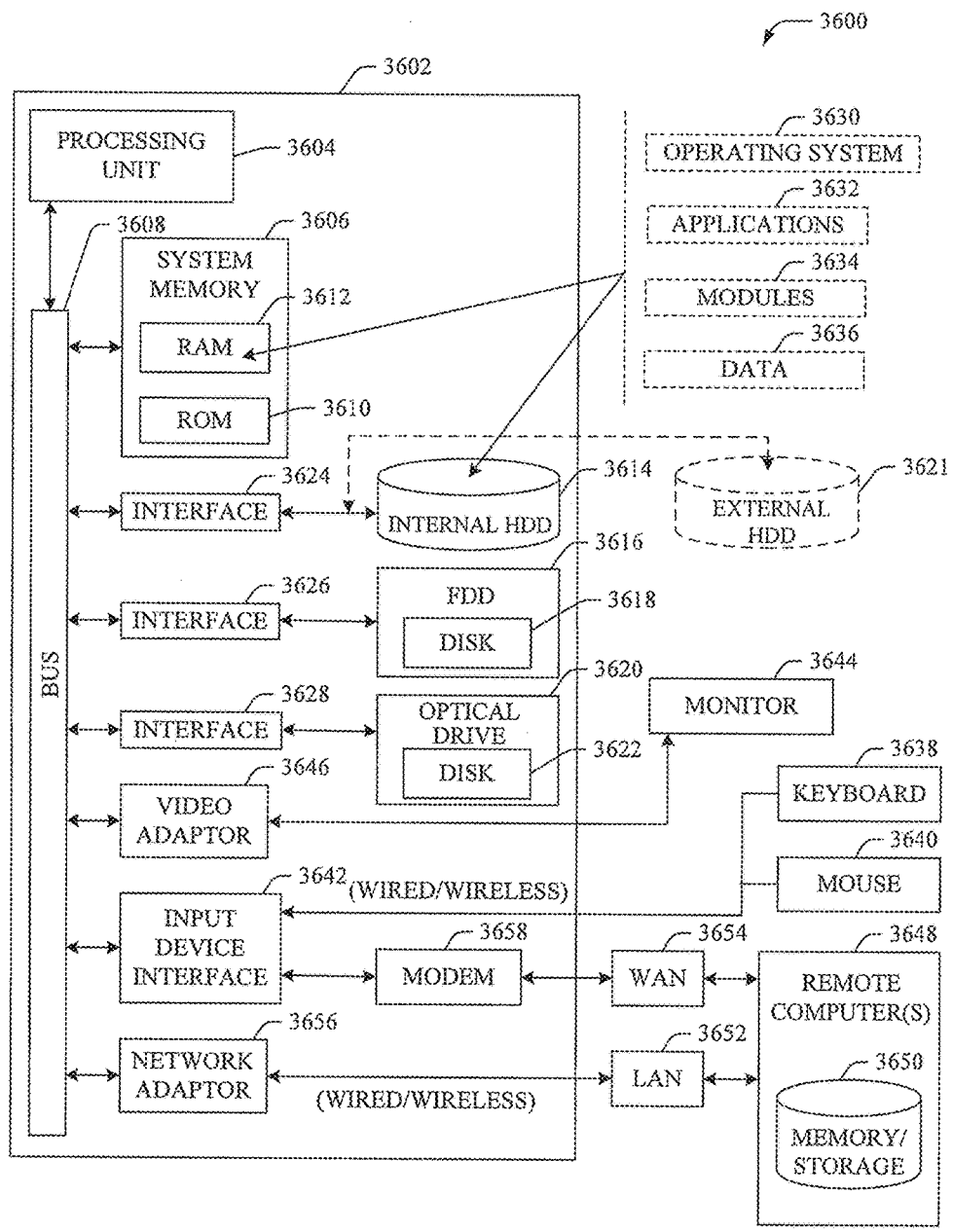
FIG. 36 is an exemplary schematic block diagram illustrating a suitable operating environment to facilitate the various embodiments of modes of MDC described herein.

FIG. 36 is an exemplary schematic block diagram illustrating a suitable operating environment to facilitate the various embodiments of modes of MDC described herein. The exemplary environment 3600 can include a computer 3602. The computer 3602 can include a processing unit 3604, a system memory 3606 and a system bus 3608. The system bus 3608 can couple various system components including, but not limited to, coupling the system memory 3606 to the processing unit 3604. The processing unit 3604 can be any of various processors. In some embodiments, dual microprocessors and other multi-processor architectures may also be employed as the processing unit 3604.

The system bus 3608 can be any of several types of bus structure that can interconnect to a memory bus (with or without a memory controller), a peripheral bus, and a local bus using any bus architecture. The system memory 3606 can include read-only memory (ROM) 3610 and random access memory (RAM) 3612. A basic input/output system (BIOS) is stored in a non-volatile memory such as ROM, erasable programmable read only memory (EPROM), electrically erasable programmable read only memory (EEPROM). The BIOS can contain the basic routines that help to transfer information between elements within the computer 3602, such as during start-up. The RAM 3612 can also include a high-speed RAM such as static RAM for caching data.

The computer 3602 can also include an internal hard disk drive (HDD) 3614 (e.g., EIDE, SATA). The internal hard disk drive 3614 can also be configured for external use in a suitable chassis (not shown). The computer 3602 can also include a magnetic floppy disk drive (FDD) 3616, (e.g., to read from or write to a removable diskette 3618) and an optical disk drive 3620, (e.g., reading a CD-ROM disk 3622 or, to read from or write to other high capacity optical media such as the DVD). The hard disk drive 3614, magnetic disk drive 3616 and/or optical disk drive 3620 can be connected to the system bus 3608 by a hard disk drive interface 3624, a magnetic disk drive interface 3626 and/or an optical drive interface 3628. The interface 3624 for external drive implementations can include, but is not limited to, Universal Serial Bus (USB) and IEEE1394 interface technologies. Other external drive connection technologies are within contemplation of the subject matter disclosed herein.

The drives and their associated computer-readable media can provide non-volatile storage of data, data structures and/or computer-executable instructions. For the computer 3602, the drives and media can accommodate the storage of any data in a suitable digital format. Although the description of computer-readable media above refers to a HDD, a removable magnetic diskette, and/or a removable optical media such as a CD or DVD, it should be appreciated by those skilled in the art that other types of media, which are readable by a computer (e.g., zip drives, magnetic cassettes, flash memory cards, cartridges) can also be used in the exemplary operating environment, and further, that any such media can contain computer-executable instructions for performing the methods and/or implementing the systems of the various embodiments.

A number of program modules can be stored in the drives and RAM 3612, including an operating system 3630, one or more application programs 3632, other program modules 3634 and/or program data 3636. All or portions of the operating system, applications, modules, and/or data can also be cached in the RAM 3612. It is appreciated that the various embodiments can be implemented with various different operating systems or combinations thereof.

A user can enter commands and information into the computer 3602 through one or more wired/wireless input devices (e.g., a keyboard 3638 and a pointing device, such as a mouse 3640). Other input devices (not shown) may include a microphone, an IR remote control, a joystick, a game pad, a stylus pen, touch screen or the like. These and other input devices can be connected to the processing unit 3604 through an input device interface 3642 that is coupled to the system bus 3608 in some embodiments. In other embodiments, the input devices can be connected to the processing unit 3604 via other interfaces (e.g., parallel port, an IEEE1394 serial port, a game port, a USB port, an IR interface).

A monitor 3644 or other type of display device can be connected to the system bus 3608 via an interface, such as a video adapter 3646. In addition to the monitor 3644, other peripheral output devices (not shown) (e.g., speakers, printers) can be connected to the system bus 3608.

The computer 3602 can operate in a networked environment using logical connections via wired and/or wireless communications to one or more remote computers, such as a remote computer 3648. The remote computer 3648 can be a workstation, a server computer, a router, a personal computer, portable computer, microprocessor-based entertainment appliance, a peer device and/or other common network node. The remote computer 3648 can include one or more of the elements described for the computer 3602, although, for purposes of brevity, only a memory/storage device 3650 is illustrated. The logical connections depicted can include wired/wireless connectivity to a local area network (LAN) 3652 and/or larger networks, such as wide area network (WAN) 3654. Such LAN and WAN networking environments are commonplace in offices and companies, and can facilitate enterprise-wide computer networks, such as intranets. The LAN, WAN and other networking environments can connect to a global communications network (e.g., the Internet).

When used in a LAN networking environment, the computer 3602 can be connected to the local network 3652 through a wired and/or wireless communication network interface or adapter 3656. The adapter 3656 can facilitate wired or wireless communication to the LAN 3652, which can also include a wireless access point disposed thereon for communicating with the wireless adapter 3656.

When used in a WAN networking environment, the computer 3602 can include a modem 3658, can be connected to a communications server on the WAN 3654 and/or can have other functionality and/or structure for establishing communications over the WAN 3654. The modem 3658, which can be internal or external, and which can be a wired or wireless device, can be connected to the system bus 3608 via the serial port interface 3642. In a networked environment, program modules depicted relative to the computer 3602, or portions thereof, can be stored in the remote memory/storage device 3650. It will be appreciated that the network connections shown are exemplary and other functionality and/or structure for establishing a communications link between the computers can be used.

The computer 3602 can be operable to communicate with any wireless devices or entities operatively disposed in wireless communication (e.g., a printer, scanner, desktop and/or portable computer, portable data assistant, communications satellite, any piece of equipment or location associated with a wirelessly detectable tag (e.g., a kiosk, news stand, restroom) and telephone). Such can include, but is not limited to, Wi-Fi (Wireless Fidelity) and/or BLUETOOTH™ wireless technologies. Thus, the communication can be a predefined structure as with a conventional network or simply an ad hoc communication between at least two devices.

Wi-Fi can allow connection to the Internet from a couch at home, a bed in a hotel room, or a conference room at work, without wires. Wi-Fi is a wireless technology similar to that used in a cell phone that enables such devices to send and receive data indoors and out and/or anywhere within the range of a BS. Wi-Fi networks can use radio technologies called IEEE802.11 (a, b, g, n, etc.) to provide secure, reliable, fast wireless connectivity. A Wi-Fi network can be used to connect computers to each other, to the Internet, and/or to wired networks (which can use IEEE802.3 or Ethernet). Wi-Fi networks can operate in the unlicensed 2.4 and 5 GHz radio bands, at an 11 Mbps (802.11a) or 54 Mbps (802.11b) data rate, for example, or with products that contain both bands (dual band). As such, networks employing Wi-Fi technology can provide real-world performance similar to the basic 10BaseT wired Ethernet networks used in many offices.

It is to be appreciated and understood that components as described with regard to a particular system or method, can include the same or similar functionality as respective components as described with regard to other systems or methods disclosed herein.

As it employed in the specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

In the specification, terms such as "data store," data storage," "database," and substantially any other information storage component relevant to operation and functionality of a component, refer to "memory components," or entities embodied in a "memory" or components comprising the memory. For example, information relevant to operation of various components described in the disclosed subject matter, and that can be stored in a memory, can comprise, but is not limited to comprising, subscriber information; cell configuration or service policies and specifications; privacy policies; and so forth. It will be appreciated that the memory components described herein can be either volatile memory or non-volatile memory, or can include both volatile and non-volatile memory. By way of illustration, and not limitation, non-volatile memory can include read only memory (ROM), programmable ROM (PROM), electrically programmable ROM (EPROM), electrically erasable ROM (EEPROM), phase change memory (PCM), flash memory, or non-volatile RAM (e.g., ferroelectric RAM (FeRAM)). Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Various embodiments or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips), optical disks (e.g., compact disk (CD), digital versatile disk (DVD), Blu-ray disc), smart cards, and flash memory devices (e.g., card, stick, key drive).

What has been described above includes exemplary various embodiments. It is, of course, not possible to describe every conceivable combination of components or methods for purposes of describing the embodiments, but one of ordinary skill in the art can recognize that many further combinations and permutations are possible. Accordingly, the detailed description is intended to embrace all such alterations, modifications, and variations that fall within the spirit and scope of the appended claims.

In particular and in regard to the various functions performed by the above described components, devices, circuits, systems and the like, the terms (including any references to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary embodiments of the embodiments. In this regard, it will also be recognized that the embodiments includes a system as well as a computer-readable medium having computer-executable instructions for performing the acts and/or events of the various methods.

In addition, while a particular feature can have been disclosed with respect to only one of several implementations, such feature can be combined with one or more other features of the other implementations as can be desired and advantageous for any given or particular application. Furthermore, to the extent that the terms "includes," and "including" and variants thereof are used in either the detailed description or the claims, these terms are intended to be inclusive in a manner similar to the term "comprising", such as, for example, as the term "comprising" is interpreted when employed as a transitional word in a claim.

Figure 37:
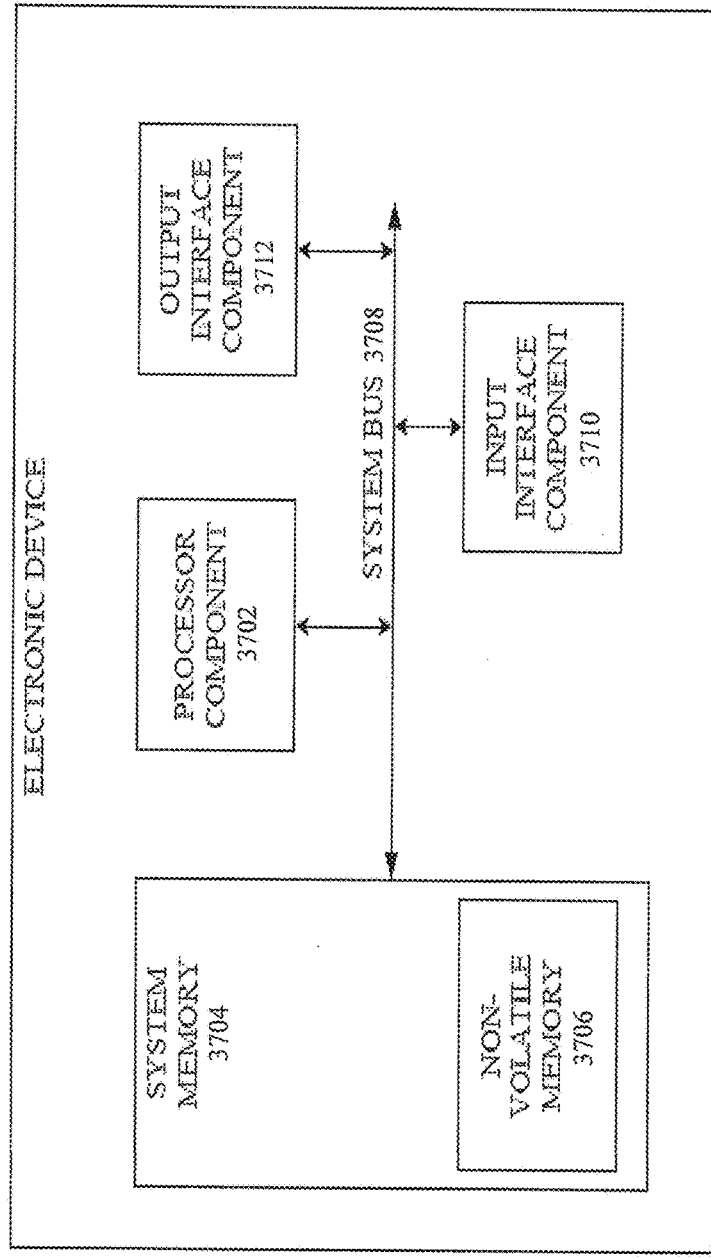
FIG. 37 is a block diagram of an exemplary electronic device that can facilitate the various modes of MDC for wireless network components in accordance with one or more embodiments of the disclosed subject matter.

FIG. 37 is a block diagram of an exemplary electronic device that can facilitate the various modes of MDC for wireless network components in accordance with one or more embodiments of the disclosed subject matter. In FIG. 37, illustrated is a block diagram of an exemplary, non-limiting electronic device 3700 that can perform various embodiments of MDC (including, but not limited to, relay transmission mode MDC and transmission mode embodiments 1, 2, 3 and 4 described herein) for wireless network components in accordance with an aspect of the disclosed subject matter. The electronic device 3700 can include, but is not limited to, a candidate device (e.g., candidate device 200), relay node device 2600, a serving BS 504, a neighboring BS 1200, a non-coordinating device 502, a coordinating device 500, a coordinating device selection component 402, initialization stage component 204, 2500, management stage component 206, transmission stage component 208, a transmission mode component 1500 and/or a relay transmission mode component 2700 (or a component of a candidate device (e.g., candidate device 200), relay node device 2600, a serving BS 504, a neighboring BS 1200, a non-coordinating device 502, a coordinating device 500, a coordinating device selection component 402, initialization stage component 204, 2500, management stage component 206, transmission stage component 208, a transmission mode component 1500 and/or a relay transmission mode component 2700).

Components of the electronic device 3700 can include, but are not limited to, a processor component 3702, a system memory 3704 (with non-volatile memory 3706), and a system bus 3708 that can couple various system components including the system memory 3704 to the processor component 3702. The system bus 3708 can be any of various types of bus structures including a memory bus or memory controller, a peripheral bus, or a local bus using any of a variety of bus architectures.

Computing devices typically include a variety of media, which can include computer-readable storage media or communications media, which two terms are used herein differently from one another as follows.

Computer-readable storage media can be any available storage media that can be accessed by the computer and includes both volatile and non-volatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal (e.g., a carrier wave or other transport mechanism) and includes any information delivery or transport media. The terms "modulated data signal" or "signals" refer to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

The system memory 3704 can include computer-readable storage media in the form of volatile and/or non-volatile memory 3706. A basic input/output system (BIOS), containing the basic routines that help to transfer information between elements within electronic device 3700, such as during start-up, can be stored in memory 3704. Memory 3704 can typically contain data and/or program modules that can be immediately accessible to and/or can be operated on by processor component 3702. By way of example, and not limitation, system memory 3704 can also include an operating system, application programs, other program modules, and program data. As a further example, system memory can include program modules for MDC.

The non-volatile memory 3706 can be removable or non-removable. For example, the non-volatile memory 3706 can be in the form of a removable memory card or a USB flash drive. In accordance with one aspect, the non-volatile memory 3706 can include flash memory (e.g., single-bit flash memory, multi-bit flash memory), ROM, PROM, EPROM, EEPROM, and/or NVRAM (e.g., FeRAM), or a combination thereof, for example. Further, the flash memory can include NOR flash memory and/or NAND flash memory.

A user can enter commands and information into the electronic device 3700 through input devices (not illustrated) such as a keypad, microphone, tablet or touch screen although other input devices can also be utilized. These and other input devices can be connected to the processor component 3702 through input interface component 3710 that can be connected to the system bus 3708. Other interface and bus structures, such as a parallel port, game port or a universal serial bus (USB) can also be utilized. A graphics subsystem (not illustrated) can also be connected to the system bus 3708. A display device (not illustrated) can be also connected to the system bus 3708 via an interface, such as output interface component 3712, which can in turn communicate with video memory. In addition to a display, the electronic device 3700 can also include other peripheral output devices such as speakers (not illustrated), which can be connected through output interface component 3712. In an aspect, other electronic devices, e.g., other BSs and/or mobile devices in a network can be communicatively coupled to electronic device 1500 by way of input interface component 3710 and output interface component 3712, which can facilitate transfer of feedback and/or MDC information.

It is to be understood and appreciated that the computer-implemented programs and software can be implemented within a standard computer architecture. While some aspects of the disclosure have been described above in the general context of computer-executable instructions that can run on one or more computers, those skilled in the art will recognize that the technology also can be implemented in combination with other program modules and/or as a combination of hardware and software.

Generally, program modules include routines, programs, components and/or data structures that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices (e.g., PDA, phone), microprocessor-based or programmable consumer electronics, and the like, each of which can be operatively coupled to one or more associated devices.

As utilized herein, terms "component," "system," "interface," and the like, can refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

Furthermore, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips), optical disks (e.g., compact disk (CD), digital versatile disk (DVD)), smart cards, and flash memory devices (e.g., card, stick, key drive). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications can be made to this configuration without departing from the scope or spirit of the disclosed subject matter.

Some portions of the detailed description can have been presented in terms of algorithms and/or symbolic representations of operations on data bits within a computer memory. These algorithmic descriptions and/or representations are the means employed by those cognizant in the art to most effectively convey the substance of their work to others equally skilled. An algorithm is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the foregoing discussion, it is appreciated that throughout the disclosed subject matter, discussions utilizing terms such as processing, computing, calculating, determining, and/or displaying, and the like, refer to the action and processes of computer systems, and/or similar consumer and/or industrial electronic devices and/or machines, that manipulate and/or transform data represented as physical (electrical and/or electronic) quantities within the computer's and/or machine's registers and memories into other data similarly represented as physical quantities within the machine and/or computer system memories or registers or other such information storage, transmission and/or display devices.

What has been described above includes examples of aspects of the disclosed subject matter. It is, of course, not possible to describe every conceivable combination of components or methodologies for purposes of describing the disclosed subject matter, but one of ordinary skill in the art can recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has," or "having," or variations thereof, are used in either the detailed description or the claims, such terms are intended to be inclusive in a manner similar to the term "comprising" as "comprising" is interpreted when employed as a transitional word in a claim.

What is claimed is:

1. A method, comprising:
    identifying, by a coordinating device comprising a processor, one or more devices associated with a same entity as the coordinating device, wherein the coordinating device and the one or more devices are part of a set of devices associated in a personal area network; and
    coordinating, by the coordinating device, with the one or more devices to enable a single radio resource connection (RRC) between the set of devices and a base station, wherein the coordinating comprises:

selecting a relay node device, from among the set of devices, to relay data transmitted from the set of devices during a relay transmission mode, and wherein the data is relayed to the base station using the single RRC;

determining a network energy efficiency of the set of devices based on transmission time, an amount of allocated physical resource block, transmission power, and reception time of one or more devices of the set of devices; and enabling the relay transmission mode based on the network energy efficiency of the set of devices.

2. The method of claim 1, wherein the single RRC is established through the relay node device.

3. The method of claim 1, further comprising determining the network energy efficiency of the set of devices based on a ratio between a total power consumption of the set of devices and a received throughput at the base station.

4. The method of claim 1, wherein the relay transmission mode is enabled based on a determination that the network energy efficiency is greater when the relay transmission mode is enabled.

5. The method of claim 1, wherein the network energy efficiency is a function associated with a traffic loading of the set of devices including a traffic arrival rate and a traffic size.

6. The method of claim 1, wherein the relay node device is configured to relay the data during the relay transmission mode employing power control and discontinuous reception.

7. The method of claim 1, wherein the relay transmission mode is enabled when an amount of additional power consumption and resource caused by transmissions between the relay node device and the set of devices is less than an amount of power conservation resulted from replacing individual receptions of the set of devices with relay node device reception.

8. The method of claim 1, wherein the selecting the relay node device comprises: selecting, as the relay node device, a device among the set of devices, that has been determined to have a smallest traffic arrival rate, a largest traffic size or a largest traffic volume.

9. A non-transitory computer-readable storage device having executable instructions stored thereon that, in response to execution, cause a coordinating device comprising a processor to perform operations, comprising:

identifying one or more devices associated with a same entity as the coordinating device, wherein the coordinating device and the one or more devices are part of a set of devices associated in a personal area network; and coordinating with the one or more devices to enable a single radio resource connection (RRC) between the set of devices and a base station, and wherein the coordinating comprises:

selecting a relay node device, from among the set of devices, to relay data transmitted from the set of devices during a relay transmission mode, and wherein the data is relayed to the base station using the single RRC;

determining a network energy efficiency of the set of devices based on transmission time, an amount of allocated physical resource block, transmission power, and reception time of one or more devices of the set of devices; and enabling the relay transmission mode based on the network energy efficiency of the set of devices.

10. The non-transitory computer-readable storage device of claim 9, wherein the single RRC is established through the relay node device.

11. The non-transitory computer-readable storage device of claim 9, wherein the operations further comprise determining the network energy efficiency of the set of devices based on a ratio between a total power consumption of the set of devices and a received throughput at the base station.

12. The non-transitory computer-readable storage device of claim 9, wherein the relay transmission mode is enabled when an amount of additional power consumption and resource caused by transmissions between the relay node device and the set of devices is less than an amount of power conservation resulted from replacing individual receptions of the set of devices with relay node device reception.

13. The non-transitory computer-readable storage device of claim 9, wherein the relay transmission mode is enabled based on a function of a measure of traffic loading for a number of the one or more devices being less than a defined value.

14. The non-transitory computer-readable storage device of claim 13, wherein the measure of the traffic loading is associated with a first measure of traffic arrival rate, a second measure of traffic size and a number of the one or more devices.

15. An apparatus, comprising:
a coordinating device comprising a processing device configured to at least:

identify one or more devices associated with a same entity as the coordinating device, wherein the coordinating device and the one or more devices are part of a set of devices associated in a personal area network; and coordinate with the one or more devices to enable a single radio resource connection (RRC) between the set of devices and a base station, and wherein coordination with the one or more devices comprises:

selection of a relay node device, from among the set of devices, to relay data transmitted from the set of devices during a relay transmission mode, and wherein the data is relayed to the base station using the single RRC;

determining a network energy efficiency of the set of devices based on transmission time, an amount of allocated physical resource block, transmission power, and reception time of one or more devices of the set of devices; and enabling the single RRC based on the network energy efficiency of the set of devices.

16. The apparatus of claim 15, wherein the single RRC is established through the relay node device.

* * * * *